United States Patent [19]

McCrory et al.

[11] Patent Number: 6,064,805
[45] Date of Patent: *May 16, 2000

[54] METHOD, SYSTEM, AND COMPUTER PROGRAM PRODUCT FOR INTRACONNECT DATA COMMUNICATION USING BUFFER POOLS AND BUFFER POOL MANAGEMENT

[75] Inventors: Duane J. McCrory, Malvern; Jerry S. Bassett, Quakertown, both of Pa.; Mark S. Brandt, Laguna Beach, Calif.; Robert A. Johnson, Pottstown, Pa.; James J. Leigh, Wyncote, Pa.; Robert K. Moulton, North Wales, Pa.

[73] Assignee: Unisys Corporation, Blue Bell, Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/887,296

[22] Filed: Jul. 2, 1997

[51] Int. Cl.[7] .................................................... G06F 13/00
[52] U.S. Cl. ................................. 395/200.57; 395/200.6
[58] Field of Search .................................... 709/213, 227, 709/230, 232

[56] References Cited

U.S. PATENT DOCUMENTS

| 4,509,119 | 4/1985 | Gumaer et al. | 711/136 |
| 4,901,277 | 2/1990 | Soloway et al. | 395/200.63 |

(List continued on next page.)

FOREIGN PATENT DOCUMENTS 0 205 948 A2  12/1986  European Pat. Off. ............... 6/15

OTHER PUBLICATIONS

Martin J., *TCP/IP Networking: Architecture, Administration, and Programming*, (PTR Prentice–Hall: Englewood Cliffs, NJ 1994), pp. 23–40.

F. Halsall, *Data Communications, Computer Networks, and Open Systems,* 4 Ed., (Addison–Wessley: U.S.A. 1996), pp. 641–693.

*Primary Examiner*—Parshotam S. Lall
*Assistant Examiner*—Viet D. Vu
*Attorney, Agent, or Firm*—Steven B. Samuels; Mark T. Starr; John B. Sowell

[57] ABSTRACT

A method, system, and computer program product specifies a communication intraconnect architecture that supports a pull model based data communication where data is sent to a receiver along with a memory address (a receiver buffer address or a reference to a pool manager or buffer pool) where the data is to be stored. CIA primitives are used to create nodes and dialog objects managed by send and receive IFEs. A logical dialog is established between corresponding send and receive dialog objects. A send dialog object includes a reference that identifies for the send IFE the corresponding receive dialog object in the receive IFE. The receive dialog object includes a reference that identifies for the receive IFE the corresponding send dialog object in the send IFE. Receive and send primitives are used to provide pull model data communication over a logical dialog. Receive with Buffer and Receive with Buffer Pool operations are provided. Multiple, full duplex, reliable virtual circuit connections can be provided for each node. Multiple dialog objects can reference a single node. Multiple outstanding CIA primitive operations are allowed on each dialog. Dialogs can handle byte stream or message oriented data. Dialog operations and features further include scatter and gather support, Early-Far-End and Far-End send classes of service, automatic recurring receive option, partial sends and receives messages with substantially no restrictions on send/rcv lengths, and multiple dialog priorities. A user level management dialog is established to manage establishment of logical dialogs. Various dialog establishment services can be used. Buffer pool and pool manager operations provide address bound checking, buffer pool credits, low water mark notification, and data binding to further optimize data transfer performance.

34 Claims, 29 Drawing Sheets

U.S. PATENT DOCUMENTS

| | | | |
|---|---|---|---|
| 5,228,137 | 7/1993 | Kleinerman et al. | 395/500 |
| 5,249,184 | 9/1993 | Woest et al. | 370/402 |
| 5,303,042 | 4/1994 | Lewis et al. | 384/14 |
| 5,506,954 | 4/1996 | Arshi et al. | 395/162 |
| 5,617,409 | 4/1997 | Ozveren et al. | 370/235 |
| 5,764,915 | 6/1998 | Heimsoth et al. | 395/200.57 |
| 5,790,789 | 8/1998 | Snarez | 395/200.32 |
| 5,918,020 | 6/1999 | Blackard et al. | 370/390 |
| 5,953,335 | 9/1999 | Erimli et al. | 370/390 |

METHOD, SYSTEM, AND COMPUTER PROGRAM PRODUCT FOR INTRACONNECT DATA COMMUNICATION USING BUFFER POOLS AND BUFFER POOL MANAGEMENT

CROSS-REFERENCE TO RELATED APPLICATIONS

This patent application is related to the following commonly-owned U.S. utility patent applications filed concurrently herewith:

1. Duane J. McCrory et al., "Method, System, and Computer Program Product for Establishing Dialogs in an Intraconnect Data Communication," application Ser. No. 08/887,228, filed Jul. 2, 1997 (incorporated by reference herein); and
2. Duane J. McCrory et al., "Method, System, and Computer Program Product for Data Communication Using an Intraconnect Architecture," application Ser. No. 08/887,295, filed Jul. 2, 1997 (incorporated by reference herein).

BACKGROUND OF THE INVENTION

1. Field of the Invention

The present invention relates to the field of computer networking and data communication.

2. Related Art

Problem

Dialogs (also called virtual circuits) carry data between different application processes. Dialogs can be logically set to carry data over a computer network such as a mesh. In a computer network, dialogs provide data communication between application processes running on different end systems or hosts. Dialogs can also carry data between application processes running on the same host.

Multiple functional layers (e.g., Application, Presentation, Session, Transport, Network, Link, and Physical) are used in a data communication network to provide different services and reliability in order to implement virtual circuits (i.e., dialogs). Each layer has an associated protocol and range of primitives to provide services. Each layer forms a corresponding protocol data unit that includes the data and corresponding layer protocol control information. Peer protocol entities at the same layer in different end systems provide services at that layer by managing corresponding layer protocol data units and protocol control information. This operation of multiple functional layers (e.g., Application, Presentation, Session, Transport, Network, Link, and Physical as used in an OSI or Transmission Control Protocol/Internet Protocol (TCP/IP) protocol suite) in a data communication network is well-known and need not be described in further detail. See, e.g., Martin, J., *TCP/IP Networking: Architecture, Administration, and Programming*, (PTR Prentice-Hall: Englewood Cliffs, N.J. 1994), pp. 29–30 (incorporated herein by reference) and F. Halsall, *Data Communications, Computer Networks, and Open Systems*, 4 Ed., (Addison-Wessley: U.S.A. 1996), p. 663 (incorporated herein by reference). Layers are implemented as software, firmware, and/or hardware.

Conventional communication systems now have high bandpass capability. Data throughput for high-speed networking technologies occurs at rates on the order of 100 Megabits/sec to 1 Gigabits/sec. Latency, however, is high. Latency is the time interval between the time a transaction issues and the time the transaction is reported as being completed. In systems with a high latency, the round-trip time for two communicating clients to complete a data request can be on the order of milliseconds.

Latency occurs in conventional communication systems due in part to the overhead involved in the communication layers, including but not limited to, the Transport layer and the layers logically below the Transport layer (e.g., the Network, Link, and Physical layers). However, advancements have been made in lower layer network facilities. The transmission and delivery of messages over some networks is now much more efficient and reliable, especially in closely-coupled, clustered systems.

Transport layer facilities continue to impart substantial latency. Popular transport layer protocols, such as TCP, were developed to support local area and wide-area network (LAN/WAN) environments where the underlying bit rate was moderately high, but reliability was poor, and latency induced by the lower networking layers was high. Transport facilities are included in conventional transport protocols to guarantee reliable transmission and delivery. With the advent of very high-speed, low-latency communication networks like ATM, Fibre Channel, and ServerNet™, facilities that were previously incorporated in a Transport Layer to achieve reliable communication, are now being provided by the underlying communication networks themselves. For example, ATM, Fibre Channel, and ServerNet™ include specific lower layer facilities for ensuring reliable transmission and delivery, such as, in-order-delivery, check summing, and segmentation and reassembly (SAR).

Conventional high-latency Transport layer protocols and architectures, however, assume lower networking layers (e.g., Network, Link, and Physical layers) are unreliable. Therefore, high-latency transports, such as, the TCP/IP protocol suite, are not positioned to leverage advances in lower-layer data transmission reliability. Conventional transport layer protocols are further limited to a push data model of communication where data is sent regardless of whether a receiver can accommodate the data. Such push model data communication causes flow control problems and excessive data copying.

What is needed is a high-speed, low-latency intraconnect architecture having efficient transport layer processing. A standard transport layer protocol and architecture is needed that can leverage improvements in the reliability of data transmission and delivery, especially for closely-coupled, clustered systems. What is needed is a high-speed, low-latency transport intraconnect architecture that eliminates data copies and provides effective flow control.

SUMMARY OF THE INVENTION

According to the present invention, a communication intraconnect architecture (CIA) is specified which provides a reliable and efficient transport service between communicating clients using a pull data model. The pull data model is a communication model where a send client of a dialog waits for permission to send data to a receiving client. The receive client "pulls" data from the send client. Flow control is handled by the pull data model since the receive client requests data when the receive client is ready. Moreover, the communication intraconnect architecture, according to the present invention, implements a pull data model which transfers data as efficiently and reliably as a push data model.

The CIA pull data model of the present invention supports receive operations by requiring the sender to bind data bytes to receiver memory addresses. Data transfer between communicating send and receive clients can be conducted entirely by performing write-only operations that write data to memory. Read operations having a high latency can be avoided entirely.

According to one embodiment of the present invention, a method, system, and computer program product provide transport layer data communication based on a pull data model between communicating clients. To receive data, a receive client builds a CIA control block (CCB) that includes parameters for a dialog receive (d_rcv) primitive. The receive client passes the CCB to a receive-side CIA transport-layer facility. These d_rcv parameters identify a scatter list that defines the destination data areas (i.e., data destination addresses) and how much data space is available at each data destination address. For example, in Receive with Buffer operations, the d_rcv parameters identify, among other things, a receive-side buffer and a desired transfer length for that buffer. Additional d_rcv parameters are used to select available receive services (e.g., an auto receive service or partial receive service).

The receive-side CIA transport facility is also called a receive intraconnect front end (IFE). The receive IFE constructs a receive control block (RCB) based on the parameters passed by the receive client in a d_rcv primitive. The receive IFE sends the RCB in a network packet over a mesh to a send side CIA transport facility, that is, to a send IFE associated with the logical dialog.

At the send side, the send IFE stores the receive control block (RCB). The RCB arrival triggers match processing at the send side of the interface. The RCB includes fields that identify the scatter list (e.g., receive data destination addresses and maximum data transfer lengths and buffer lengths). The RCB includes other fields pertinent to support d_rcv semantics (e.g., auto-receive, buffer pool references). Multiple RCBs can be queued at the send-side to reduce latency and to accommodate multiple requests for data.

To send data, a send client passes d_send parameters for a dialog send (d_send) primitive in a control block (CCB) to the send IFE. The d_send parameters identify a logical dialog and a gather list. Additional fields are used to support other d_send semantics (e.g., partial transfer versus end-of message indication).

The transport layer at the send-side of a CIA interface (in other words, the send IFE) determines when a match occurs between a RCB and an outstanding d_send CCB. To transfer data, the send IFE binds data specified by the d_send CCB to destination addresses specified by the matching RCB.

In a networking environment where data is to be transferred over a mesh, the send IFE constructs a network packet. The network packet includes a copy of the sender's data and receiver memory destination addresses. When receive and send clients share the same memory space, the send IFE performs the data transfers using memory copies.

At the receive side, the receive IFE deconstructs the received network packet. The receive IFE then stores the send side data from the network packet into the receive buffers specified by the memory destination addresses in the received network packet.

According to another feature of the present invention, two send classes of service are provided, Early-Far-End and Far-End. When a user requests Early-Far-End service, the send IFE sends a Send Complete indication to the send client as soon as the send IFE no longer requires the send client's resources.

When a user requests Far-End service, the send IFE waits for an Acknowledgment packet sent by the receive IFE. Reception of an Acknowledgment packet by the send IFE triggers a Send Complete indication to the send client.

The present invention has further features and advantages. Multiple, full duplex, reliable virtual circuit connections (i.e., multiple logical dialogs) can be provided for each node. Multiple dialog objects can reference a single node. Multiple outstanding CIA primitive operations are allowed on each dialog. Dialogs can handle byte stream or message oriented data.

Dialog operations and features include, but are not limited to, scatter and gather support, Early-Far-End and Far-End send classes of service, automatic recurring receive option, partial sends and receives messages with no substantial restrictions on send/rcv lengths, and multiple dialog priorities.

According to the present invention, a user level management dialog can be used to establish other logical dialogs. Type 1 and Type 2 dialog establishment services are provided.

According to a further feature of the present invention, a communication architecture is provided that utilizes buffer pools and pool managers in a pull data model to provide an efficient and reliable transport service. Buffer pool and pool manager operations provide address bound checking, buffer pool credits, low water mark notification, and data binding to further optimize data transfer performance.

Further features and advantages of the present invention, as well as the structure and operation of various embodiments of the present invention, are described in detail below with reference to the accompanying drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

TABLE OF CONTENTS

Figure 1A:
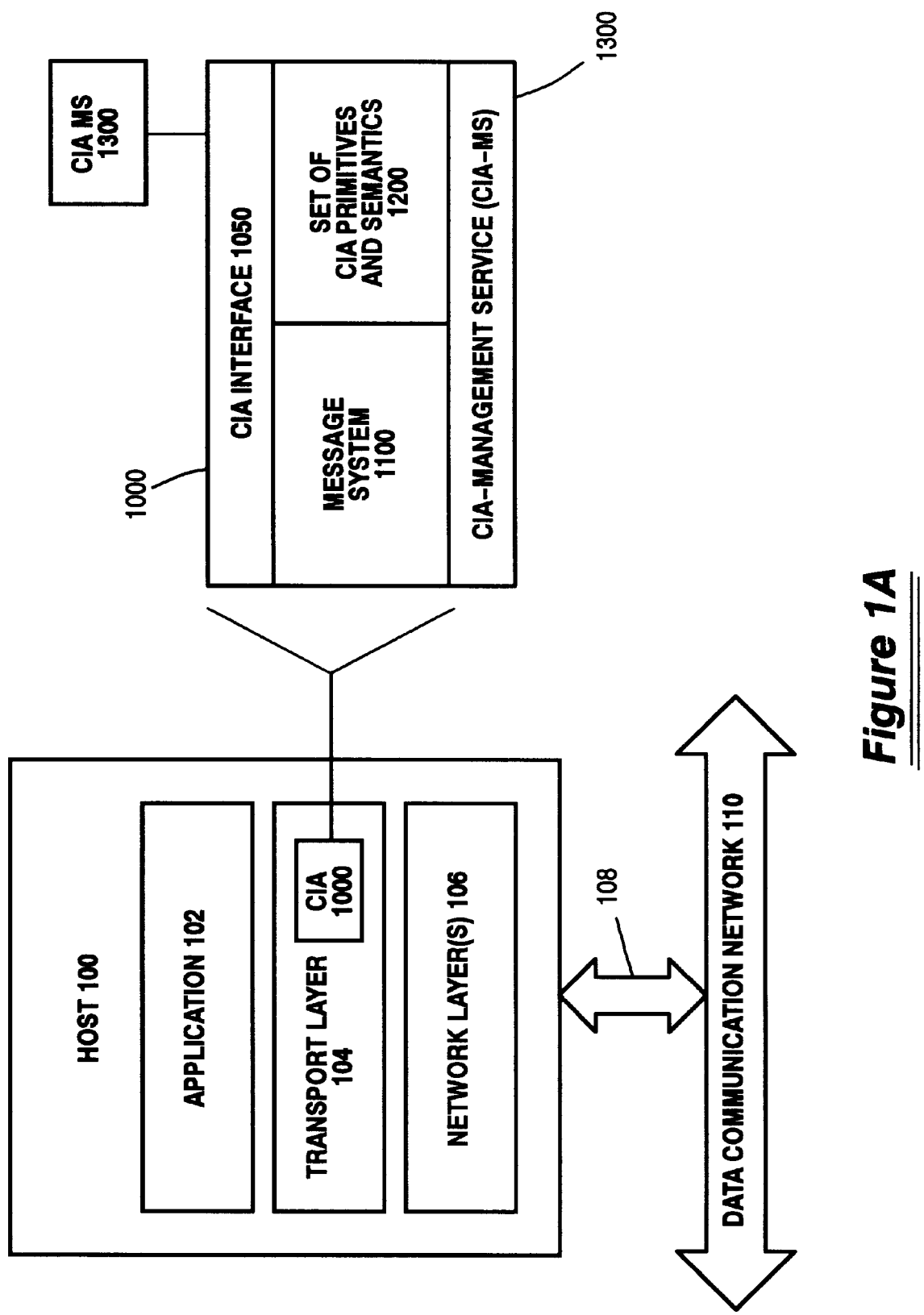
FIG. 1A is a schematic diagram showing a communication intraconnect architecture (CIA) interface according to the present invention.

1. Overview and Terminology
2. Example Environment
3. Communication Intraconnect Architecture (CIA)
   a. CIA Intraconnect Model
   b. Example Windows NT™ Environment
4. CIA Data Communication
   a. Pull Data Model
   b. Operations
      1. CIA Objects
      2. Data Transfer
      3. Gather
      4. Scatter
      5. Send Classes of Service (Early-Far-End and Far-End)
      6. Ordering of Send and Receive Requests
      7. Multiple Outstanding Send and Receive Requests
      8. Auto-Receive and Auto-Send
      9. Partial Messages (Partial Receives and Partial Sends)
      10. Dialog Priority Attributes
5. CIA Management
   a. Node Primitives and Notifications
   b. Dialog Establishment, Termination, and Notification
      1. Type 1
      2. Type 2
   c. User Level Management Dialog
   d. IFE Management Primitives and Notifications
6. Buffer Pool (BP) and Pool Manager (PM) Operations
   a. Receive With Buffer Pool Operations
   b. Example Description of CIA Objects and Primitives Supporting Receive with Buffer Pool Operations
      1. BP Operation Primitives
      2. PM Operation Primitives
      3. Data Binding Algorithm
      4. Dialog Operation Primitives
      5. Buffer Pool
      6. Pool Manager
      7. Pool Manager Shadow
      8. RCB for Receive with Buffer Pool
      9. Dialog Object
      10. Node
7. Example Computer System
8. Example CIA-IFE Interface
   a. CIA-IFE Initialization
   b. CIA Providers
   c. IFE Attachment Styles
   d. CIA Proxy Drivers
   e. IFE Addressing
9. Conclusion

1. Overview and Terminology

The present invention provides a method, system, and computer program product for data transfer using a pull model data communication. The present invention sets forth a communication intraconnect architecture that provides efficient, reliable transport service between communicating clients. The communication intraconnect architecture (CIA) includes a pull model based data communication where a sender binds data to be sent to a receiver along with a data destination descriptor (e.g., a memory address) indicating where the data is to be stored at the receive side. In this way, received data is stored using write-only operations requiring no data copying, and flow control problems are eliminated.

To more clearly delineate the present invention, an effort is made throughout the specification to adhere to the following term definitions as consistently as possible.

"Communication intraconnect architecture," "CIA," and equivalents thereof, are used interchangeably to refer to a communication intraconnect architecture according to the present invention as described herein. The communication intraconnect architecture provides transport-level data communication between any two clients. CIA functionality can be implemented in any network communication layer including, but not limited to, a Transport layer.

"Intraconnect" refers to a logical connection between intraconnect-front-ends (IFEs) that allows data communication between two clients. An intraconnect can extend over a wide-area network, a closely-coupled network, or within a single system in a shared memory environment.

"Intraconnect front-end", "IFE," and equivalents thereof, refer to a module (implemented through software, firmware, and/or hardware) used to attach a communication module to a client (system and/or application). An IFE according to the present invention includes a CIA having one or more of the CIA primitives and operations, and equivalents thereof, as described herein. IFE functionality can be implemented on a host processor and/or on a separate unit.

"CIA Control Blocks," CCBs, control blocks, and equivalents thereof, are used interchangeably to refer to data structures used to contain and pass CIA primitives between a client (system and/or application) and an IFE.

"Mesh," "network," and equivalents thereof, refer to any physical link technology that supports physical links providing symmetric, duplex communication between homogeneous and/or heterogeneous nodes.

"Nodes," "node objects," and equivalents thereof, are used interchangeably to refer to data structures maintained by an IFE which are used to represent other IFEs that are connected via a mesh, physical link, loopback facility, or shared memory configuration.

"Dialogs," "dialog objects," and equivalents thereof, are used interchangeably to refer to data structures maintained by an IFE which are used to represent "logical dialogs." "Logical dialogs" and equivalents thereof refer to full-duplex communication circuits between clients (systems and/or applications).

"Buffers," and equivalents thereof, are memory areas addressed by buffer addresses.

"Buffer pools," and equivalents thereof, are data structures which store buffer addresses and buffer pool attributes.

"Pool Managers," and equivalents thereof, describe buffer preference parameters. Buffer preference parameters provide a best fit capability for matching available buffers to the transfer length.

2. Example Environment

The present invention is described in terms of an example computer networking environment. Description in these terms is provided for convenience only. It is not intended that the invention be limited to application in this example environment. In fact, after reading the following description, it will become apparent to a person skilled in the relevant art how to implement the invention in alternative environments.

3. Communication Intraconnect Architecture (CIA)

Figure 1B:
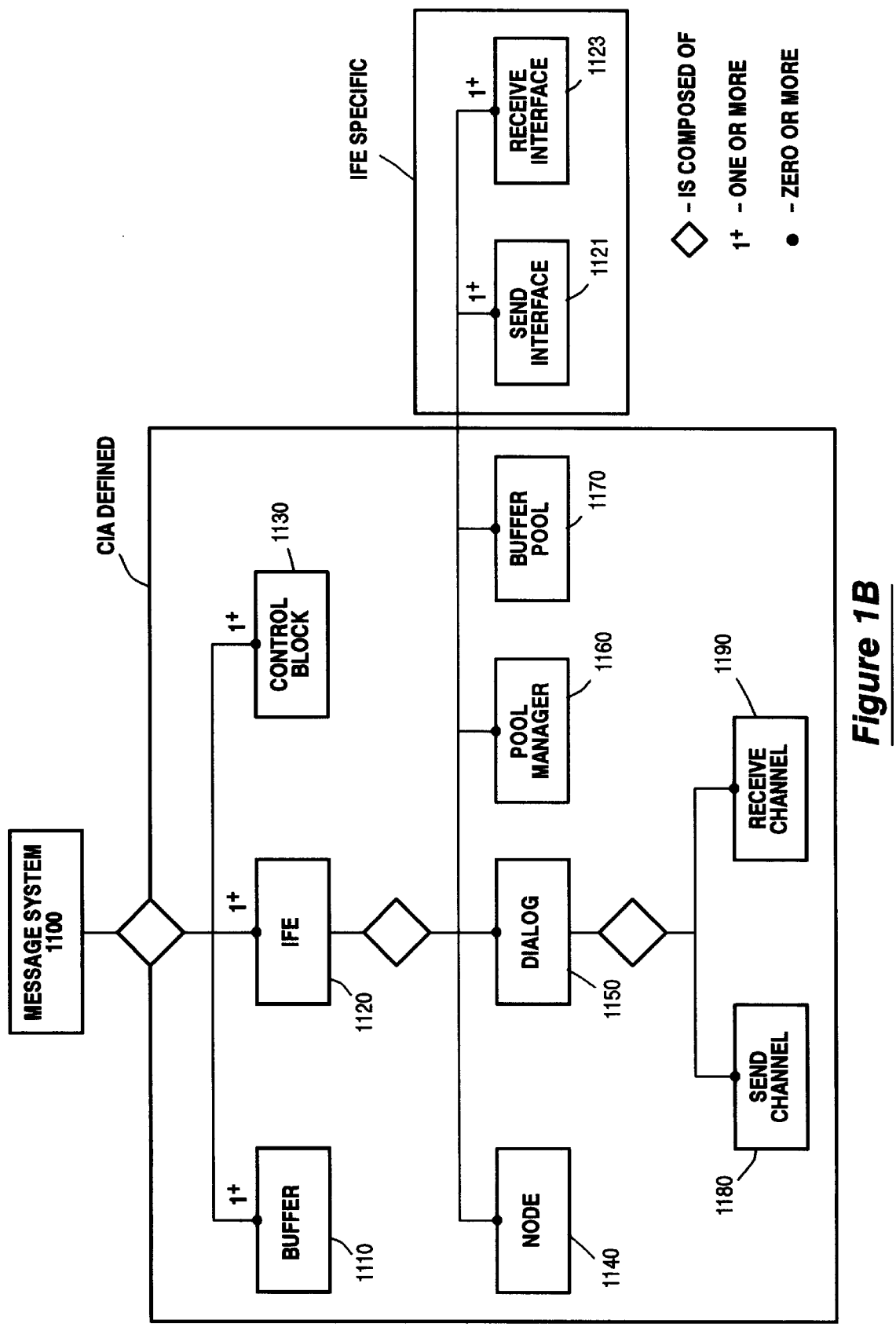
FIG. 1B is a schematic diagram of a message system for the CIA interface of FIG. 1A.
Figure 1C:
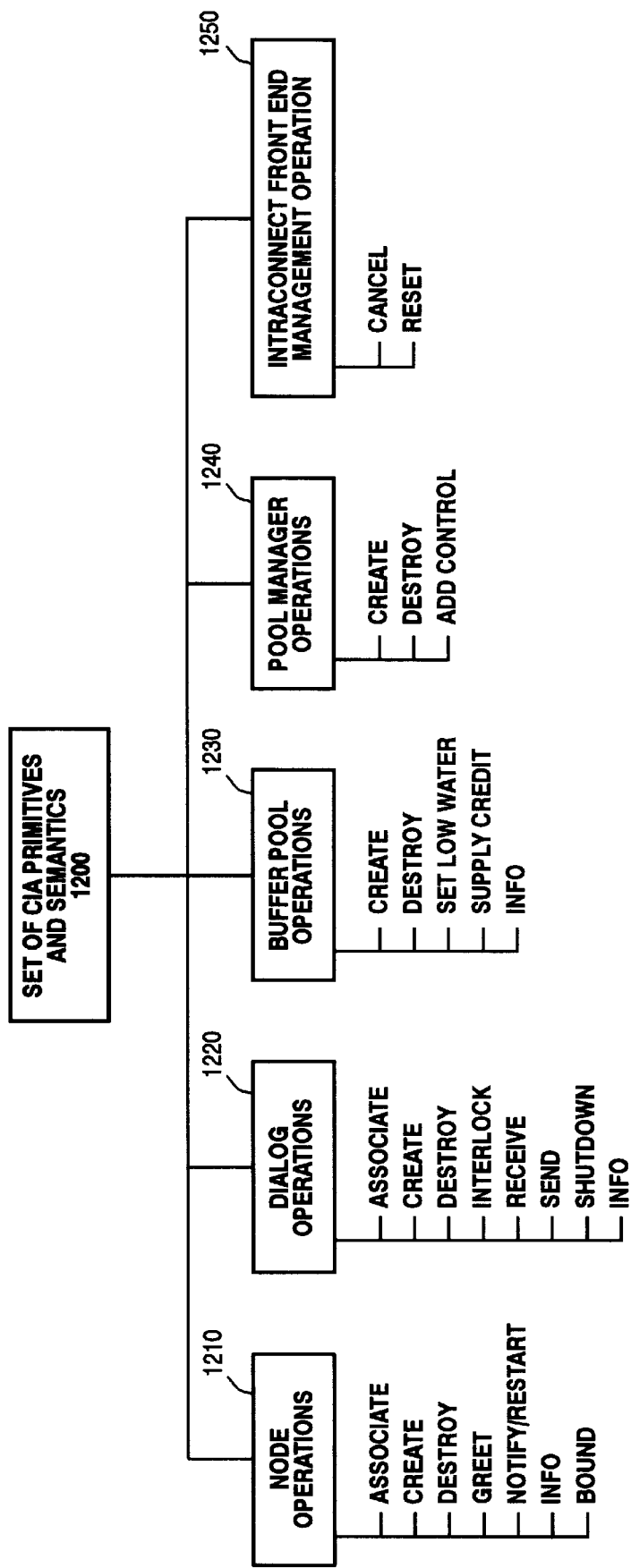
FIG. 1C is a schematic diagram of a set of CIA primitives and semantics for CIA interface of FIG. 1A.

FIGS. 1A, 1B, and 1C illustrate a communication intraconnect architecture (CIA) according to the present invention. CIA 1000 provides a transport level intraconnect communication service. CIA 1000 can be implemented as a transport layer on any computer in a networking or shared memory environment. FIG. 1A illustrates a networking configuration. Host computer 100 includes CIA 1000 and a transport layer 104. Application 102 running on host 100 then transfers data through transport layer 104 to network layers 106. The data is then sent over a bus 108 or other type of link to a data communication network 110.

CIA 1000 is added to transport layer 104 to provide a transport level communication service with less protocol overhead than conventional transport implementations, such as, TCP/IP. As described in further detail below, CIA 1000 yields a highly optimized service by leveraging current advances in communication technology at the physical level (e.g., segmentation/reassembly, in order and reliable delivery). Other quality of service features can be provided. For example, guaranteed dialog bandwidth can be provided. Significant characteristics of CIA are summarized below:

1. Physical intraconnect technology independent.
2. Multiple, full duplex, reliable virtual circuit connections per node (i.e., dialogs).
3. Multiple outstanding operations allowed on each dialog.
4. Byte stream or message oriented data transfer.
5. Partial sends and receives with substantially no restrictions on send/rcv lengths.
6. Receive with truncation option.
7. Buffer pool support including programmable buffer preference control logic.
8. Receive into specific memory (without kernel copy) is supported.
9. Scatter and gather support (including mixing buffer pools with specific memory addresses).
10. Automatic recurring receive option.
11. Two send classes of service (early-far-end, far-end).
12. Cooperative dialog based flow control, with NetBIOS send semantics.
13. Multiple dialog priorities.

As shown in FIG. 1A, CIA 1000 consists of a CIA interface 1050, message system 1100, and a set of CIA primitives and semantics 1200. A CIA management service (CIA-MS) 1300 is also shown as indicated by the phantom dashed lines and is described further below.

FIG. 1B shows elements of message system 1100. Message system 1100 is composed of one or more buffers 1110, intraconnect front end units (IFE) 1120 and control blocks 1130. Each IFE 1120 is composed of one or more send interfaces 1121 and receive interfaces 1123. Each IFE 1120 is also composed of zero or more nodes 1140, dialogs 1150, pool managers 1160, and buffer pools 1170. Each dialog 1150 is composed of zero or more send channels 1180 and receive channels 1190. The operation of each of the elements in the message system 1100 will be described in further detail below.

FIG. 1C shows elements from the set of CIA primitives and semantics 1200. The set of CIA primitives and semantics 1200 includes node operations 1210, dialog operations 1220, buffer pool operations 1230, pool manager operations 1240, and intraconnect front end management operations 1250. Node operations 1210 can include the following types of primitives: ASSOCIATE, CREATE, DESTROY, GREET, NOTIFY/RESTART, INFO, and BOUND (e.g., n_associate, n_bound, n_create, n_destroy, n_greet, n_notify_restart, n_zinfo). Dialog operations 1220 includes the following types of primitives: ASSOCIATE, CREATE, DESTROY, INTERLOCK, RECEIVE, SEND, SHUTDOWN, and INFO (e.g., d_associate, d_create, d_destroy, d_interlock, d_rcv, d_send, d_shutdown, d_zinfo).

Buffer pool operations 1230 include the following types of primitives: CREATE, DESTROY, SET LOW WATER, SUPPLY CREDIT, and INFO (e.g., bp_create, bp_destroy, bp_set_low_water, bp_supply_credit, and bp_zinfo). Pool manager operations 1240 include the following types of primitives: CREATE, DESTROY, and ADD CONTROL (pm_create, pm_destroy, pm_add_control). Intraconnect front end management operations 1250 include the following types of primitives: CANCEL, RESET (e.g., i_cancel, i_reset).

The completion of CIA primitives is reported via a notification mechanism. There are additional notification events defined for asynchronous conditions related to IFE, node, dialog, and buffer pool management. The actual notification implementations are a function of the host operating environment. In an embodiment of CIA with a Windows NT architecture, notifications are implemented as procedure call-backs.

The operation of the set of CIA primitives and semantics 1200 is described in further detail below.

a. CIA Intraconnect Model

Figure 2:
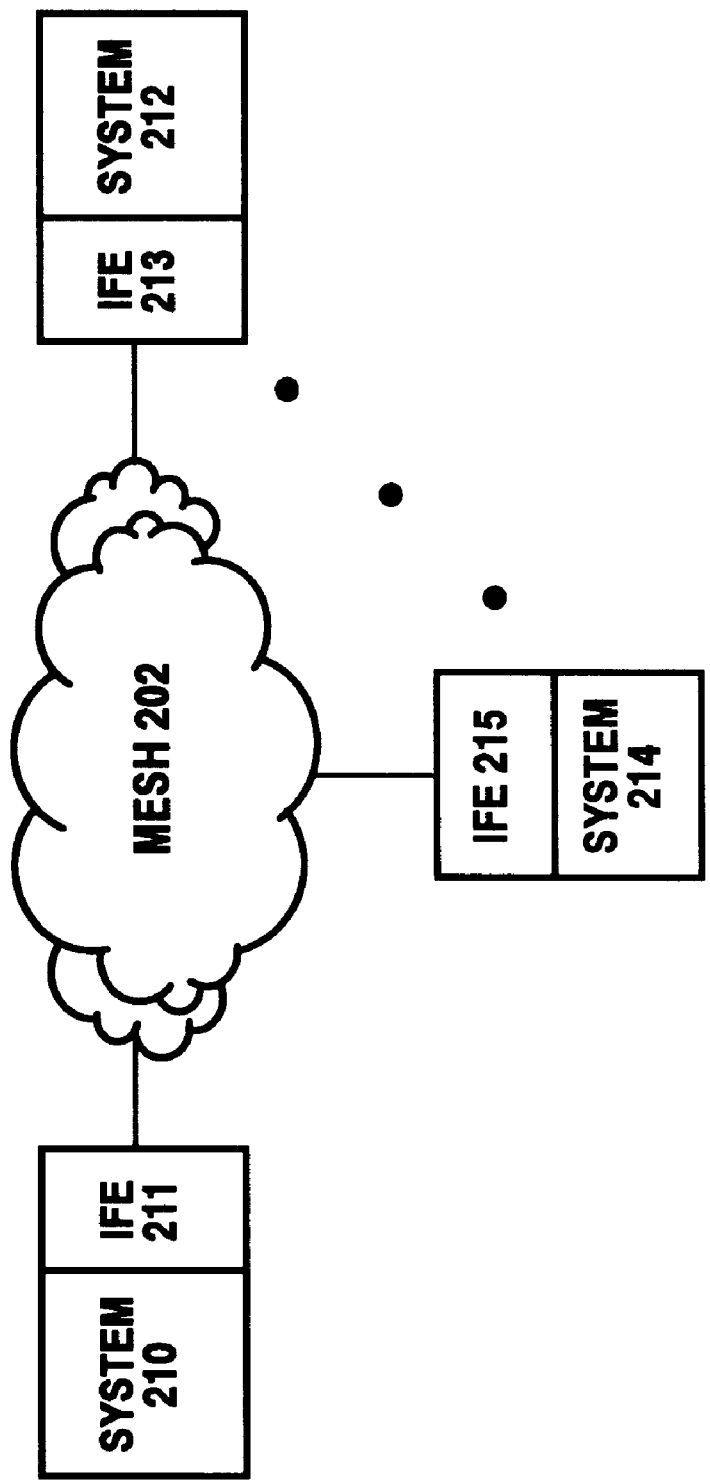
FIG. 2 is a schematic diagram of CIA intraconnect according to the present invention.

FIG. 2 is a high level picture that depicts the components in a CIA based intraconnect. Logically there are a set of systems 210, 212, 214 connected via a common mesh (202). Each system 210, 212, 214 incorporates a system specific set of hardware and software 211, 213, 215, respectively, for implementing the CIA semantics between the systems connected via the mesh 202. Systems 210, 212, 214 can be any type of computer system, including but not limited to, enterprise servers, NT servers, UNIX servers, or other coprocessing elements. Any mesh technology and lower-layer protocol can be used including, but not limited to, shared memory, Ethernet, Tandem's ServerNet, SCI physical, Asynchronous Transfer Mode (ATM), and Fibre Channel. Indeed, CIA 1000 is independent of any underlying physical intraconnect mesh technology.

Although not shown, each System 210, 212, 214 can include multiple IFEs and can be connected to multiple meshes through one or more IFEs.

b. Example Windows NT™ Environment

Figure 3:
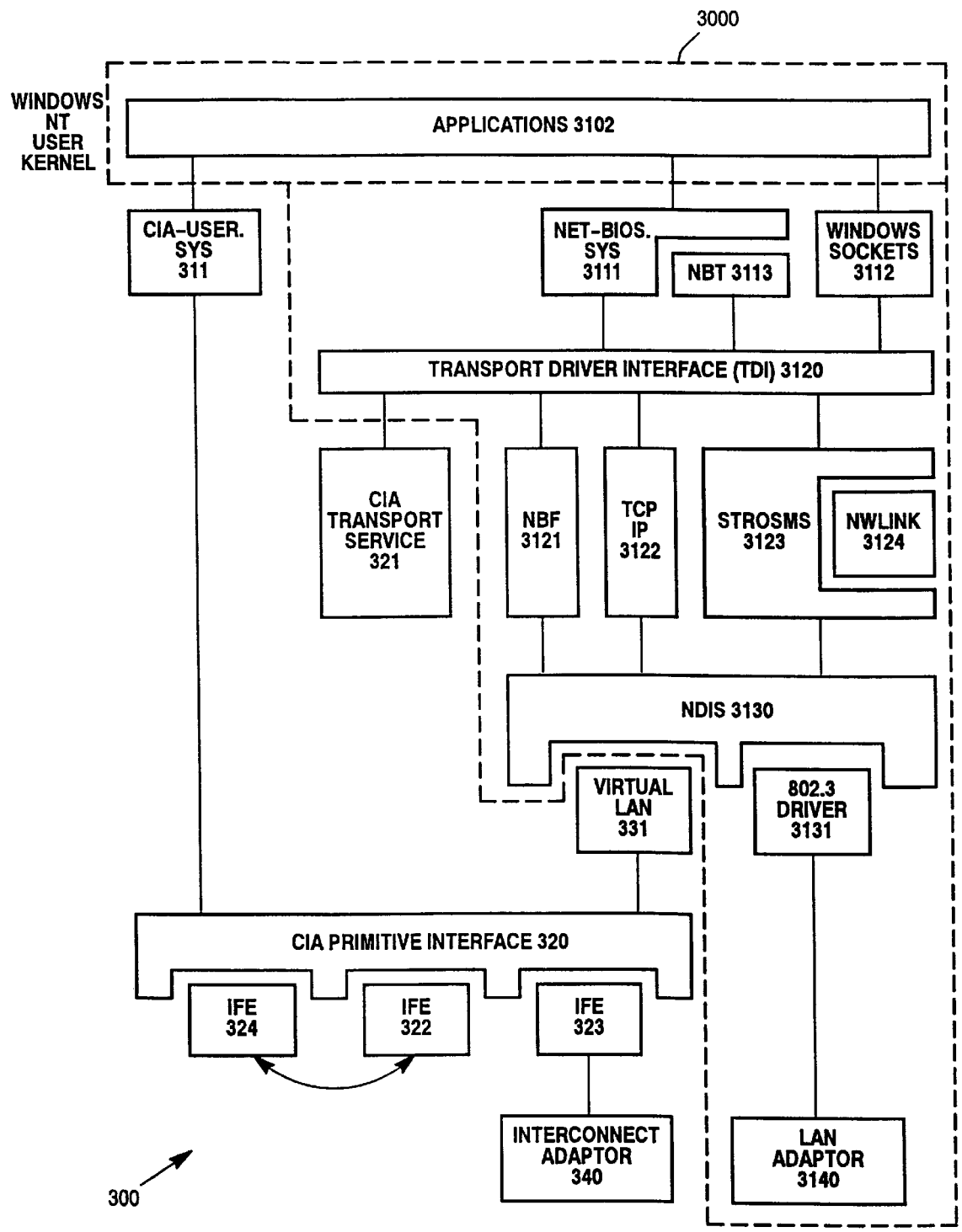
FIG. 3 is a schematic diagram showing CIA semantics integrated in a Windows NT™ environment.

FIG. 3 depicts how CIA semantics 300 can be integrated into the networking protocol organization 3000 utilized by Microsoft Windows NT™. CIA can also be implemented in a Master Control Program (MCP) in an A Series operating system environment. However, the present invention is not limited to Windows NT™ or MCP environments as would be readily apparent to one skilled in the art given this description.

In the FIG. 3 example, the 3000 series reference numerals refer to elements of the networking protocol organization 3000 used in the Microsoft Windows NT™ operating system. The 300 series reference numerals refer to CIA elements according to the present invention.

As shown in FIG. 3, several different Application Programming Interfaces (API) 3111, 3112 are available to applications 3102 for utilizing networking services. The Windows Sockets interface 3112 is a Microsoft Windows standard that was modeled after the Berkeley Sockets interface originally developed on UNIX systems. Initially, Windows Sockets supported networking over TCP/IP 3122 but recently extensions have been made to support other proprietary networks (e.g., NWLINK 3124 for Novell's IPX network). The NETBIOS interface 3111 was one of the original networking APIs developed for personal computers. Several different NETBIOS compatible networking implementations have been developed including NBF 3121 and NBT 3113. NBF 3121 is an implementation of the IBM proprietary NETBEUI networking implementation. NBT 3113 is an implementation of Internet standards (i.e., RFC 1001, 1002), which define a NETBIOS implementation over TCP/IP 3122.

Windows NT defines a standard interface called Transport Driver Interface (TDI) 3120. This provides a well defined interface for developing new networking APIs that will operate over existing network implementations, and it also allows for the incorporation of new networking protocol implementations for the existing networking APIs.

The Streams interface 3123 was developed as a compatibility layer to aid in the porting of protocol drivers which were developed for the UNIX streams programming model. NWLINK 3124 is an example of a protocol driver which fits this category.

NDIS 3130 is a Microsoft Windows standard programming interface that corresponds to the upper edge of layer 2 of the OSI protocol stack (i.e., link layer). NDIS 3130 allows the network protocols to interoperate with LAN adapters 3140 from different vendors. A LAN hardware vendor develops the NDIS driver 3131 for their specific LAN adapter 3140.

According to the present invention, CIA-USER.SYS 311 provides a new networking API that allows applications 3102 to utilize the features of CIA 1000 directly. CIA Transport Service 321 is a TDI compliant networking interface that supports the NETBIOS 3111 and Windows Sockets 3112 APIs over CIA based intraconnects. The Virtual LAN component 331 allows NDIS compliant networking protocols to interoperate over CIA based intraconnects.

CIA Primitive Interface 320 provides a common programming interface for CIA clients 311, 321, 331 and IFEs 324, 322, 323.

IFE 322 and IFE 324 are performing a loopback facility which allows a CIA client application (e.g., one requesting data) and a CIA server application (e.g., one supplying data) to reside on the same system. In this case, the IFEs 322, 324 can transfer data using a memory copy. IFE 323 implements the CIA semantics over an external mesh connection which is supplied by Intraconnect Adapter 340. Note that IFE 323 and Intraconnect Adapter 340 can be combined as a single IFE unit or implemented as separate units as depicted in FIG. 3.

4. CIA Data Communication

CIA supports both push and pull data models of data communication. The push data model is similar to traditional networking models, e.g., TCP/IP, in that messages arrive unsolicited from the mesh and must be partially decoded, synchronized with a Receive request, and bound to a destination address while subsequent messages continue to stream in from the mesh. In contrast, in a pull data model, according to the present invention, the sender does not send data (for a dialog) until the receiver notifies the sender that is it ready to accept data. CIA 1000 uses a pull data model that supports different types of receive operations (Receive with Buffer, Receive with Buffer Pool). Moreover, according to a further feature of the present invention, a communication intraconnect architecture is provided that optimizes the pull data model to be as efficient as a push model.

a. Pull Data Model

The CIA pull data model of the present invention supports receive operations by requiring the sender to bind data bytes to receiver memory addresses. Data transfer between communicating send and receive clients can be conducted entirely by performing write-only operations that write data to memory. Read operations having a high latency can be avoided entirely. Further, pull data model implementations of CIA 1000 may utilize additional techniques to make data transfer and control even more efficient.

CIA defines two categories of receive operations that an application can invoke for a dialog: Receive with Buffer and Receive with Buffer Pool. Receive with Buffer operations provide for those cases where the CIA client has allocated memory space (e.g., a user-specified memory area or buffer) to accommodate the receive messages. This memory space is owned by the CIA client with access granted to the IFE. This provides benefit to the IFE in that resource allocation for receiving messages is managed by the CIA client. This provides benefit to the CIA client in that the client knows the memory location into which the data will be placed.

Receive with Buffer Pool operations provide a means to manage a memory resource across a large number dialogs (which can be frequently idle), as opposed to pre-allocating one or more buffers for each dialog. An IFE binds incoming data to available buffer space and reports that binding to the CIA client in the receive indication.

The pull data model used in CIA 1000 will first be described in detail primarily with reference to CIA Objects used in Receive with Buffer Operations. Next, CIA dialog and node management will be described. The pull data model used in CIA 1000 will then be described in detail with reference to CIA Objects used in Receive with Buffer Pool Operations.

b. Operations

1. CIA Objects

Figure 4:
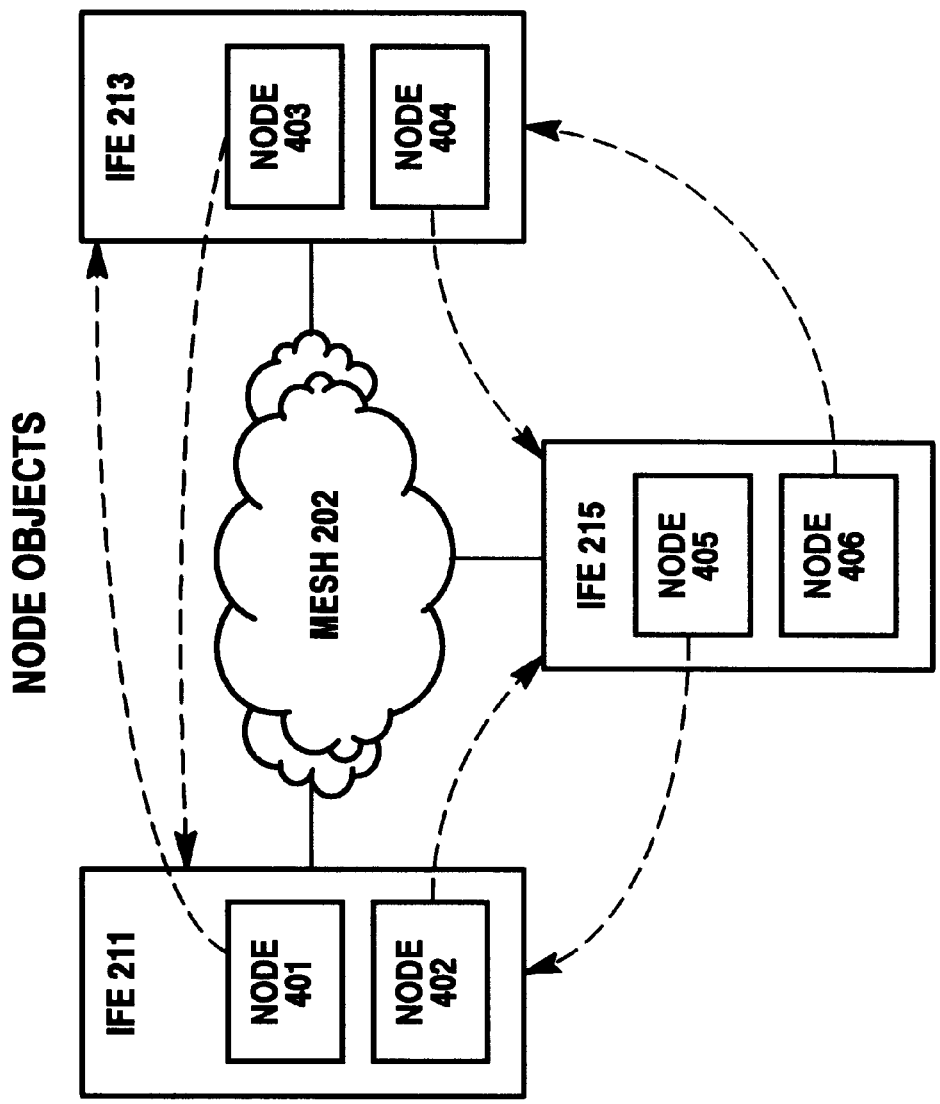
FIG. 4 is a schematic diagram illustrating node objects in a CIA architecture according to the present invention.

CIA defines several objects which are part of the architecture. FIG. 4 shows the role of nodes 401–406 in a CIA architecture. Nodes 401–406 are data structures maintained by corresponding IFEs 211, 213, 215. As indicated by the arrows, nodes 401–406 are used to represent other IFEs 211, 213, 215 that are connected via the mesh 202.

For instance, node 406 is maintained by IFE 215 (also called, the "local" IFE). However, node 406 refers to IFE 213 (also called, the "remote" IFE). As indicated by the arrow in FIG. 4, node 406 stores a reference pointing to remote IFE 213. For example, this reference can be a designator (e.g., a media access controller identification (MAC id) that identifies the remote IFE 213. Similarly, IFE 213 maintains node 404 which references back to IFE 215.

Figure 5:
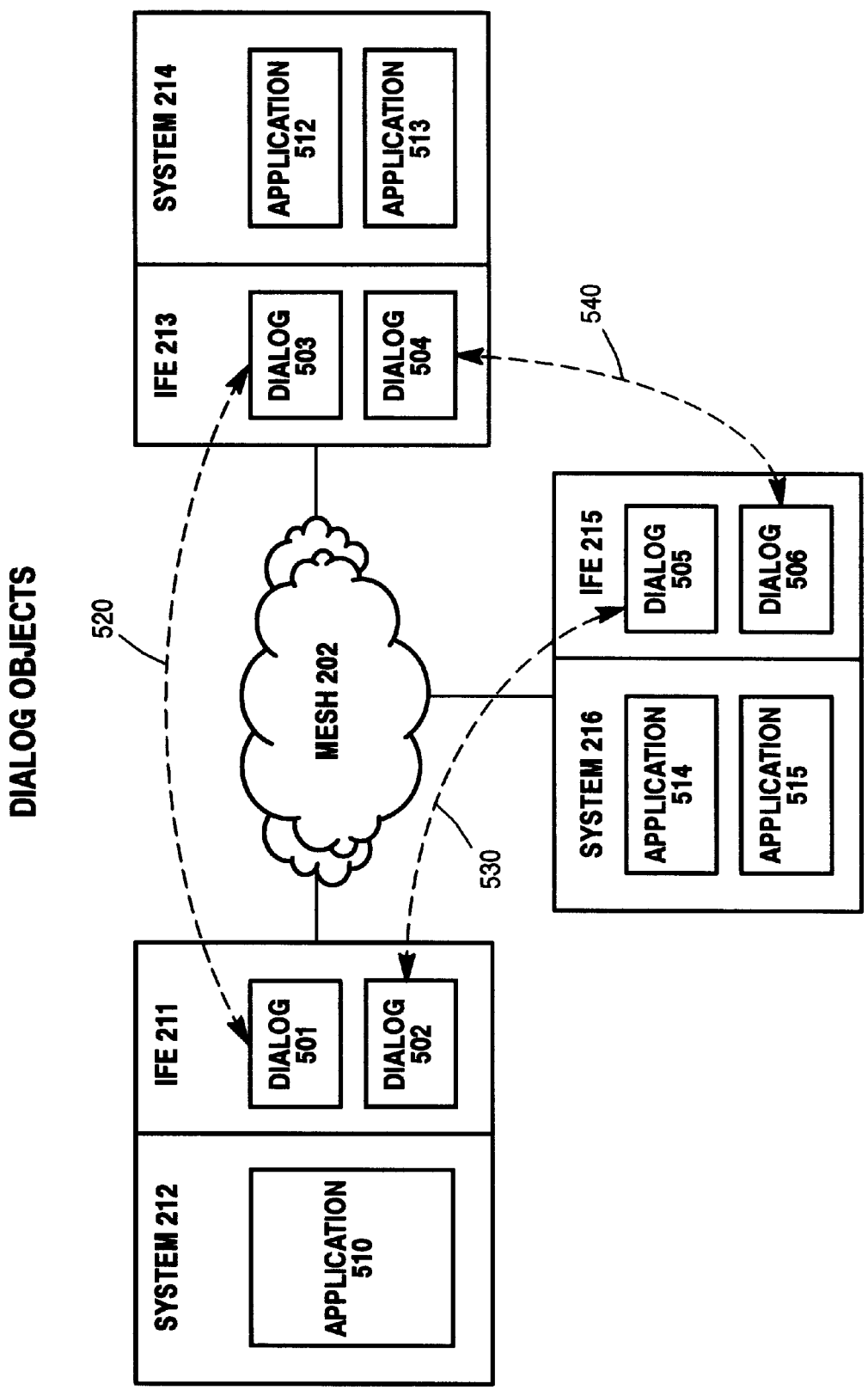
FIG. 5 is a schematic diagram illustrating DIALOG objects in a CIA architecture according to the present invention.

FIG. 5 shows the role of dialog objects 501–506 in a CIA communication system. Dialog objects 501–506 are data structures maintained by corresponding IFEs 211, 213, 215 which are used to represent full duplex communication circuits between applications 510–515. For example, application 510 runs in system 212 that has opened (e.g., created) two dialog objects 501, 502.

Logical dialogs 520, 530, and 540 are established between communicating clients. These logical dialogs 520, 530, 540 represent full-duplex communication circuits. According to the CIA communication system of the present invention, a logical dialog is established between corresponding dialog objects. For example, as shown in FIG. 5, application 510 and application 512 communicate (e.g., transfer data) over a logical dialog 520 that is established between corresponding dialog objects 501 and 503. IFE 211 maintains information in dialog object 501 that is used to coordinate the exchange of data with application 512 in system 214 via dialog object 503 in IFE 213. Likewise, IFE 213 maintains information in dialog object 503 that is used to coordinate the exchange of data with application 510 in system 212 via dialog object 501 in IFE 211.

An IFE supports data communication over more than one logical dialog. For example, to support logical dialog 530, IFE 211 also maintains information in dialog object 502 that is used to coordinate the exchange of data with application 514 in system 216 via dialog object 505 in IFE 215. Systems supporting multiple applications can also communicate over multiple logical dialogs. For example, logical dialog 540 provides data communication between application 515 running in system 216 and application 513 running in system 214. To support logical dialog 540, IFE 215 further maintains information in dialog object 506 that is used to coordinate the exchange of data with application 513 via dialog object 504 in IFE 213.

An IFE can utilize its own logical dialogs internally to support CIA semantics, for example, the creation of shadow objects (buffer pool shadows and pool manager shadows) and the cancellation of outstanding RCBs, as discussed further below.

2. Data Transfer

Figure 6A:
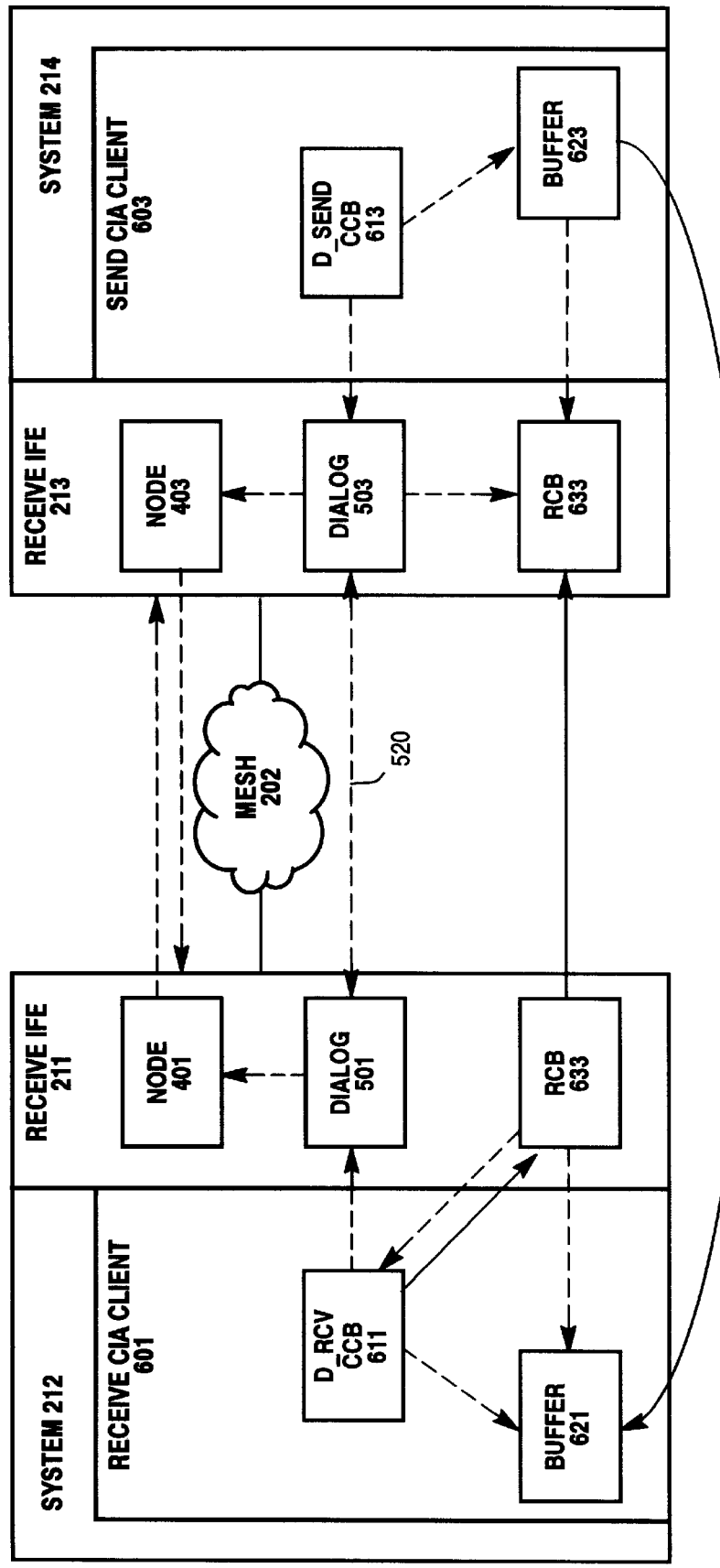
FIGS. 6A and 6B are schematic diagrams that illustrate examples of CIA objects used in receive with buffer type of CIA data communication, according to the present invention.
Figure 6B:
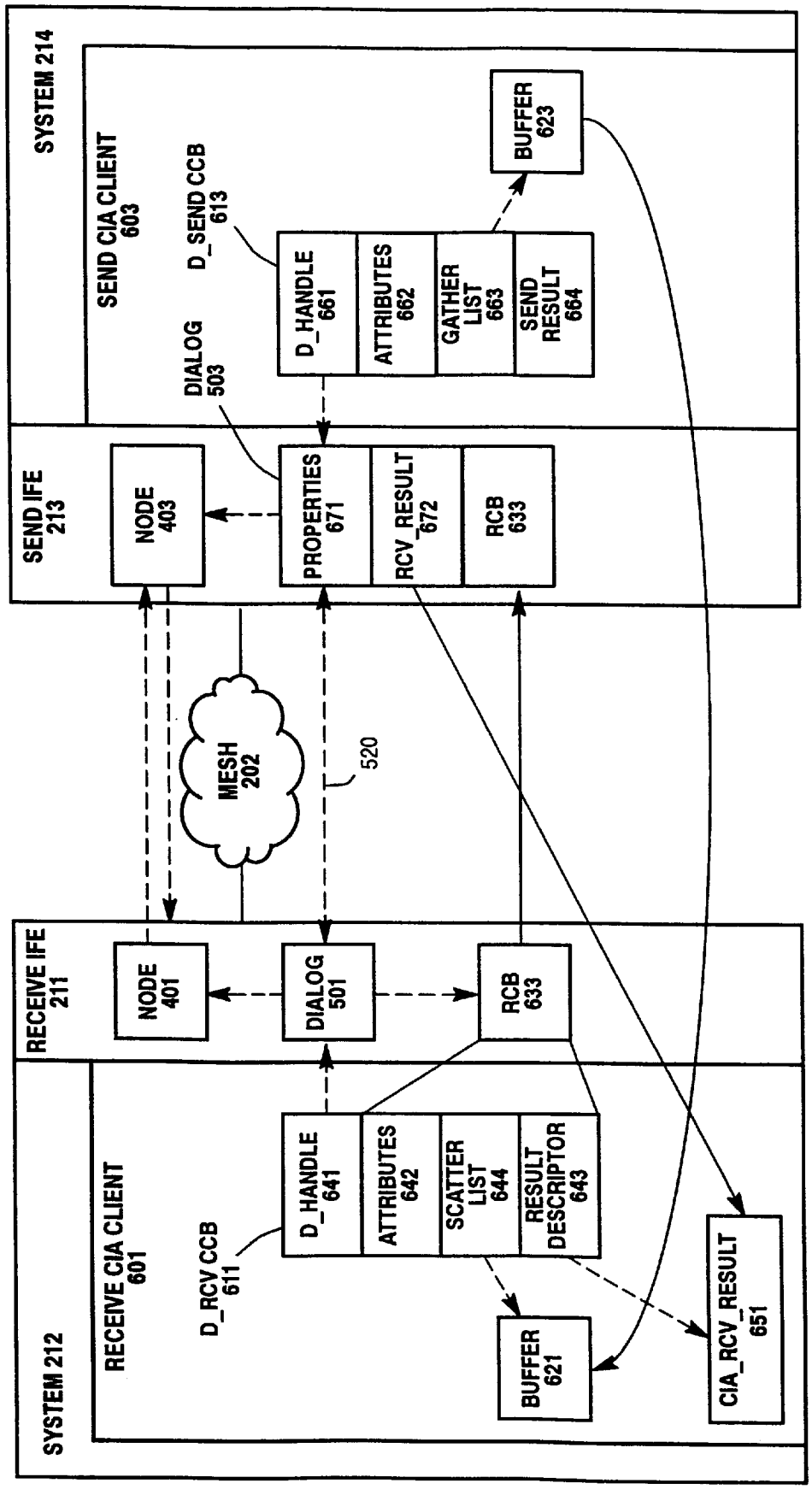
Figure 7A:
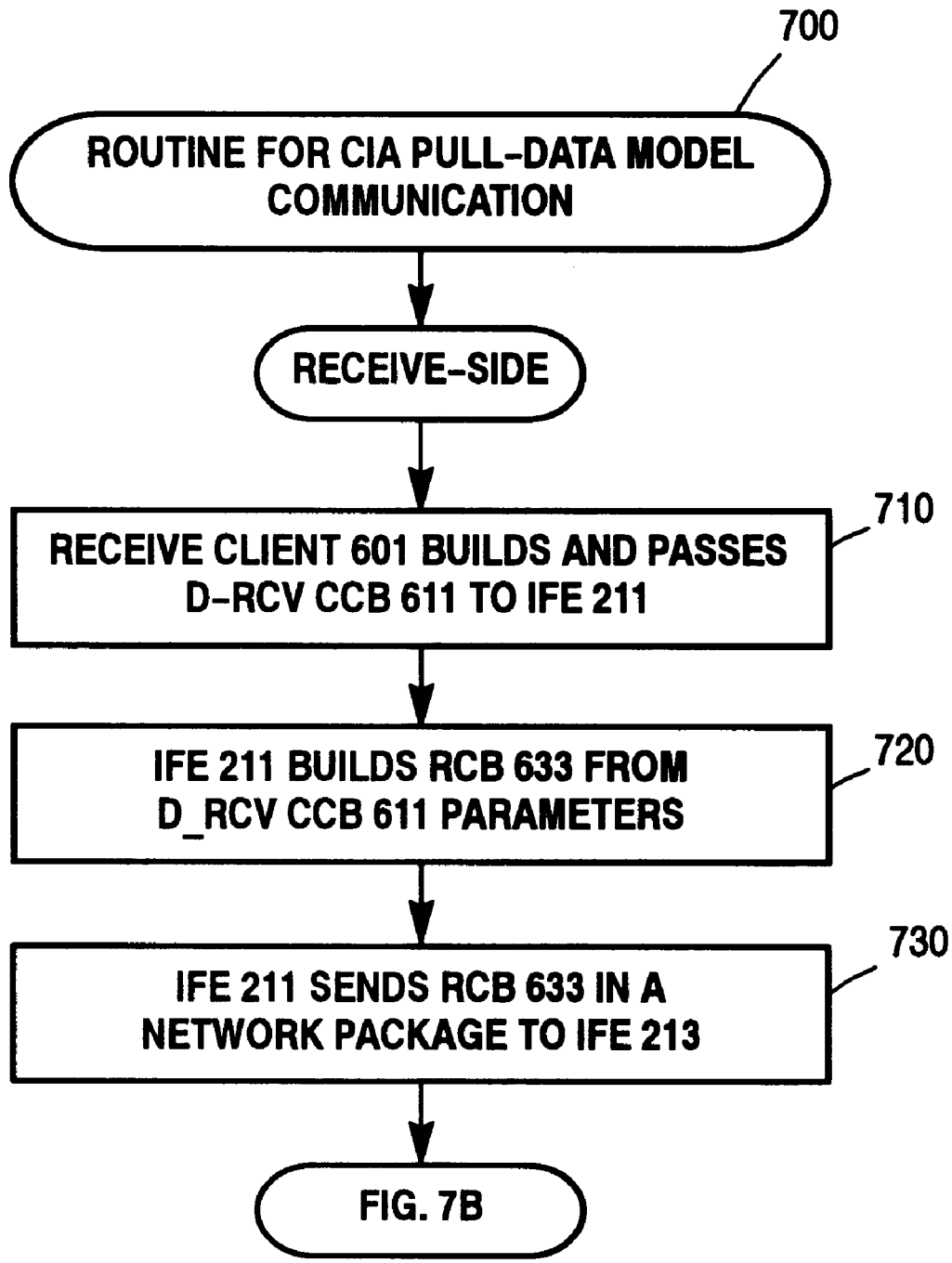
FIGS. 7A and 7B are flowcharts showing a routine for pull-model data communication, according to the present invention.
Figure 7B:
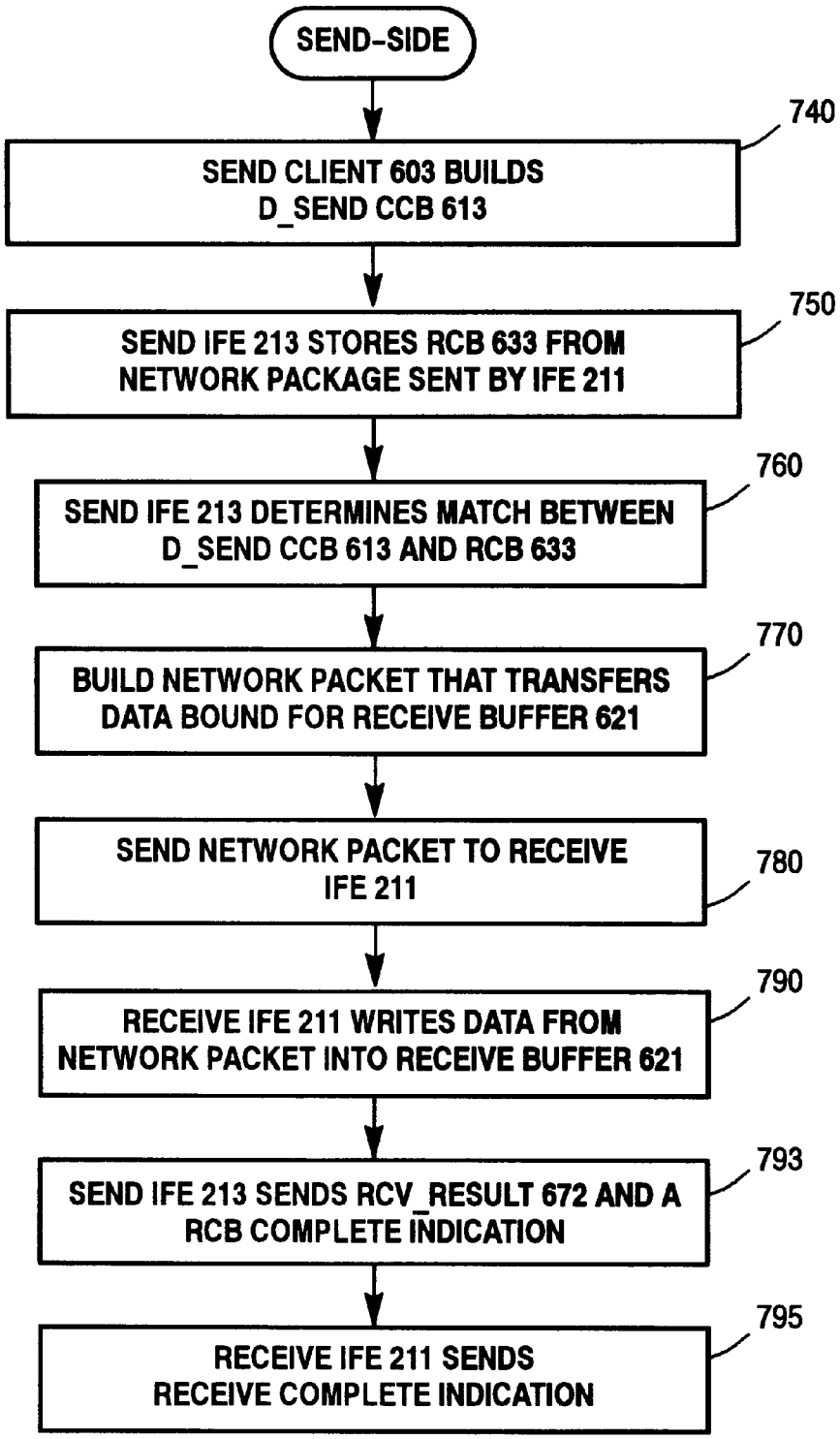
Figure 8:
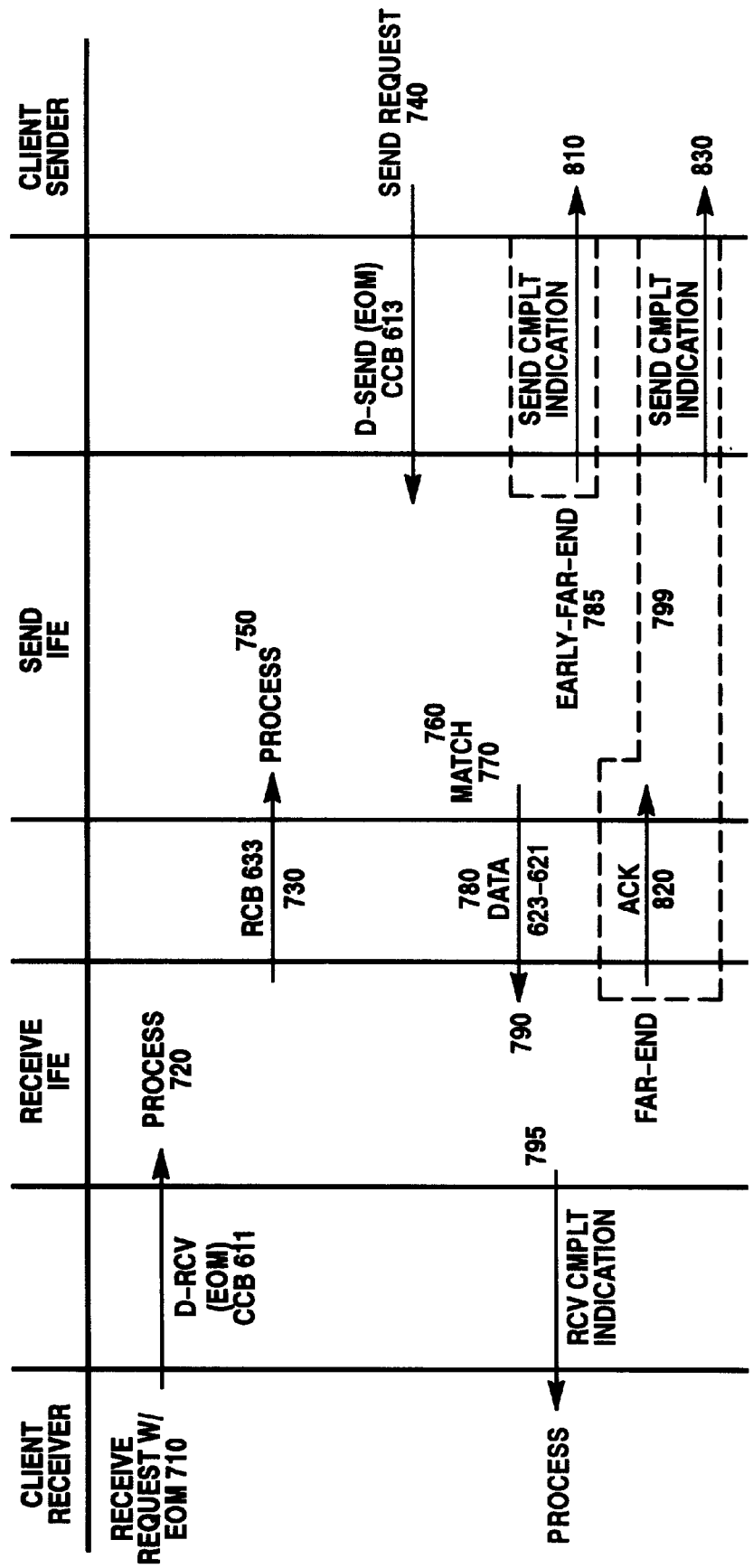
FIG. 8 is a flow diagram showing data transfer that further illustrates two classes of service (Early-Far-End and Far-End), according to the present invention.

An example of data transfer using a CIA pull data model, according to the present invention, is described below with respect to FIGS. 6 to 8. FIGS. 6A and 6B are schematic diagrams that illustrate components used in an example CIA data communication between two full-duplex communicating clients, labeled for convenience as, a receive client 601 and a send client 603. IFE 211 and IFE 213 present full-duplex CIA transport-layer facilities for their respective clients 601, 603, but for convenience, are referred to as receive IFE 211 and send IFE 213. FIGS. 7A and 7B are flowcharts showing a routine 700 for pull-model data communication. FIG. 8 is a flow diagram of CIA primitives and operations in the example CIA communication of FIG. 6 that further illustrates two classes of service (Early-Far-End and Far-End).

To carry out data communication between receive client 601 and send client 603, a logical dialog 520 is first established between dialog objects 501 and 503. CIA primitives (e.g., n_create and d_create) are used to create nodes 401, 403 and dialog objects 501, 503. CIA primitives (e.g, d_associate) are also used to associate dialog objects 501 and 503 with logical dialog 520. The operation of CIA primitives for node and dialog object creation is described in further detail below. CIA primitives and routines for establishing a logical dialog between two IFEs are also described in further detail below.

In FIGS. 6A and 6B, logical dialog 520 has been established between dialog objects 501 and 503. Accordingly, dialog object 501 includes a reference that identifies dialog object 503 in send IFE 213. Dialog object 501 also includes a reference that identifies node 401 which is associated with send IFE 213. Likewise, dialog object 503 includes a reference that identifies dialog object 501 in receive IFE 211. Dialog object 503 also includes a reference that identifies node 403 which is associated with receive IFE 211.

As mentioned above with respect to FIGS. 1A to 1C, CIA primitives are used to effectuate data communication over logical dialog 520. Receive and send types of CIA primitives (d_rcv, d_send) are used to transfer data. Different types of receive CIA primitives can be issued, depending upon the type of data transfer operation and transport service that is desired.

Routine 700 for CIA pull data model communication includes steps primarily carried out at a receive side, as shown in FIG. 7A, and steps primarily carried out at a send side, as shown in FIG. 7B. For clarity, routine 700 is first described with reference to one type of dialog receive CIA primitive (d_rcv) and one dialog send primitive (d_send). Other types of receive primitives for receiving data into buffer pools, and scattering data into buffers and/or buffer pools are described in further detail below. Other types of send primitives for data gathering are also described below after the example routine 700.

To receive data, receive client 601 builds and passes to receive IFE 211 a CIA control block CCB 611 that specifies a d_rcv primitive (step 710). The following Table describes an example d_rcv primitive for Receive with Buffer operations along with its principle parameters and their function:

| d_rcv primitive (Receive with Buffer) | |
|---|---|
| Parameters | Function |
| Opcode | Identifies CCB type (i.e., d_rcv with buffer primitive) |

-continued

| d_rcv primitive (Receive with Buffer) | |
|---|---|
| Parameters | Function |
| Dialog Handle | Identifies local dialog object corresponding to a logical dialog |
| Scatter List | Identifies one or more buffers and their lengths |
| Result Descriptor | Identifies a result location |
| Attribute Bit(s) | Identifies selected transport services (e.g., auto-receive, EOM flag) |

The opcode parameter indicates the CCB type. In this case, it would be the opcode value for the d_rcv with buffer primitive. The dialog handle identifies the local dialog object associated with the receive data operation. The scatter list parameter specifies one or more buffers (i.e., memory areas and capacity) for storing received data. For example, as shown in FIG. 6B, CCB 611 contains a d_rcv primitive that has an opcode field that identifies a d_rcv with buffer primitive, a dialog handle 641 that identifies dialog object 501, a scatter list 644 that points to buffer 621 and identifies the length (or size) of buffer 621 (e.g., 1 MB).

The result descriptor parameter 643 points to a result location. The result location is where a result structure 651 is stored that tracks d_rcv primitive result information. For example, the result descriptor can point to specific memory area (i.e., buffer 651) which is updated by the send IFE 213 (see FIG. 6B). In receive with buffer pool operations described below, the result descriptor can reference a specific buffer or a buffer pool via a pool manager reference.

The result structure 651 stores result information regarding the results of the d_rcv primitive along with additional information known at the send side in rcv_result field 672 (e.g., remaining data length, EOM, token). In this way, a send IFE 213 can inform the receive IFE 211 about conditions at the send-side of the interface which enables the receive IFE 211 to make intelligent data transfer requests (for example, by posting a d_rcv primitive for the remaining data length). The result structure can also include an end-of-message flag to identify whether an end-of-message was signaled by the send IFE.

According to another feature of the present invention, result structure 651 can further include a token value. Dialog receive notification mechanisms can utilize the token value to customize notification strategy. For instance, clients can use token values (e.g., 32 bit tokens) to multiplex multiple communication circuits over a single CIA logical dialog.

Attribute bits or fields 642 are used by the client to select specific receive semantics for the data transfer. For example, an Auto-Receive attribute bit can be selected to enable auto-receive semantics, as described in further detail below. An End-Of-Message Flag (EOM) indicates whether the d_rcv operation should use receive message or receive partial receive semantics.

In step 720, IFE 211 receives CCB 611 and executes it. Normally, this would result in IFE 211 building a receive control block RCB 633. In general, RCB 633 includes the d_rcv parameters passed in CCB 611 (except for the d_rcv opcode). Receive IFE 211 sends RCB 633 in a network packet to send IFE 213 (step 730). Receive IFE 211 has knowledge of the destination address of an available RCB location in the send IFE 213. This information was provided during dialog association. This allows receive IFE 211 to construct the network packet containing RCB 633 with the RCB data as well as its target location (i.e., destination address) in the send IFE 213.

For a send request, send client 603 builds a d_send CCB 613 that identifies a d_send primitive (step 740). A reference to d_send CCB 613 is passed to the send IFE 213. The following Table describes an example d_send primitive, along with its principle parameters and their function:

| d_send Primitive | |
|---|---|
| Parameters | Function |
| Opcode | Identifies CCB type (i.e., d_send primitive) |
| Dialog Handle | Identifies local dialog object corresponding to a logical dialog |
| Gather List | Identifies one or more buffers and their lengths, containing source data to be sent |
| EOM Flag | Selects send message (SendMsg) or send partial (SendPartial) send semantics |
| Result Token | Identifies result token value |

The opcode identifies the d_send primitive for a send data operation. Dialog handle 661 identifies the local dialog object involved in the data send operation. Gather List parameter 663 is a gather list that specifies zero or more buffers (i.e., memory areas) for retrieving source data.

Attribute bits or fields 662 (optional) are used by client to select specific send semantics for the data transfer. For example, an End-Of-Message Flag (EOM) indicates whether or not a send IFE should indicate EOM coincident with the transfer of a last byte of the source data. The Result Token parameter identifies a token value to be passed into the receiver's CIA_RCV_RESULT 651. Send result 664 is what send client 603 looks at to determine how much data was sent. Send result 664 is updated by send IFE 213.

For byte-stream oriented traffic, EOM delimiters are not necessary and the EOM flag is not set. For message-oriented traffic, the EOM flag is set. In this way, CIA 1000 can support both message-oriented and byte stream oriented traffic. According to a further feature of the present invention, described below in more detail with respect to FIG. 12, Partial Send and Partial Receive messages can also be used in CIA 1000 to optimize the support of both message-oriented and byte stream oriented traffic.

In step 750, when RCB 633 arrives, send IFE 213 stores RCB 633 in a predetermined area for the RCB 633 which is associated with dialog object 503 during dialog association. Steps 740 and step 750 are asynchronous and can be performed in any order. In other words, step 750 can also store RCB 633 prior to the time CCB 613 is built in step 740, as described further with respect to FIG. 9 below.

For clarity of illustration, FIGS. 6A and 6B only show one RCB 633. Multiple send and receive requests for data, however, can be outstanding, as described further below with reference to FIG. 10. To accommodate multiple outstanding RCBs, each RCB is placed in a queue (not shown) at send IFE 213.

In step 760, send IFE 213 determines when a match occurs between a queued RCB and an outstanding d_send primitive. A match occurs when an outstanding RCB and d_send primitive identify a common logical dialog. In the example shown in FIGS. 6A and 6B, a match occurs when RCB 633 and d_send primitive 613 exist as they both reference logical dialog 520.

In step 770, to transfer data, a network packet that binds the source data with the receive descriptor (e.g., memory address) for storing the data is built. Send IFE 213 gathers data (e.g., copies the source data) from the memory area (e.g., buffer 623) defined by the gather list parameter 663 provided in the d_send primitive of CCB 613. The receive memory address (e.g., buffer 621) is determined from the matching RCB 633, and in particular, from the scatter list parameter 644. In a networking environment where data is to be transferred over mesh 202, lower networking layers (not shown) construct a network packet. The network packet includes the bound data and receiver memory destination address provided by send IFE 213.

In step 780, the network packet built in step 770 is sent to receive IFE 211. Receive IFE 211 writes data from the network packet directly into buffer 621 (step 790). No data copies have to be made in this write-only operation. CIA 1000 can support any type of range-checking to verify addresses. Receive IFE 211 can use descriptor information in the network packet to verify that the range of addresses to be modified by the write data is allowed.

In step 793, send IFE 213 sends rcv_result 672 and a RCB complete indication. The data transfer, result transfer and RCB Complete indication can be passed in the same network packet. In step 795, receive IFE 211 sends a notification (also called a Receive Complete indication) that notifies receive client 601 (application 510 and/or system 212) that the d_rcv primitive is complete.

Steps 770 to 790 were described with respect to a networking environment. Alternatively, when receive and send clients share the same memory space, send IFE 213 (or other system component) can directly transfer the gathered data from buffer 623 to buffer 621 using a memory copy operation.

Thus, a transport level data communication service is provided which is independent of the underlying physical intraconnect technology. In other words, CIA 1000 interface (the message system and set of CIA primitives and semantics as described herein) operates between communicating clients independent of the lower networking layers and protocols, such as, ATM, Fiber Channel, and ServerNet™. Using CIA pull data model communication, data is only sent to identified receiver memory address space. Flow control problems are eliminated since no intermediate buffering of unexpected data is required. This CIA pull data model reduces overall latency at the transport level and leverages improvements in the reliability of network transmission and delivery systems.

In addition, multiple, full duplex, reliable virtual circuit connections (i.e., multiple logical dialogs) can be provided for each node. Multiple dialog objects can reference a single node. Multiple outstanding CIA primitive operations are allowed on each dialog. Dialogs can handle byte stream or message oriented data.

Dialog operations and features including, but not limited to, scatter and gather support, Early-Far-End and Far-End send classes of service, automatic recurring receive option, partial sends and receives messages with substantially no restrictions on send/rcv lengths, and multiple dialog priorities are described in even further detail below.

3. Gather

A dialog send primitive (d_send) allows source data to be sent. This source data can be gathered from multiple separate memory areas into a single byte stream. The Gather List parameter in a d_send primitive can be an ordered list of elements which are used to perform data gather. Each element identifies a user-specified memory area (e.g., buffer) from which to gather data. For example, each element in the order list specifies a memory address and memory length for a data element. A send IFE then gathers each data element in the sequence specified by the ordered list parameter.

According to the present invention, the different types of d_send primitives each allow the sharing of source message areas between outstanding d_send primitives. The d_send primitives do not modify (even temporarily) the source memory areas.

4. Scatter

A dialog receive primitive (d_rcv) allows source data to be accepted and scattered into multiple separate memory areas. The Scatter List parameter in a d_rcv primitive can be an ordered list of elements which are used to scatter data. Each element identifies a user-specified memory area (e.g., buffer) in which to scatter data. For example, each element in the Scatter List specifies a memory address and memory length (Address/Length pair) for a data element.

Likewise, when a d_rcv with Buffer Scatter primitive is issued, a corresponding Receive Control Block (RCB) structure is generated which includes an additional Scatter List field (also called Area List). The Scatter list field stores the Scatter List parameter, that is, the ordered list of elements (e.g., Address/Length pairs) which are used to scatter data.

A send IFE then binds data into the scattered memory areas specified by each element in the Scatter List parameter. In this way, a received message is scattered by a receive IFE into memory areas (or free buffers in buffer pools) according to the lengths and types indicated in the scatter list. A scatter list can support any number of elements. With buffer pool operations, if a free buffer is filled before the current scatter list element is satisfied then another free buffer is used to complete that portion of the scatter list. The result structure includes a buffer list which describes the receive data to buffer(s) mapping.

5. Send Classes of Service (Early-Far-End and Far-End)

As mentioned above with respect to FIGS. 6, 7A and 7B, a logical dialog has a send class of service attribute which is specified when the dialog is associated. Early-Far-End and Far-End send classes of service are provided. These two send classes of service are described in further detail with respect to an example process flow diagram (FIG. 8).

FIG. 8 is a flow diagram showing CIA process steps for handling a data request (receive request 801) and a send request (send request 803). FIG. 8 illustrates the process steps 710 to 797 described above in the example CIA communication of FIGS. 6, 7A, and 7B. Accordingly, a description of these process steps need not be repeated.

FIG. 8 further illustrates steps 810–830 used to indicate a send completion in Early-Far-End and Far-End services. When a user requests Early-Far-End service, send IFE 213 sends a Send Complete indication to send client 603 (step 810). Send IFE 213 can send the Send Complete indication to the send client 603 before, at the same time, or after the network packet has been built at the send side, as long as, send IFE 213 is no longer using local send client resources (including any transmission retries).

In step 820, when a user requests Far-End service, receive IFE 211 sends an Acknowledgment packet to send IFE 213 at about the same time or after a Receive Complete indication has been issued. Send IFE 213 then sends a Send Complete indication to send client 603 in response to receiving the Acknowledgment packet (step 830).

These two classes of service, Early-Far-End and Far-End, support different degrees of integrity. Early-Far-End is sufficient when loss of data is very rare or ignored. Accordingly, Early-Far-End service is appropriate when the mesh infrastructure is exceedingly robust, or when the dialog is operating in a datagram mode. On the other hand, for Far-End service the Send Complete indication guarantees that the data has been received successfully. A remote side of a CIA interface can have a different send class of service from the local side of the CIA interface.

Early-Far-End performs better than Far-End because the local IFE does not require an explicit acknowledgment from the remote IFE. This allows a locally initiated send operation to complete earlier and reduces the amount of traffic across the intraconnect.

A dialog based flow control is implied for each send class of service. For the Early-Far-End and Far-End classes of service, the dialog is logically back pressured until the receiving endpoint requests the data transfer.

6. Ordering of Send and Receive Requests

Figure 9:
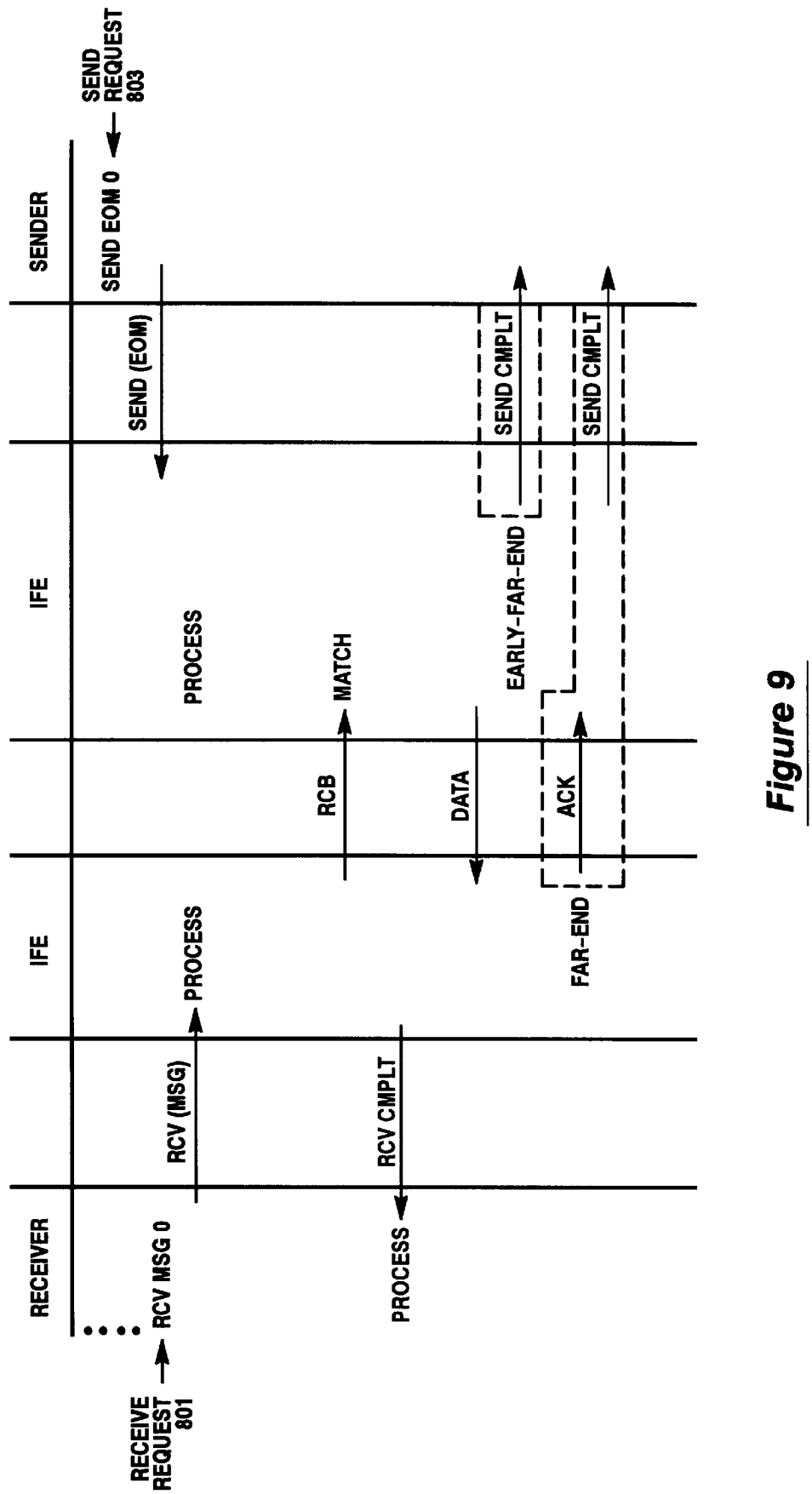
FIG. 9 is a flow diagram for a data transfer like FIG. 8 except a send request precedes a receive request.

In the data transfer example described with respect to FIG. 8, receive request 801 preceded send request 803. In general, send and receive requests for a logical dialog can be issued by communicating clients in any order. FIG. 9 is a process flow diagram similar to FIG. 8, except that send request 803 is issued before receive request 801.

7. Multiple Outstanding Send and Receive Requests

According to a further feature of the present invention, CIA 1000 can process multiple outstanding send and receive requests. As mentioned above, a send IFE queues outstanding RCBs and d_send primitives. A matcher module in the send IFE determines when a match is made. Preferably, a first-in-first out type queuing scheme is used such that RCBs and d_send primitives at the head of a queue are matched first.

Multiple dialog send primitives (d_send) can be posted for a dialog. d_send primitives which are posted to the same dialog generally complete in the order in which they were posted to that dialog.

Multiple dialog receive primitives (d_rcv) can be posted for a dialog. d_rcv primitives generally complete in the same order as which they were posted to a dialog, and in the same message order as matching d_send primitives were posted. Additional facilities can be provided to process d_send primitives and d_rcv primitives out-of-order.

Figure 10:
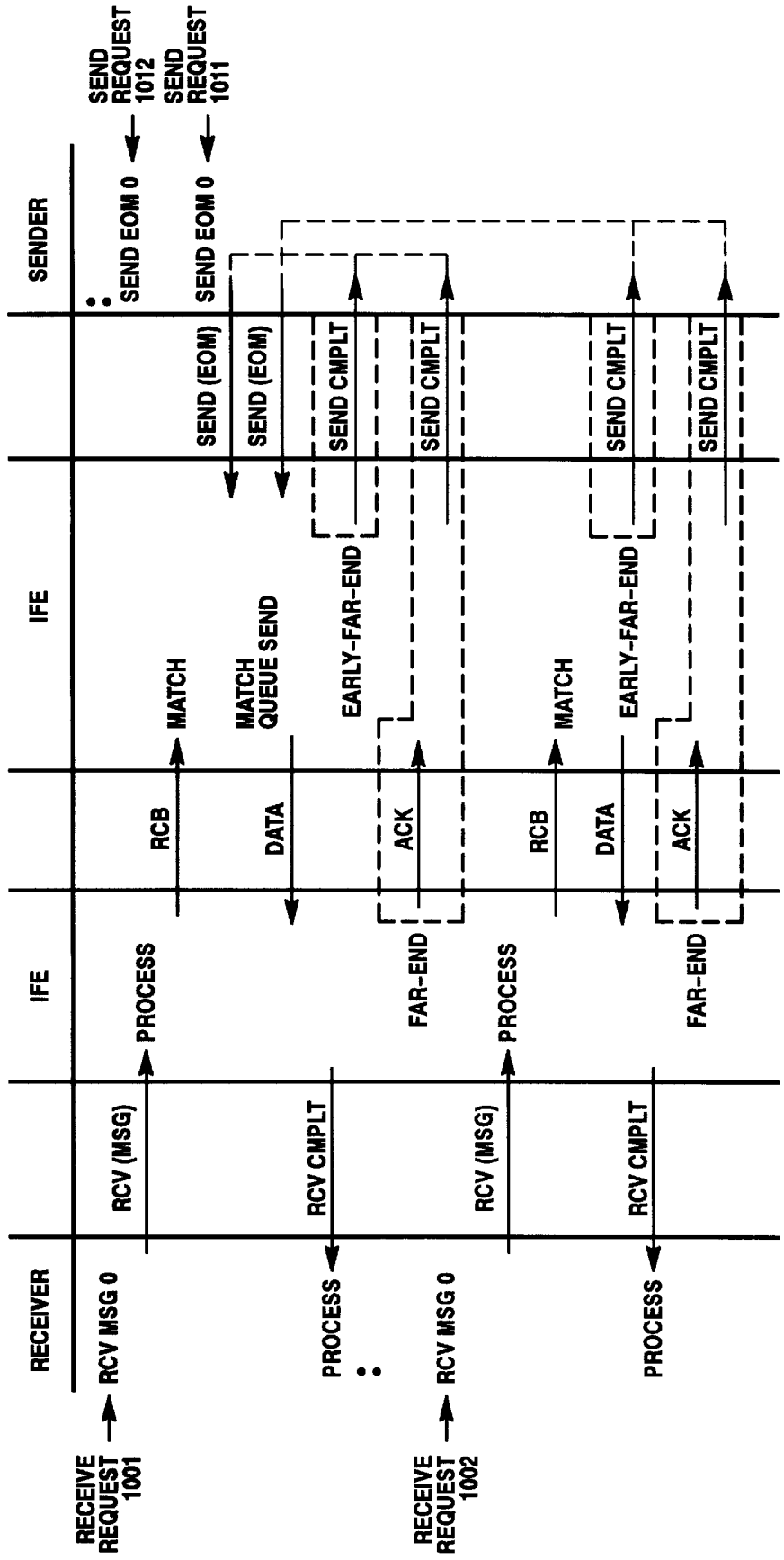
FIG. 10 is a flow for data transfer that illustrates multiple receive and send requests, according to the present invention.

FIG. 10 is process flow diagram that illustrates an example of how the internal queuing and matching in CIA pull data model accommodates multiple outstanding requests. In this case, two receive requests 1001, 1002 and two send requests 1011, 1012 are issued.

8. Auto-Receive and Auto-Send

An Auto Receive primitive (RcvAuto) is also provided in the set of CIA primitives 1200. The RcvAuto primitive is an automatically recurring variant of a dialog receive primitive, e.g., the d_rcv primitive described above having an auto-receive attribute bit set. The RcvAuto primitive allows a recurring data receive request to be issued. Data can then be received on an automatically recurring basis into user specified memory areas.

The RcvAuto primitive is helpful is removing bottlenecks on a dialog while eliminating a significant amount of receive latency. A receiving client posts a single RcvAuto CCB to a dialog. The receive IFE generates a single RCB corresponding to the RcvAuto CCB and transfers it to the send IFE. The send IFE then sends data repeatedly using that single RCB. Thereafter, the receive IFE continuously receives incoming data packets at the same memory area identified by the RCB. These data packets can include complete and/or partial messages as described below. When a dialog is transferring data using auto receive, many Receive Complete indications may be indicated for the same CCB. In a sense, a single RcvAuto primitive "completes" many times over.

Auto receive operation is especially useful for transmitting isochronous data streams, such as, real-time multimedia. Applications where continuous updates are required such as a "stock-ticker" can also be used to write updates on an automatically recurring basis.

Figure 11:
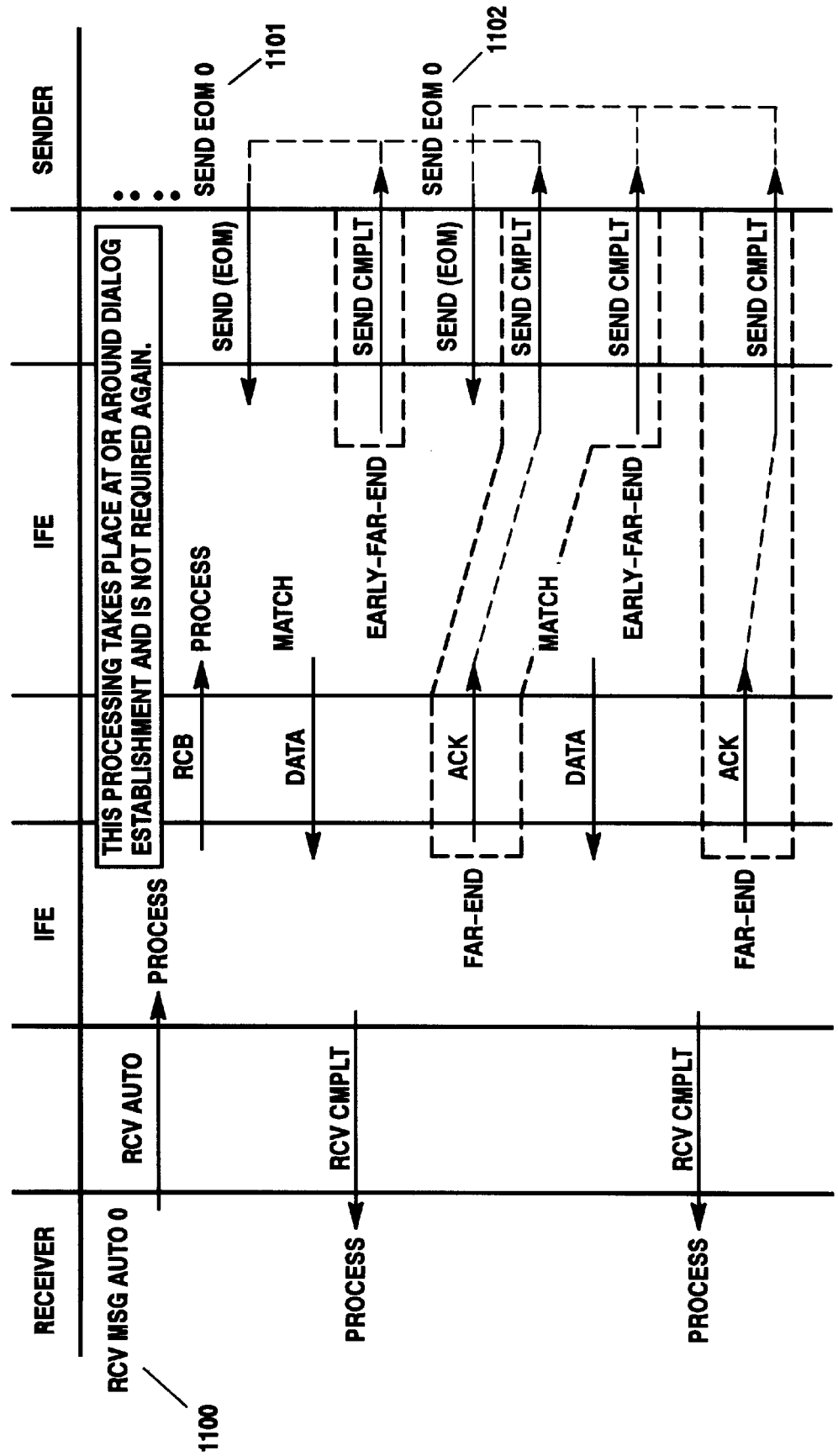
FIG. 11 is flow diagram that illustrates an example auto receive primitive operation, according to the present invention.

FIG. 11 is a message flow diagram illustrating an example of an auto receive primitive operation. An auto receive request 1 100 is shown completing two consecutive send requests 1101, 1102.

Further variants for automatically receiving data into buffer pools are described with respect to buffer pool operations below. In particular, an automatically recurring variant of d_rcv is provided for receiving exclusively into buffer pools. An automatically recurring variant of d_rcv is provided for scattering into any combination of buffer pools and user specified memory areas, as described below. Auto-Receive operation can be used to simulate a push data model within a pull data model, further eliminating a significant amount of receive latency.

Likewise, an auto_send primitive (optional) can also be provided in the set of CIA primitives 1200. The auto_send primitive is an automatically recurring variant of a dialog send primitive having an auto_send attribute bit set. The auto_send primitive allows a recurring send request to be issued. The data in the same source areas data can then be sent on an automatically recurring basis to fulfill multiple data receive requests.

9. Partial Messages (Partial Receives and Partial Sends)

CIA 1000 supports message-oriented and byte-stream oriented data transfer semantics. A d_rcv primitive bit has an attribute bit called EOM. When the EOM bit asserted then the receive will complete when an end of message indicator is received from the sender. Data that arrives that exceeds the capacity of the buffer areas described by the scatter list prior to receiving the EOM indication is discarded by sender. Hence, the excess data is never sent, but the loss of the excess data can be reported to the receiver.

If a d_rcv primitive does not have the EOM bit asserted, it will complete when the data area indicated by the scatter list is full or when an EOM is received. The d_rcv primitive without the EOM bit asserted is also called a partial receive.

For send operations, the send operation completes when the data has been transferred. A d_send primitive has an attribute bit called EOM. When the EOM bit in the d_send is asserted, then the end of a message is sent coincident with the last byte in the source data. The send IFE uses the EOM attributes specified in the matching RCB and the d_send CCB to implement the correct d_rcv semantics.

If a d_send primitive does not have the EOM bit asserted, the matching RCB will complete only if the RCB is a receive partial and the scattered areas have been filled. Since multiple RCBs can be outstanding, when a receive partial completes, data transfer will continue using the next available RCB. The d_send primitive without the EOM bit asserted is also called a partial send or send partial.

Figure 12:
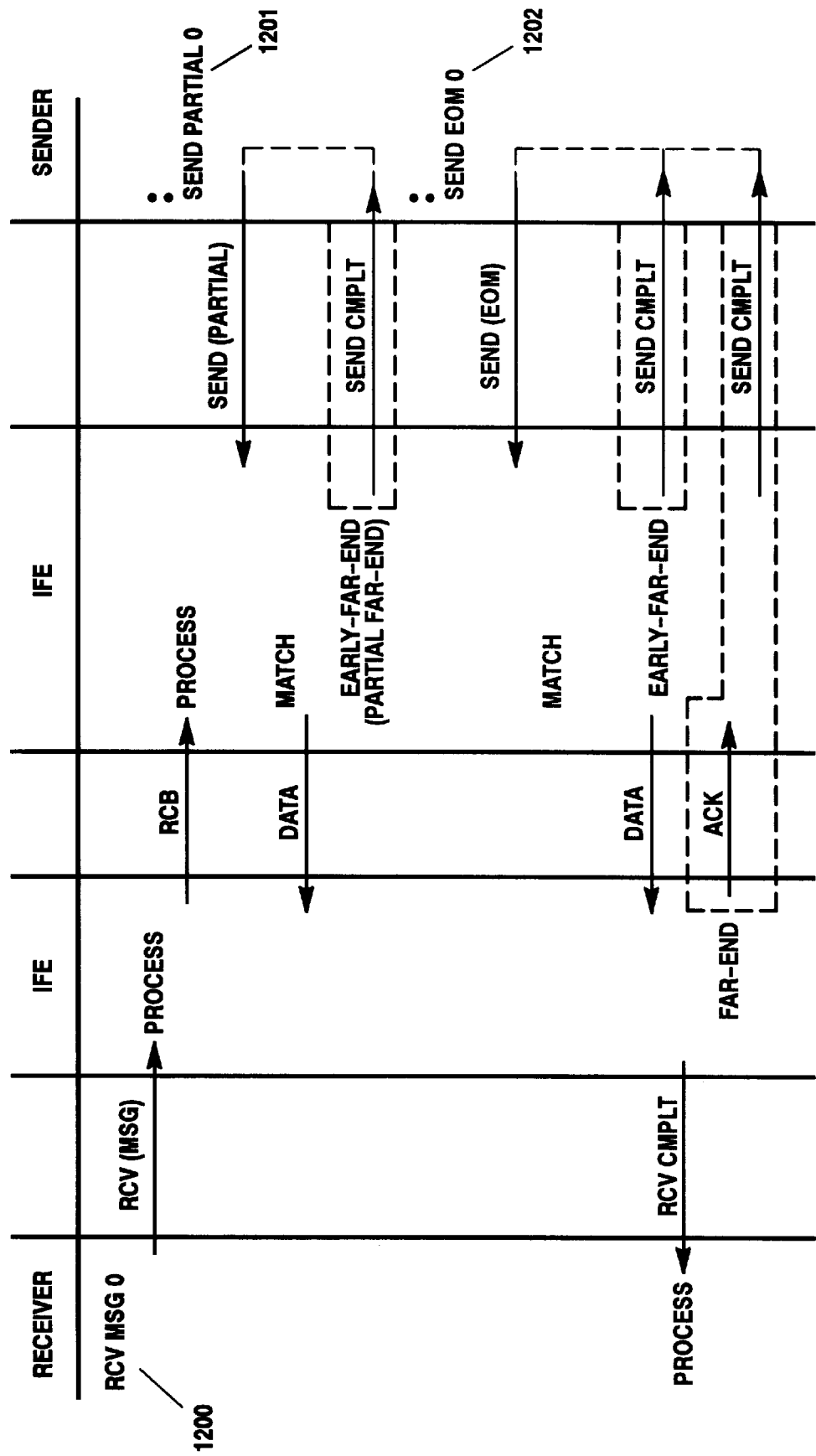
FIG. 12 is a flow diagram that illustrates an example of data transfer using partial messages, according to the present invention.

FIG. 12 is process flow diagram illustrating an example of a data transfer operation involving send partial primitives (SendPartial 1201) and send end-of-message EOM primitives (SendEOM 1202). In this example, receive data request 1200 is posted with a total length larger than the combination of partial send primitive 1201 and send EOM primitive 1202. Therefore, receive request 1200 does not complete until the data transfer associated with both send primitives 1201 and 1202 has occurred.

According to a further feature of the present invention, Far-End completion behavior of the SendPartial 1201 is modified to expedite completion of SendPartial primitives. Since a RcvMsg can not complete until the SendEOM is delivered, the Far-End completion of the SendPartial would be delayed unreasonably. This delayed completion behavior for SendPartial is disallowed by forcing all SendPartials to complete in an Early-Far-End manner (also called Partial-Far-End) as shown in FIG. 12.

Figure 13:
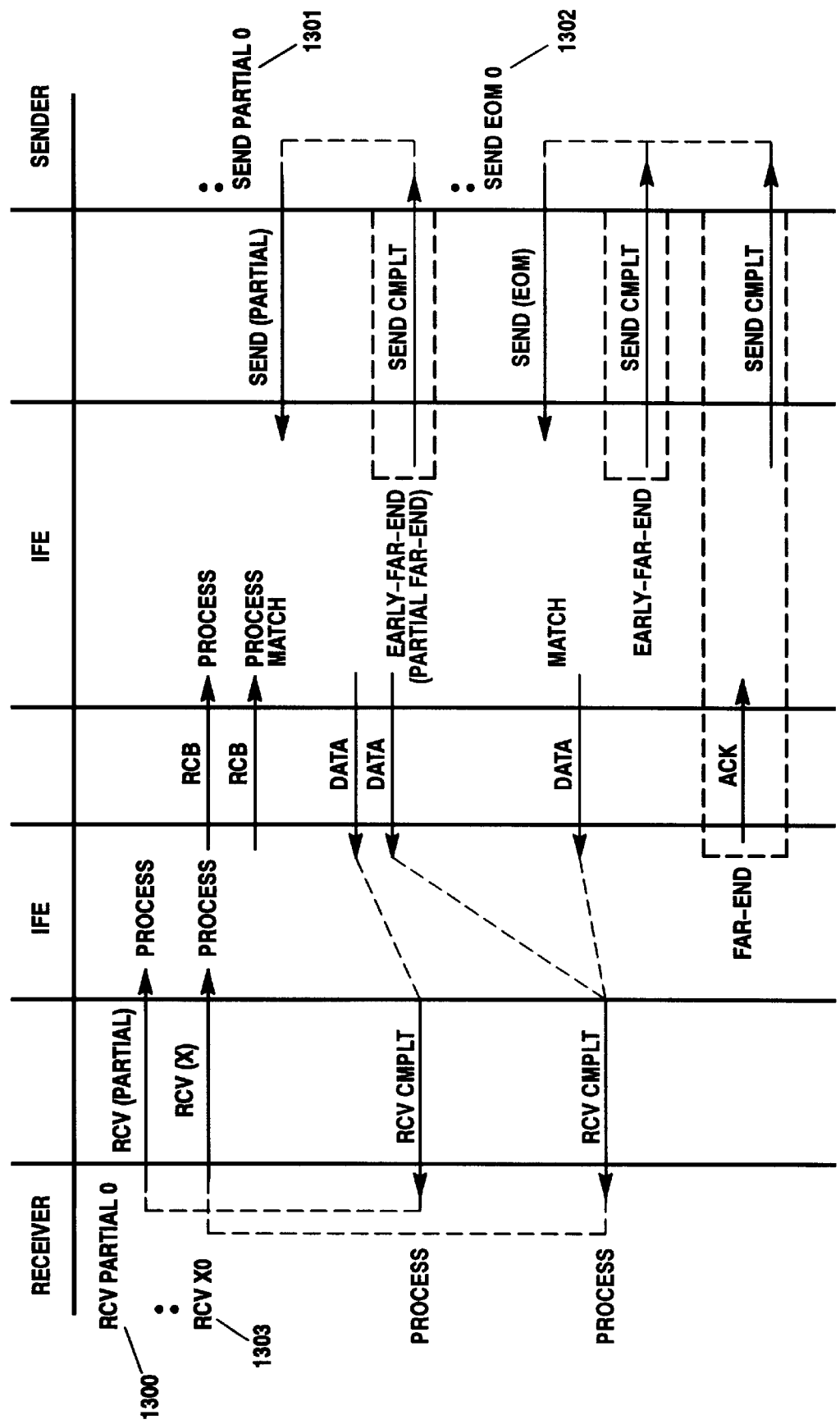
FIG. 13 is a flow diagram that illustrates an example of data transfer using a combination of partial messages and EOM messages, according to the present invention.

FIG. 13 is process flow diagram illustrating an example of a data transfer operation involving a combination of partial receive and partial send primitives (RcxPartial, SendPartial). A receive partial request 1300 and RcvX( ) request 1303 are shown being completed by a partial send 1301 and a send EOM 1302.

Transfer lengths specified by d_send w/o EOM and d_rcv w/o EOM have no direct relationship to each other. That is, the data within a message is treated as a byte stream. The intermediate portions of a message created by the Sender using the send partial variant of d_send can not be distinguished by the receiving client. The intermediate portions of a message received by the Receiver using the receive partial variant of d_rcv can not be distinguished by the sending client.

10. Dialog Priority Attributes

A dialog has a dialog priority attribute. There can a number of dialog priorities (e.g., 15). When multiple matches exist, a send IFE uses the dialog priority to determine the order of servicing the competing dialogs. Fairness is arbitrated at the send side of the interface and is arbitrated round-robin within a dialog priority. Dialog priority can be sent independently on each side of a logical dialog. The dialog priority attribute can be stored as part of the dialog object or specified as a parameter to the d_send primitive. Other quality of service features can be provided (e.g., guaranteed dialog bandwidth).

5. CIA Management

As mentioned with respect to FIG. 1A, Communication Interconnect Architecture 1000 further includes a CIA management service (CIA-MS) 1300. CIA management service 1300 coordinates shared CIA objects and common services between CIA clients. For example, CIA clients can share IFE and NODE objects, since independent CIA clients may have dialogs created on the same local IFE which are associated with the same NODE object.

Services provided by CIA-MS 1300 are related to node and dialog establishment/termination and management. The operation of different CIA primitives related to establishing, terminating, and managing IFEs, nodes, and dialog objects is described below.

a. Node Primitives and Notifications

A node create primitive (n_create) is used by CIA-MS 1300 to create a node object. The primitive indicates the node_id (e.g., a MAC id) and node_interface (i.e. in the remote environment) that the node object is to be associated with. If the node object is created successfully then a unique handle to this node object is returned. The node handles are unique within a specific IFE, but they are not necessarily unique across IFEs.

A node destroy primitive (n_destroy) is used to destroy a node object. The primitive indicates a node handle. Any outstanding primitives associated with this node object (e.g., d_send/d_rcv primitives for a dialog associated with this same node) are canceled. Buffer pool, pool manager and dialog objects that were associated with the node object are also destroyed.

A node notify restart primitive (n_notify_restart) is issued to notify a remote IFE that the local IFE has been restarted. The primitive indicates a node handle of the remote IFE that is to be notified. Whenever the local IFE is reset (via i_reset primitive discussed below) the local host should issue this primitive to every other IFE on the intra-connect (could limit it to the nodes on which it had previously been associated). A remote system uses the corresponding notification to terminate any previous activity (i.e., outstanding primitives) that it had posted for the remote IFE which was reset.

Notification implementations are a function of the host operating environment. A node restart notification (CIA_NODE_RESTART_NOTIFICATION) is issued to indicate that a remote IFE has issued a n_notify_restart to this system. The notification includes the node_id and node_interface of the remote IFE that issued the restart.

A node greet primitive (n_greet) is used as a first level greeting between IFEs. The primitive indicates a node handle of the remote IFE that is to be greeted, a dialog handle of the dialog that is to be used as the user level management dialog, and a uniqueness value used to detect stale greetings. This primitive is used to cause a notification (CIA_NODE_GREET_NOTIFICATION) (kind_associate=FALSE) on the remote system. At most one n_greet primitive can be issued per node object. It is only valid to initiate the primitive after an n_create primitive has been issued for the node object.

A node associate primitive (n_associate) is used as a second level greeting between IFEs that is used to establish node to node communication. The primitive indicates a node handle of the remote IFE that is to be associated, and the greeting internals that were received from the remote IFE. This primitive is used to cause a CIA_NODE_GREET_NOTIFICATION (kind_associate=TRUE) on the remote system. At most one n_associate primitive can be issued per node object. It is only valid to initiate the primitive after an n_greet primitive has been issued for the node object and a greeting indication has been received from the remote node.

A node bound primitive (n_bound) is used to indicate to the local IFE that the remote node has completed node association (i.e., the local node has received a greeting with kind_associate=TRUE). The primitive indicates a node handle of the remote IFE that has completed node association. At most one n_bound primitive can be issued per node object. It is only valid to initiate the primitive after an n_associate primitive has been issued for the node object and a greeting indication (kind_associate=TRUE) has been received from the remote node.

A node greet notification (CIA_NODE_GREET_NOTIFICATION) indicates that a remote IFE has issued a n_greet or n_associate primitive to this system. The notification indicates the node_id and node_interface of the remote IFE that issued the greeting. It also indicates via a boolean value (kind_associate) whether the remote IFE issued a n_greet or n_associate primitive. The notification also indicates greeting internals which are used to complete user level management dialog and node association, as described in further detail below respect to FIG. 15.

A node fault notification (CIA_NODE_FAULT_NOTIFICATION) is used to indicate that communication with a remote IFE associated with a node object has been lost. The notification indicates a node_id, node_interface, IFE specific reason code, and context parameter. The node_id and node_interface values indicate the NODE that failed. The reason code can be used to help diagnose the cause of the node fault. The context parameter value is a host defined value that refers to this IFE instance. The context value is passed to the IFE by the i_reset primitive.

b. Dialog Establishment, Termination, and Notification

1. Type 1

In one embodiment, CIA clients use selected CIA primitives for establishing logical dialogs according to a Type 1 dialog establishment service. A client using type 1 dialog establishment service would draw from the following CIA primitives to carry out dialog operations: d_create, d_associate, d_shutdown, d_destroy, d_zinfo, and d_interlock. First, it is helpful to briefly summarize the parameters and operations of each of these dialog primitives.

A dialog create primitive (d_create) is issued to create a dialog object on a local IFE. The d_create primitive indicates the dialog descriptor that should be used when a dialog fault is indicated for the newly created dialog object. Other dialog control options can be included, such as, priority, send class of service, whether dialog fault option is enabled/disabled, send cancel semantics, and dialog fault notification information. The d_create primitive also provides a count of the number of outstanding d_rcv primitives that are likely to be posted at any one time for this dialog. For dialogs that use an AUTO variant of the d_rcv primitives (e.g., RcvAuto) this count should normally be 1. If the dialog object is created successfully then a unique dialog handle to this dialog object is returned, and dialog association information (i.e., dialog internals) is also returned. The dialog handles are unique within a specific IFE, but they are not necessarily unique across IFEs.

A dialog associate primitive (d_associate) is used to associate a local dialog object with a remote dialog object. The d_associate primitive indicates a dialog handle, a node handle, and remote dialog internals. The indicated dialog must not be already associated. A status is returned which indicates whether the association was successfully completed.

A dialog shutdown primitive (d_shutdown) is issued to gracefully terminate outstanding primitives associated with a dialog. The primitive indicates a dialog handle. The primitive invokes a graceful cancel of all outstanding primitives associated with the indicated dialog. The primitive does not signal completion until all other primitives associated with the indicated dialog have signaled completion.

A dialog destroy primitive (d_destroy) is issued to destroy a dialog object. The d_destroy primitive indicates a dialog handle. This primitive does not gracefully close the dialog, because buffer pool resources which have been bound for outstanding d_rcv primitives associated with the indicated dialog may not be properly returned. The d_destroy primitive invokes the completion routine with a canceled status indication for any primitive still posted for the dialog (other than this primitive itself). The indicated dialog object is deleted.

A dialog information primitive (d_zinfo) is issued to retrieve needed dialog information (for subsequent association) from d create result parameters.

A CIA dialog fault notification CIA_DIALOG_FAULT_NOTIFICATION is a notification for indicating that a dialog fault condition has occurred. The notification indicates a host context and dialog descriptor values along with an IFE implementation specific reason code.

Dialog destroy primitive(s) and semantics will be automatically executed for the dialog if CIA_DIALOG_FAILURE_NOTIFICATION is indicated and a terminate_on_d_fault option is enabled. A dialog attribute (terminate_on_d_fault) selects whether data transfer dialog fault causes dialog failure termination (i.e., d_destroy semantics are run on the dialog automatically).

Data transfer faults for a dialog are indicated via the dialog fault notification. Data transfer failure causes the active d_send/d_rcv primitive to indicate a "no-go" condition to the notification entity. Data transfer fault occurs after the underlying mesh has attempted all error recovery and retransmission actions without success.

Figure 14A:
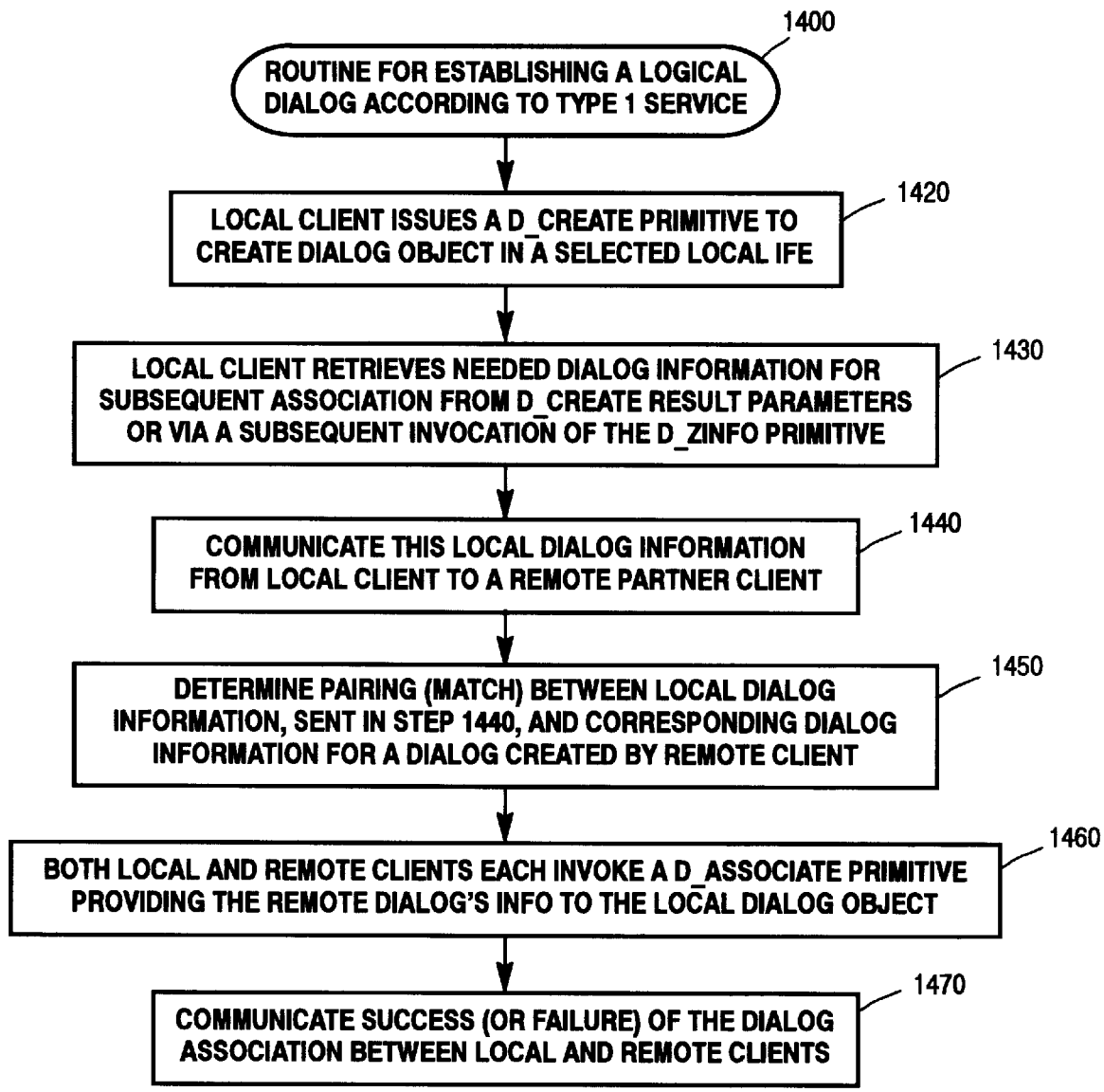
FIG. 14A shows an example routine for establishing a logical dialog in a Type 1 service according to the present invention.

FIG. 14 shows an example routine 1400 for establishing a logical dialog according to Type 1 service between two clients (e.g., a local client and a remote client). In a Type 1 dialog establishment service, after completing initialization (e.g., by executing CiaInitiate, CiaIfeEnum, CiaIfeOpen routines as described below), the local client issues d_create primitive to create the dialog object in a selected local IFE (step 1420). The local client then retrieves dialog information needed for subsequent association from d_create result parameters, or via a subsequent invocation of the d_zinfo primitive (step 1430). For example, this local dialog information can include, but is not limited to, fields identifying a local dialog object.

In step 1440, the local client then communicates this local dialog information to a remote partner client. Each client using type 1 dialog establishment has private means other than this interface (perhaps another already established CIA dialog) by which to communicate local dialog information (such as the local dialog information retrieved in step 1430) to a remote partner client.

The remote client has likewise created a dialog and retrieved corresponding dialog information (called remote dialog information) identifying a remote dialog object. In step 1450, the remote client (or any other module private to both the local and receive clients) determines a pairing (matching) of these dialogs based on the local dialog information sent from the local client in step 1440 and the remote dialog information generated at the remote client. After determining the match, each client invokes the d_associate primitive to provide the remote dialog information to the local dialog object (step 1460). The success (or failure) of the association is communicated between the clients by means private to the clients (step 1470). At this point, the dialog is established and data transfer over the dialog can proceed.

Clients using Type 1 dialog establishment are likewise responsible for coordinating termination of the dialog using whatever means at their disposal. Usage of d_shutdown and d_interlock may be required to effect cancellation of outstanding operations against this dialog. The client then invokes the d_destroy primitive to destroy corresponding dialog objects.

2. Type 2

In another embodiment, CIA clients can establish logical dialogs according to a Type 2 dialog establishment service. A client using type 2 dialog establishment service would draw from the following CIA primitives to carry out dialog operations: d_create, d_destroy, d_zinfo, CiaDialogConnect, and CiaDialogDisconnect. The d_create, d_destroy, and d_zinfo primitives have the same parameters as described above with respect to Type 1. CiaDialogConnect and CiaDialogDisconnect requests are routines or primitives used to commence and terminate the establishment process.

After completing initialization (e.g., CiaInitiate, CiaIfeEnum, CiaIfeOpen), a client using Type 2 dialog establishment invokes d_create to create the dialog object in a selected local IFE. The client then commences the establishment process by invoking CiaDialogConnect. CIA-MS 1300 will use parameters supplied by the client to perform the matching finction with the designated remote node. CIA-MS 1300 will exchange the necessary dialog information, perform the dialog association function and inform the partner node. Successful completion of establishment is reported via a client specified callback routine. At this point the dialog is established and data transfer over the dialog can proceed.

A client using Type 2 dialog establishment initiates dialog termination by invoking CiaDialogDisconnect. Any outstanding primitives for that dialog will be terminated and the conclusion of the closure will be reported via a client specified callback routine. The client then invokes the d_destroy primitive.

Type 2 dialog establishment provides a simple dialog naming and matching service. Dialog names can be matched using a string comparison or other appropriate matching technique.

Figure 14B:
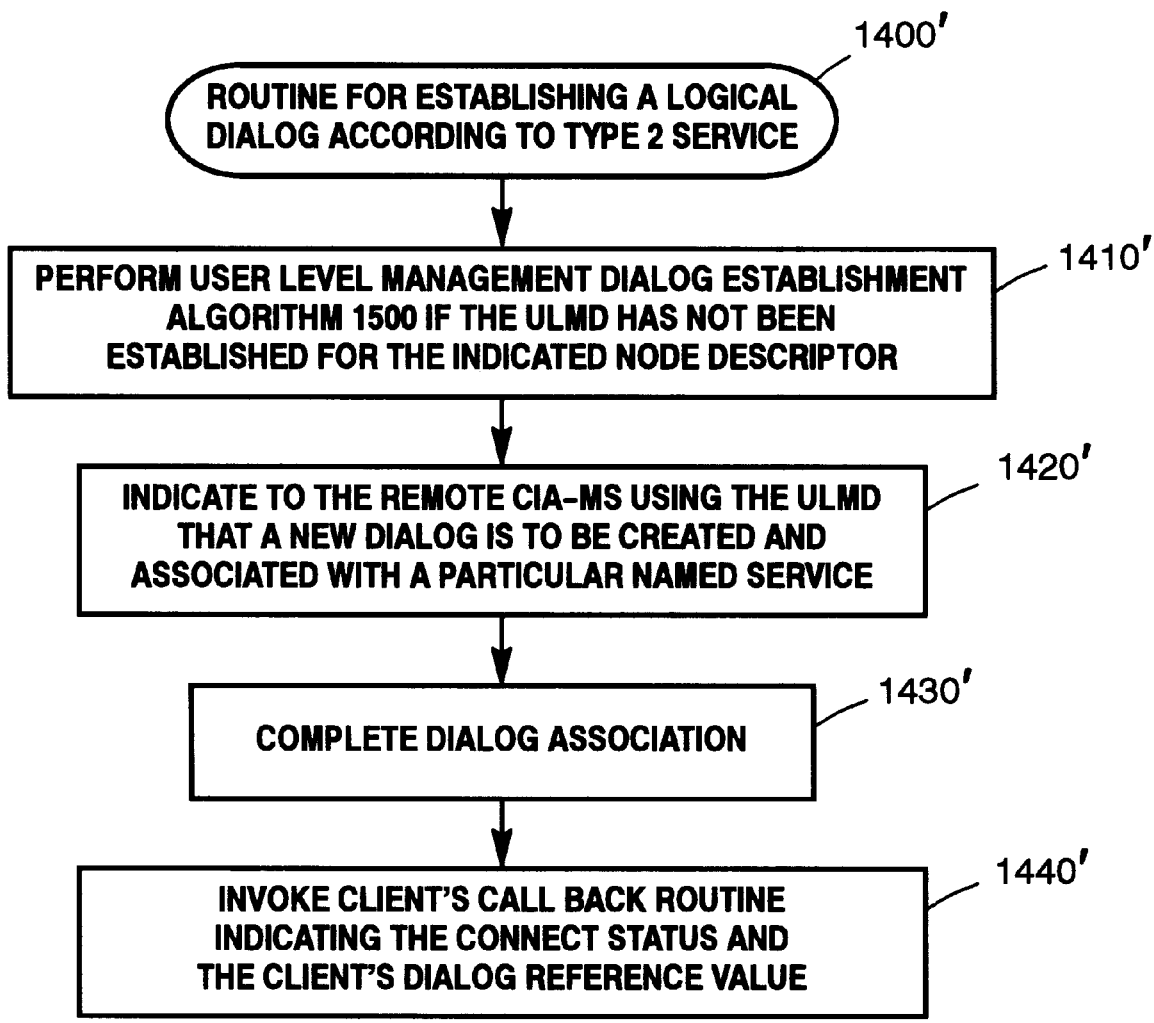
FIG. 14B shows an example routine for establishing a logical dialog in a Type 2 service according to the present invention.

CIA management service 1300 can implement type 2 dialog establishment in the following fashion. CiaDialogConnect could be defined with the following input parameters: a dialog reference value, a dialog name, a NODE descriptor (Node_id, Node_interface), and a callback routine address. The dialog reference value is the client's unique reference value for this dialog and is passed back to the callback routine upon completion of the connect service. The callback routine procedure prototype also includes a connect status which the client uses to determine if the connect operation completed successfully. FIG. 14B shows an example routine 1400' that CIA-MS 1300 can use to implement CiaDialogConnect:

1. Perform user level management dialog establishment algorithm 1500 if the user level management dialog (ULMD) has not been established for the indicated NODE descriptor (step 1410').
2. Indicate to the remote CIA-MS using the user level management dialog that a new dialog is to be created and associated with a particular named service (where the name is derived from the dialog name parameter passed into CiaDialogConnect) (step 1420').
3. Complete dialog association (step 1430').
4. Invoke client's callback routine indicating the connect status and the client's dialog reference value (step 1440').

The present invention is not intended to be limited to Type 1 and Type dialog establishment services. Additional types of dialog establishment services can also be provided. For example, a dialog establishment service that implements Windows sockets semantics can be used. As would be obvious to one skilled in the art given this description, CIA 1000 can also implement CiaDialogConnect and CiaDialogDisconnect as primitives. Other dialog management (primitives or routines) can be defined for establishing and disestablishing logical dialogs.

c. User Level Management Dialog

According to the present invention, CIA 1000 provides a mechanism for setting up the first dialog between two nodes. This first dialog is called the user level management dialog (ULMD). This user level management dialog can be used by CIA-MS 1300 as a communication path to create and associate additional dialogs for other CIA clients at a remote IFE. A ULMD provides a communication path for implementing more advanced dialog establishment services (e.g., Dialog Type 2 establishment).

Figure 15A:
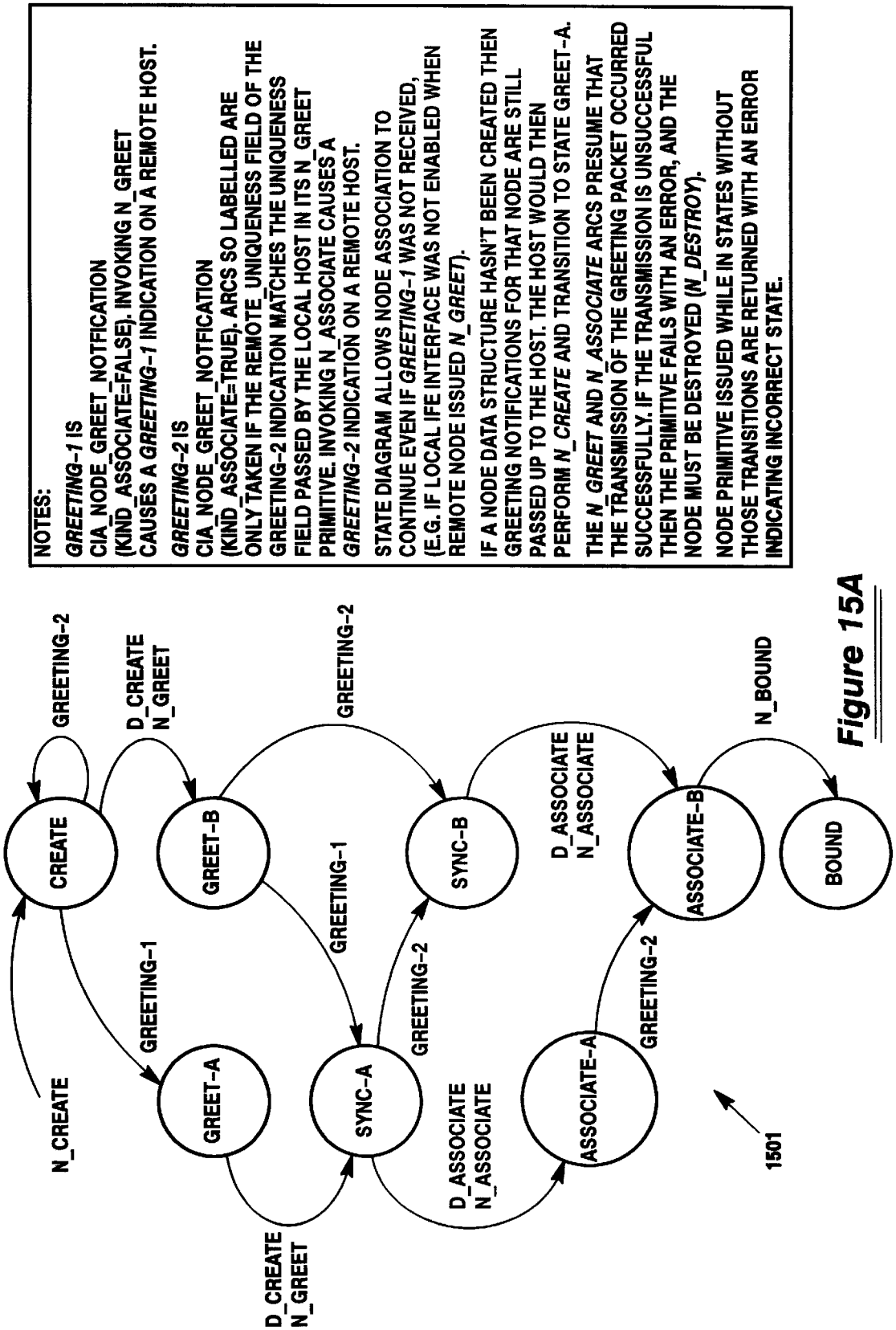
FIG. 15A is an example state diagram used to establish a user level management dialog according to the present invention.

A routine 1500 for establishing a user level management dialog between two IFEs (e.g., a local IFE and a remote IFE) will now be described with reference to FIGS. 15A to 15C. FIG. 15A shows a state diagram 1501 depicting how a CIA-MS 1300 establishes a user level management dialog between two IFEs. An IFE has a different user level management dialog for each NODE object (i.e., remote IFE).

Figure 15B:
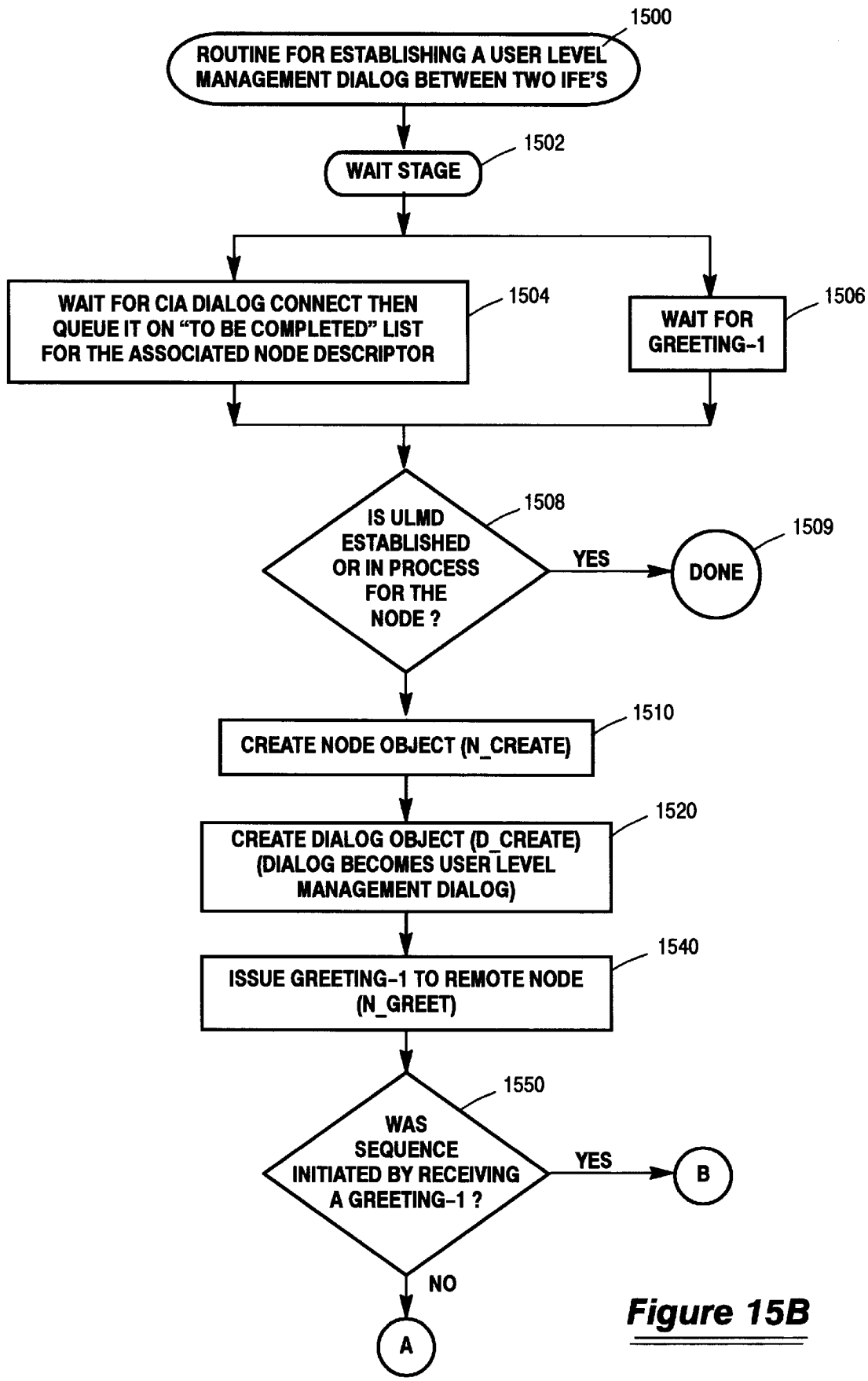
FIGS. 15B and 15C are flowcharts of an example routine for establishing a user level management dialog according to the present invention.
Figure 15C:
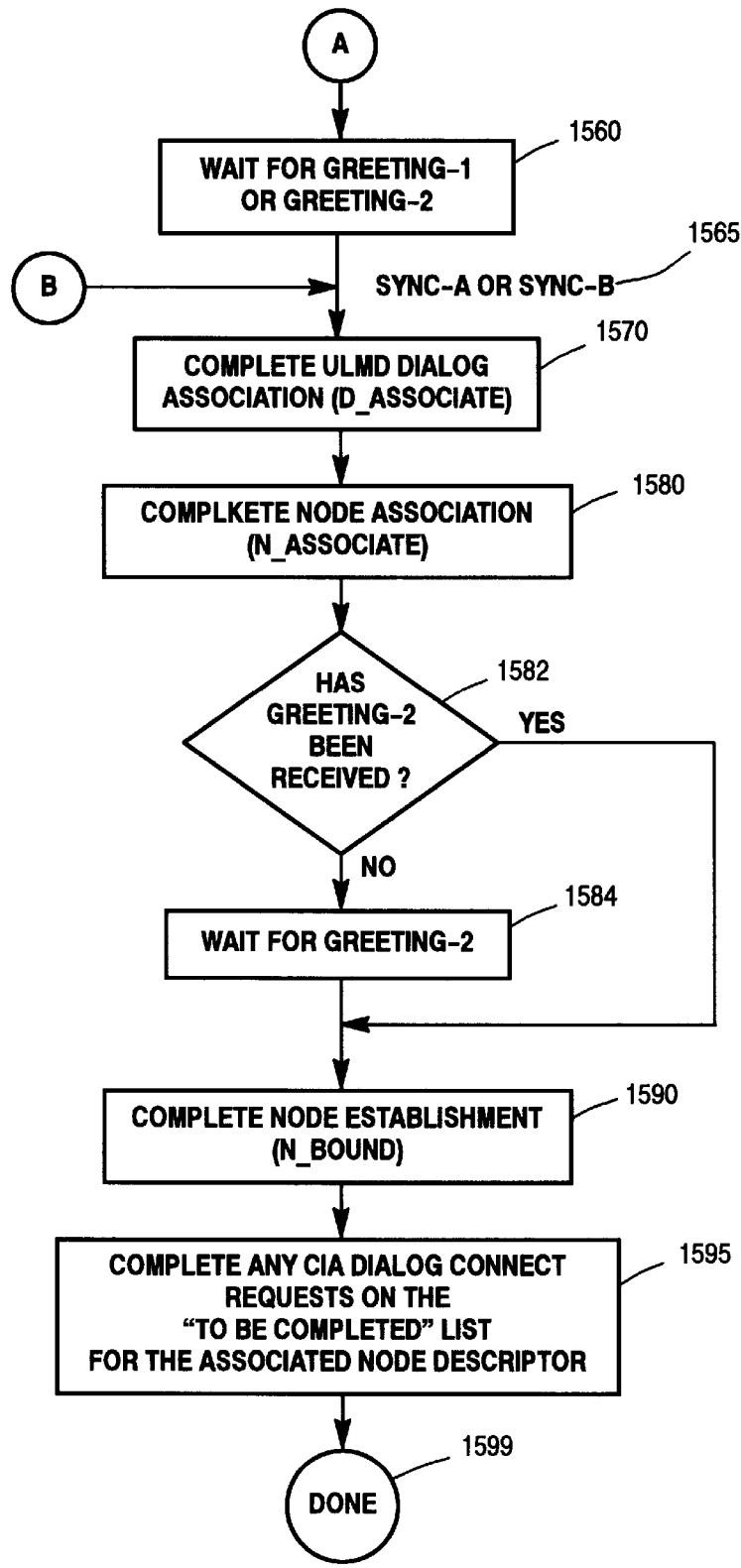

As shown in FIG. 15B, CIA-MS 1300 begins establishing a user level management dialog in a wait stage 1502. CIA-MS 1300 waits for a CiaDialogConnect request to be issued locally (step 1504) or for a greeting-1 to have been issued (step 1506). When the CiaDialogConnect is issued, it is queued on a "to be completed list" for the associated NODE descriptor (step 1504). The issuance of a greeting-1 refers to the state when a CIA_NODE_GREET_NOTIFICATION(kind_associate=FALSE) is received from a remote IFE (i.e., unique node_id, node_interface) that does not map to a NODE object that has had its user level management dialog established (or is currently being established).

After steps 1504 or 1506, a check is made to determine whether the user level management dialog for the indicated NODE descriptor is established or in progress, that is, currently being established (step 1508). If a NODE object has not already been created that matches the specified NODE descriptor, then CIA-MS 1300 invokes the n_create primitive (step 1510). If a NODE object already exists that matches the specified NODE descriptor, then CIA-MS 1300 transitions immediately to the done state in step 1509, since the request has been queued and will be completed after node establishment in step 1595.

In step 1510, CIA-MS 1300 issues a n_create primitive in order to create a new NODE object. A DIALOG object is created by issuing a d_create primitive (step 1520). In step 1520, CIA-MS 1300 invokes the d_create primitive to create a dialog object for the user level management dialog. CIA-MS 1300 then passes the dialog handle for its user level management dialog as a parameter to the n_greet primitive which it issues to the associated NODE descriptor (step 1540).

In step 1550, a check is made to determine whether steps 1510–1540 were initiated by receiving a greeting-1. When a greeting-1 was received in step 1506, CIA-MS 1300 then proceeds to state sync-A (step 1565), since it already has received the greeting-1 indication. Otherwise, CIA-MS 1300 waits for a greeting-1 or greeting-2 indication (step 1560), before proceeding to state synch-A or synch-B (step 1565) (see FIG. 15C).

When state sync-A or sync-B is reached, CIA-MS 1300 issues a d_associate primitive to complete ULMD dialog association (step 1570). A n_associate primitive is issued to complete NODE association (step 1580). After a greeting-2 indication has been received (step 1582) or waited for (step 1584), a n_bound primitive is issued to complete NODE establishment (step 1590).

Note that NODE establishment continues from state greet-B even if a greeting-1 is not received from the remote node (i.e., a greeting-2 is received instead). This solves a race condition where the remote IFE began user level management dialog establishment just before the local IFE was prepared to accept notifications from the remote IFE. The timing might be as such that the remote IFE sent its greeting-1, it was dropped by the local IFE (which was not detected by the remote IFE), the local IFE performed its n_greet which allowed the remote IFE to complete its n_associate which results in a greeting-2 being received by the local IFE (without an apparent greeting-1 indication).

Finally, any CiaDialogConnect requests on the "to be completed" list are completed for the associated NODE descriptor (step 1595). Routine 1500 for establishing a ULMD is then done (step 1599).

d. IFE Management Primitives and Notifications

In addition to establishing and managing dialogs and nodes, CIA provides intraconnect front end (IFE) management operations. These IFE management operations include, but are not limited to, the canceling of outstanding primitives and resetting the IFE. These IFE management operations are carried out through a set of IFE management primitives (i_cancel, i_reset).

The intraconnect cancel primitive (i_cancel) supports canceling outstanding primitives. Upon receipt of a i_cancel primitive for an outstanding d_rcv primitive the IFE terminates the outstanding d_rcv primitive as soon as possible. The indicated d_rcv primitive returns a go indication if the receive completed successfully before the i_cancel took effect. Otherwise, the d_rcv primitive returns a no-go indication. Upon receipt of a i_cancel primitive for an outstanding d_send primitive the IFE terminates the outstanding d_send primitive as soon as possible. The indicated d_send primitive returns a go indication if the d_send completed successfully before the cancel took effect. Otherwise, the d_send primitive returns a no-go indication.

An i_cancel_by_reference primitive can also be added to CIA 1000 which has parameters for identifying specific fields (or parameters) in a CCB. The i_cancel_by_reference primitive can then allow CCBs to be canceled selectively based on whether or not a CCB has a matching field. The IFE management primitives are illustrative only and not intended to limit the present invention. For instance, an IFE could enforce security policies regarding CIA objects and primitives.

A intraconnect reset primitive (i_reset) is used to initialize an IFE. Any outstanding primitives which had been issued prior to the i_reset are completed with a no-go indication. The primitive indicates the desired operational characteristics of the IFE, and includes a context parameter value that is to be returned for CIA_NODE_FAULT_NOTIFICATIONs and CIA_IFE_FAULT_NOTIFICATIONs from this IFE.

An IFE fault indication notification (CIA_IFE_FAULT_NOTIFICATION) indicates that a local IFE has failed. The notification indicates the context parameter value specified by the most recent i_reset primitive and an IFE specific reason code which can be used to help diagnose the cause of the IFE fault. The state of outstanding primitives is undefined, but a subsequent i_reset primitive may be issued after a CIA_IFE_FAULT_NOTIFICATION in a attempt to complete them.

6. Buffer Pool (BP) and Pool Manager (PM) Operations a. Receive With Buffer Pool Operations In addition to the "Receive With Buffer" dialog operations described above, the present invention further provides Receive with Buffer Pool dialog operations. CIA 1000 provides intraconnect data communication using buffer pools and buffer pool management. Buffer pool and pool manager operations are provided in CIA 1000 which optimize the pull data model to allow data transfer as efficient as a push data model.

Figure 16:
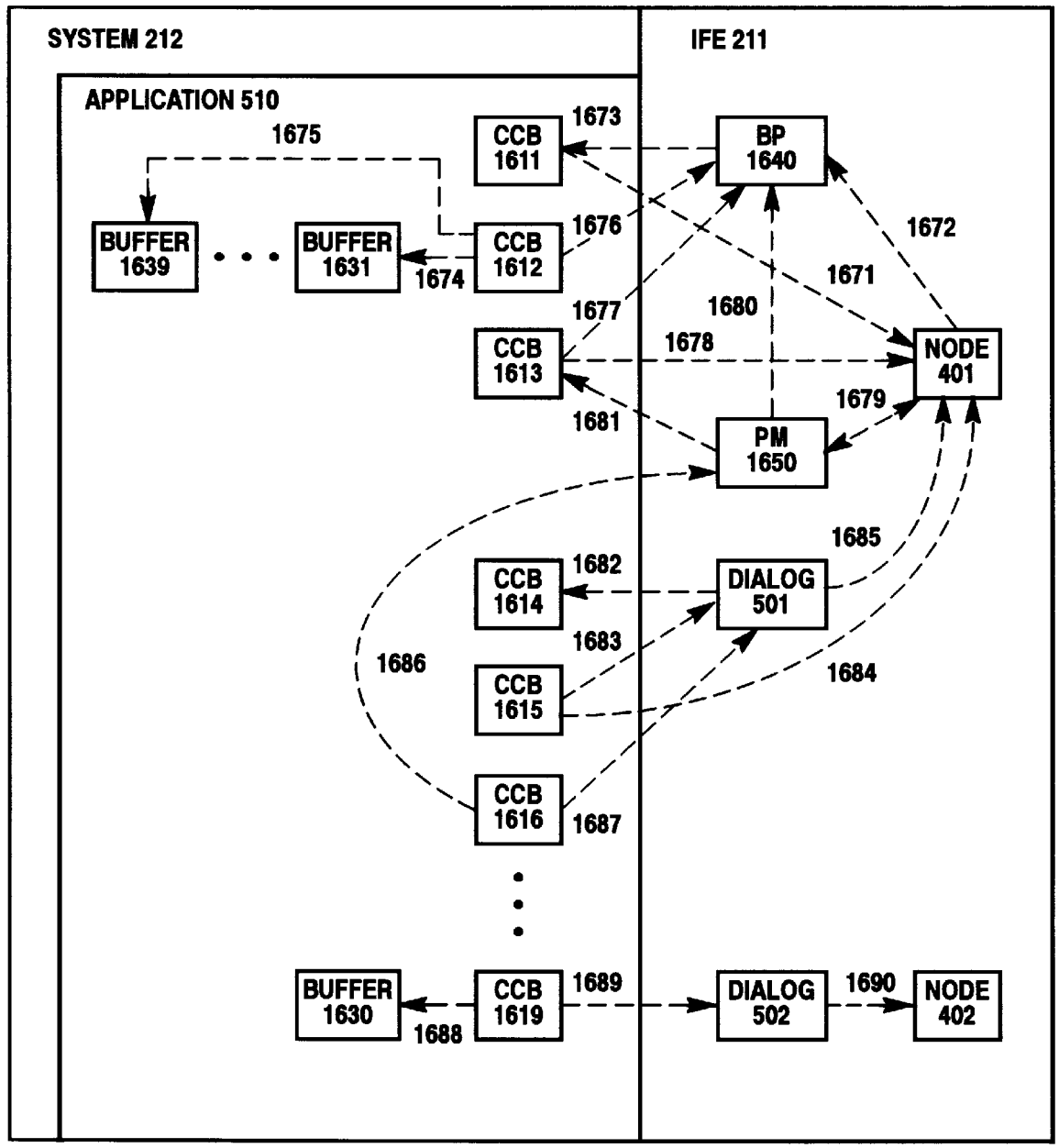
FIGS. 16 and 17 are schematic diagrams that illustrate examples of CIA objects used in receive with buffer pool type of CIA data communication, according to the present invention.
Figure 17:
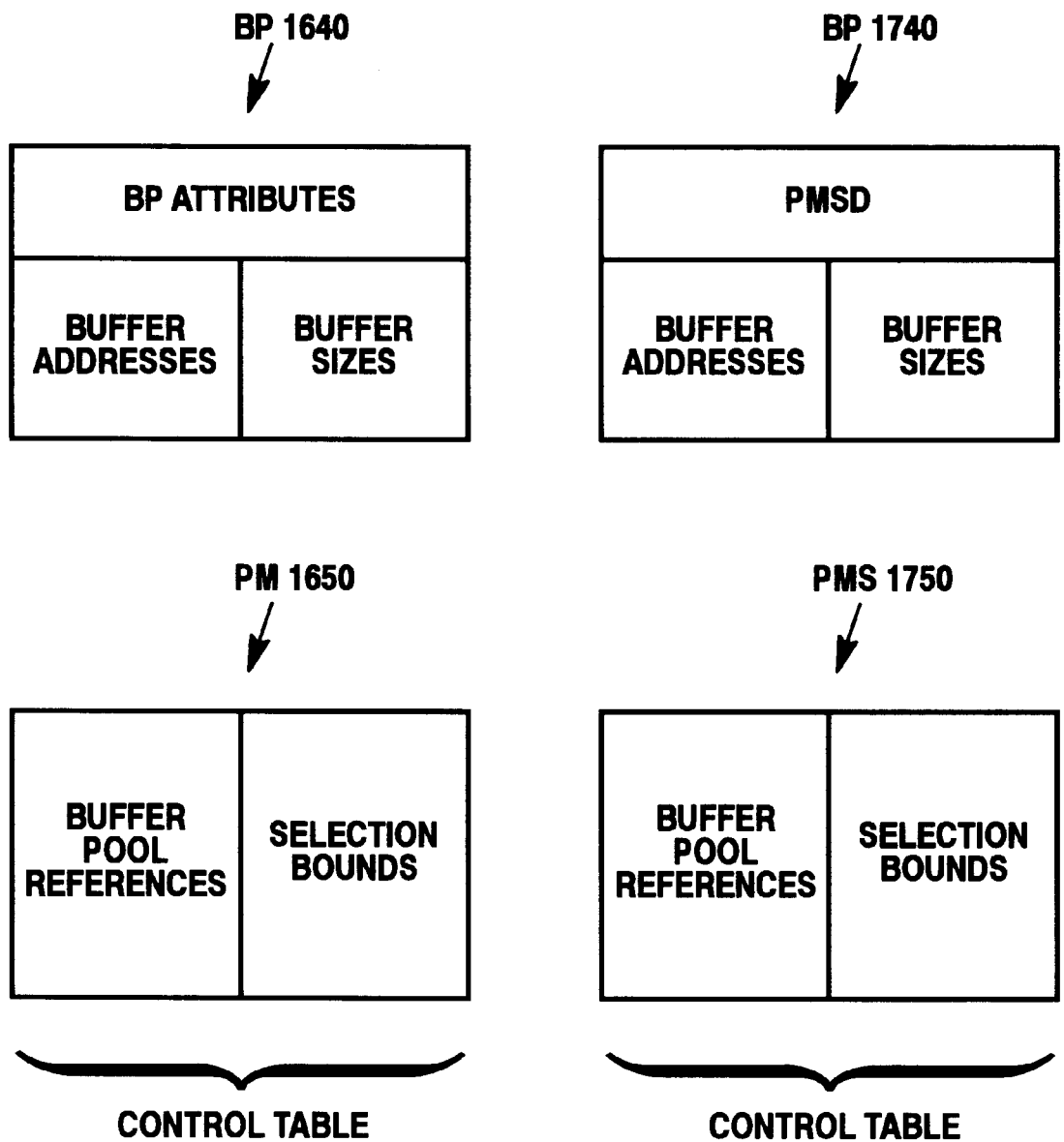

As shown in the example of FIGS. 16 and 17, CIA 1000 includes additional CIA objects called buffer pools and pool managers (see BP 1640 and PM 1650). CIA 1000 uses buffer pool (BP) and pool manager (PM) objects to support Receive with Buffer Pool operations. To support the pull model, CIA 1000 further includes shadow objects, called buffer pool shadows and pool manager shadows (see BPS 1740 and PMS 1750). CIA primitives are used to create and manage buffer pools and corresponding buffer pool shadows. CIA primitives are used to create and manage pool managers and corresponding pool manager shadows. CIA primitives (and parameters) are further used to pass parameters and references related to buffer pools and pool manager (and shadow objects) between a CIA client and an IFE.

FIG. 16 shows an example of a buffer pool 1640 and pool manager 1650 in IFE 211. Buffer pool 1640 and pool manager 1650 are associated with node 401. For clarity, this example is described with respect to data communication for one logical dialog previously established between dialog 501 and dialog 503 as described above. However, the present invention is not intended to be limited by this example. A node can be associated with multiple logical dialogs (and corresponding dialog objects). A pool manager can be used to manage multiple buffer pools (e.g., PM 1650 can be used to manage sixteen BPs).

CCBs 1611 to 1619 are issued by application 510. CCB 1611 is a bp_create (BUFFER_POOL_CREATE) primitive. The bp_create primitive is used to create a buffer pool (BP 1640). A buffer pool is a data structure or object which stores buffer addresses and buffer pool attributes. The number of buffer addresses that can be stored into a buffer pool is determined by the CIA client and is specified as a parameter to the bp_create primitive. The CIA client also specifies the size of a buffer (in bytes) associated with each buffer address as a bp_create parameter.

In order to effectively support the pull model, CIA requires that the client associate a BP with a particular NODE. For interchange definitions that support the pull model, the local IFE informs the remote IFE that a BPS (BUFFER POOL SHADOW) object needs to be created. As shown in FIG. 17, BPS 1740 is used by the remote IFE to store buffer addresses and buffer sizes of buffers which have been credited to the buffer pool. This buffer address and size visibility allows the sender (i.e., the remote IFE) to bind data bytes to receiver memory addresses for receive operations that reference buffer pools. A bp_create primitive may fail if the remote IFE is not able to allocate memory for the BPS.

BPS 1740 is very similar to the BP 1640 which it shadows. Most of the fields within this structure have identical usage to that of the same field in the BP it shadows. One additional component of a BPS 1740 is the pool manager shadow directory (PMS_DIRECTORY or PMSD). An entry in a PMSD is used to remember a pool manager shadow (PMS) 1750 that is associated with this BPS 1640. There is an entry in the PMSD for each PMS that has a control entry that references this BPS. Note that if a PMS has multiple entries for the same BPS, then only 1 PMSD entry for the PMS occurs in the PMSD.

The PMSD provides a mechanism to discover the set of REQs (send or receive requests) that need to be rescheduled when buffer pool credits are supplied to a previously empty buffer pool. When credits are supplied to a previously empty buffer pool, there may be REQs that are queued in a PMS queue (pms_q) waiting for buffer pool resources. The PMSD allows the wakeup routine to scan for the pms(s) associated with this BPS that have REQs waiting.

The size of a PMS directory is variable. Initially PMS_DIRECTORY_SIZE entries are allocated in the BPS structure itself. If additional entries are needed (e.g., when pm_create or pm_add_control primitives are performed which reference this BPS) additional PMSD entries may be linked onto the original PMSD size entry in the BPS. Similarly when a PMS is destroyed its entry in any associated PMSD is removed.

A dotted reference (1672) is shown indicating that the new BP 1640 becomes associated with NODE 401. The CCB that created node 401 is not shown in FIG. 16, but the CCB for node creation operates as described above for node creation and similar to CCBs described above for dialog and other object creation. IFE 211 returns a reference (1673) to the newly created BP 1640 as part of the result information associated with CCB 1611. The Application 510 passes this reference as a parameter value in subsequent CCBs (e.g., 1612) that need to refer to BP 1640.

CCB 1612 is a bp_supply_credit (BUFFER_POOL_SUPPLY_CREDIT) primitive. The bp_supply_credit primitive is used to supply buffer areas to a BP. For interchange definitions that support the pull model, the local IFE informs the remote IFE of the buffer addresses that should be credited to the BPS associated with the BP.

CCB 1612 is shown referencing a set of buffer areas 1631–1639 in the application memory space via references 1674 and 1675. The start address of a buffer area can be aligned on any byte boundary. The start address is the numerically lowest address of all the bytes within that buffer. CCB 1612 also references the previously created BP 1640 and passes the BP reference (1676) to IFE 211 as part of the bp_supply_credit parameters in CCB 1612. IFE 211 services the bp_supply_credit by adding buffer references (1674, 1675) to the buffer reference list maintained in BP 1640 (and for the pull model into the associated BPS of the remote IFE). IFE 211 indicates the actual number of buffers references credited to the BP (and corresponding BPS object) as part of the result information stored into CCB 1612.

CCB 1613 is a pm_create (POOL_MANAGER_CREATE) primitive. The pm_create primitive is used to create a PM (POOL MANAGER) 1650. As shown in FIG. 17, PM 1650 describes buffer preference parameters, which provides a best-fit capability for matching available buffers to the transfer length. The preference parameters are maintained as a list of BP references and selection bounds. An application can create multiple PM objects, and each PM object can refer to multiple buffer pools. Receive with Buffer Pool operations actually reference a PM object.

In order to effectively support the pull model, CIA requires that the client associate a PM with a particular NODE. For interchange definitions that support the pull model, the local IFE informs the remote IFE associated with the PM when changes to the buffer preference parameters have been made. The remote IFE stores the buffer preference parameters in its own internal object referred to as a PMS (POOL MANAGER SHADOW) 1750. This buffer preference parameter visibility allows the sender (i.e., remote IFE) to properly bind data bytes to receiver memory addresses for receive operations that reference a PM.

A dotted reference (1679) is shown indicating that the newly created PM 1650 becomes associated with NODE 401. A second dotted reference (1680) is shown indicating that BP 1640 is added as a buffer pool which is managed by the newly created PM 1650. IFE 211 returns a reference (1681) to the created PM 1650 as part of the result information associated with CCB 1613. The Application 510 passes this reference as a parameter value in subsequent CCBs (e.g., 1616) that need to refer to PM 1650.

CCB 1614 is a d_create (DIALOG_CREATE) primitive. The d_create primitive is used to create a DIALOG 501 on the local IFE (211). IFE 211 returns a reference (1682) to the created DIALOG 501 as part of the result information associated with CCB 1614. The Application 510 passes this reference as a parameter value in subsequent CCBs (e.g., 1615, 1616) that need to refer to DIALOG 501.

CCB 1615 is a d_associate (DIALOG_ASSOCIATE) primitive. The d_associate primitive is used to establish an end to end relationship between the local DIALOG 501 and dialog 503 at remote IFE 213. CCB 1615 passes a reference (1683) to the previously created DIALOG 501. It also passes a reference (1684) which indicates that DIALOG 501 is to be associated with NODE 401. Additional parameters (which are not shown) are passed in CCB 1615 which are stored in DIALOG 501. These additional parameters provide the linkage information to complete the end to end relationship between DIALOG 501 and DIALOG 503. Application 510 retrieves the linkage information for DIALOG 503 from IFE 213 via a data transfer over a previously created dialog. CIA provides an initial "user level management dialog," as described above, to support the exchange of linkage information for additional dialogs.

CCB 1616 is a d_rcv (DIALOG_RECEIVE) primitive. The d_rcv primitive is used to accept incoming data for a dialog. CCB 1616 passes a reference (1687) to the previously associated DIALOG 501 for which it is willing to accept incoming data. It also passes a reference (1686) which indicates that PM 1650 is to control the buffer selection process for the data received as a result of this primitive. The d_rcv primitive is defined to support a variety of data scattering variants. Application 510 controls the maximum amount and manner in which data is landed into application memory via the parameters passed in CCB 1616. CIA allows data to be scattered across buffer pool resources as well as specific buffer areas. An AUTO receive d_rcv primitive option is also defined which improves performance for continuous receive operations since the d_rcv primitive needs to be issued only once.

In one example, the application must specify a result descriptor 643 that points to result area 651 for a d_rcv primitive. This result area 651 may be a PM or an explicit buffer address. The result area 651 for a d_rcv primitive is updated to reflect the buffer addresses and transfer lengths that were consumed from buffer pools in order to complete the data transfer. The maximum number of buffer addresses and transfer lengths within a d_rcv result area 651 is usually fixed but can be variable.

In order to properly support unique result areas for automatically recurring d_rcv primitives (i.e., AUTO option of d_rcv primitive) the application should specify a PM reference for the result area. For the Windows NT interface a callback notification mechanism is used to report the address of the result area that was used to hold the d_rcv result. For MCP, the SysQueue mechanism is used to queue result areas.

An application can issue different d_rcv primitives which reference different PMs for the same dialog. An application can also issue d_rcv primitives which reference the same PM to different dialogs (as long as the DIALOGs and PMs are associated with the same NODE). Multiple PMs can reference the same BPs, as long as all the BPs and PMs are associated with the same node.

CCB 1619 is a d_send (DIALOG_SEND) primitive. The d_send primitive is used to transfer data to a remote dialog. CCB 1619 passes a reference (1689) to a previously created DIALOG 502 on which it wants to transfer data. It also passes a reference (1688) to buffer area 1630 which contains the data to be transferred to the remote DIALOG 505 associated with local DIALOG 502. The d_send primitive is defined to support a variety of data gathering variants which Application 510 controls using parameters passed in CCB 1619. An AUTO d_send primitive that allows one d_send primitive to be posted and automatically processed repeatedly can also be defined.

b. Example Description of CIA Objects and Primitives Supporting Receive with Buffer Pool Operations The operation and management of pool managers and buffer pools in providing intraconnect data communication over a logical dialog between send and receive CIA clients is described in even more detail below with reference to the following example objects and rules. For brevity, RCBs, buffer pools, pool managers, and corresponding shadow objects are described below for a communication intraconnect architecture supporting both Receive with Buffer and Receiver with Buffer Pool operations. The Receive with Buffer Pool operations are further described so as to include the optimizing features, described above, including Early-Far-End and Far End classes of service, scatter, gather, auto receive, partial messages, truncation, multiple outstanding requests, and address bounds checking. Other optimizing features specific to Receive with Buffer Pool operations are also described further including: buffer pool credits, low water mark notification, and data binding. As would be apparent to one skilled in the art, however, the present invention is not limited to including all of these features. Implementations can be made which utilize any combination of one or more of these features by modifying CIA objects, primitives and semantics according to desired design goals.

1. BP Operation Primitives

1. A primitive exists (i.e., bp_create) which is used to create a buffer pool object and associate it with a particular NODE. The primitive indicates the NODE, the size (in bytes) of the memory area associated with a buffer pool credit, the number of buffer pool credit slots (which are used to store buffer addresses), and a low water mark (which indicates when the pool object is to cause a notification that indicates that the number of buffer pool credits has fallen below the prescribed limit). The primitive result includes a status which indicates whether or not a buffer pool object could be created with the specified number of buffer pool credit slots. If the buffer pool object is created successfully then a handle to this buffer pool object is also returned. The buffer pool handles are unique within a specific IFE, but they are not necessarily unique across IFEs.

2. A primitive exists (i.e., bp_destroy) which is used to destroy a buffer pool object. The primitive indicates a buffer pool handle. The control table of any pool manager that references this pool is updated so that all references to the buffer pool object are deleted from its control table (no vacant holes are created in the control table, all succeeding entries in the list are moved up). The primitive completes when all pool managers have been updated and all transfers for data which has been bound to buffers from this buffer pool have completed.

3. A primitive exists (i.e., bp_supply_credit) which is used to supply buffer pool credits to a specific buffer pool object. The primitive indicates a buffer pool handle, and a list of memory areas which are being credited to that pool. The primitive adds the indicated memory areas to the free buffer list of the indicated buffer pool. Memory areas are credited in the same order as they appear in the indicated list. If the list of memory areas contains more entries than the amount of unused pool credit slots then only the portion of the list which fills the unused buffer pool credit slots are applied. The primitive result includes a count of the number of memory areas that were credited by this primitive, and a count of the number of unused pool credit slots which remained after the credits were applied. It is valid for the primitive to supply zero memory areas in order to get updated result information concerning the number of unused pool credit slots.

4. A notification exists (CIA_LOW_WATER_NOTIFICATION) which is used to indicate that a buffer pool object is running low on credits. The notification occurs when a buffer from the pool is consumed and the number of remaining credits is one less than the low water mark for that buffer pool object. The notification indicates the host buffer pool descriptor for the buffer pool object that is experiencing the low resource condition. By definition, a low water mark notification will never be sent when the low water mark attribute is set to zero.

2. PM Operation Primitives

1. A primitive exists (i.e., pm_create) which is used to create a pool manager object and associate it with a particular NODE. The primitive indicates the NODE that the pool manager object is to be created on. The pool manager object describes a set of controls used by the binding algorithm which maps data into free buffer pool space for d_rcv primitives that reference the pool manager object. If the pool manager object is created successfully then a unique handle to this pool manager object is returned. The pool manager handles are unique within a specific IFE, but they are not necessarily unique across IFEs.

2. A primitive exists (i.e., pm_destroy) which is used to destroy a pool manager object. The primitive indicates a pool manager handle. Any posted d_rcv primitives associated with dialogs for the indicated NODE which reference the indicated pool manager object are completed with an error indication. The indicated pool manager object is deleted.

3. A primitive exists (i.e., pm_add_control) which is used to add a control to the control table of a pool manager object. The primitive indicates a pool manager handle, a buffer pool handle, a lower bound value and an upper bound value. The specified buffer pool must be associated with the same NODE as the pool manager or an error will be indicated. Otherwise, the buffer pool handle, lower bound value and upper bound value are placed in the next available entry of the control table of the indicated pool manager. A control table typically holds a fixed number of entries. When a pool manager is created the control table is empty.

4. Buffers from a buffer pool object are consumed (i.e., bound to message data) in a first in first out order (i.e., the same order in which they were supplied by the bp_supply_credit primitive).

3. Data Binding Algorithm

A sending IFE performs the binding of message data destined for buffer pool space when receiver and sender have synchronized. The sender binds as much data as possible to complete either the d_send primitive or the d_rcv primitive termination conditions (whichever is smaller). If the sender cannot complete the bind because the lack of free buffers, then the bound data remains bound, and the sender reschedules the completion of the bind algorithm when additional buffer credits become available. If the sender cannot complete the bind because the semantics of the d_rcv primitive is waiting EOM then the sender resumes binding when the next d_send primitive for the dialog is processed.

The binding algorithm references a pool manager control table in order to determine the buffer selection criteria when some portion of a data transfer has to be mapped into a buffer pool. The binding algorithm maintains an UNBOUND count, which is the number of unbound data bytes in that portion of the data transfer. The UNBOUND count is compared against the range values stored in the control table in order to determine if the buffer pool referenced by a control table element can be used to satisfy some portion of the UNBOUND count.

The control table is an ordered set. The binding algorithm considers the first element in the control table first. If the UNBOUND count falls within the lower and upper bound range values (inclusive), and an free buffer exists in the buffer pool referenced by that control table element then the buffer area from the head of that buffer pool free list is used to map some of the data bytes, the buffer area is dequeued from the free list, low water mark conditions are checked and possibly indicated, and the UNBOUND count is updated. If the UNBOUND count is zero the binding for this portion of the data transfer is complete. Otherwise, the algorithm restarts with the remaining UNBOUND portion (i.e., the first element in the control table is considered again for the next UNBOUND portion).

If the UNBOUND count falls outside the specified range then the binding algorithm considers the next entry in the control table. If all the entries in the control table are exhausted and the UNBOUND count is still non-zero, then the binding is rescheduled when additional buffer resources become available.

An example of the buffer pool ordering and ranges is given below.

| Buffer Pool Object | Range (Lower Bound) | Range (Upper Bound) |
|---|---|---|
| 1k | 0 | 1024 |
| 4k | 0 | 32768 |
| 64k | 32769 | 0xffffffff |
| 4k | 32769 | 0xffffffff |
| 1k | 0 | 32768 |

In this example 1 k, 4 k and 64 k buffer pools exist. Unbound data transfers up to 1K bytes in length may be bound to the 1 k or 4 k pool. Unbound data longer than 1K and less than 32K is bound to the 4 k pool if the data is longer than 1K or the data is less than 1K but no more 1 k buffers exist. Unbound data longer than 32K is bound to the 64 k pool unless there are not enough available 64 k pool credits, in which case 4 k pool buffers are used. Also if not enough 4 k buffers exist to transfer a remaining 32K chunk than 1 k buffers can be used.

4. Dialog Operation Primitives

A primitive exists which indicates that data is to be transferred for a dialog. (i.e., d_send). The primitive indicates the dialog, a memory address, and a length of the source message data. It also indicates whether End of Message (EOM) is to be signaled coincident with the last byte of the data transfer. The primitive also indicates a 32 bit token value which is passed to the receiver as part of the result. The token value is only passed if EOM is to be signaled. Data is transferred in the native IO byte order of the sending host's environment. The primitive result includes the actual receive message length (i.e., amount of data accepted by receiver prior to truncation or cancellation).

A variant of the d_send primitive exists which supports an ordered list of indications (address, length) which are used to perform data gather.

The d_send primitives allow the sharing of source message areas between outstanding d_send primitives.

The d_send primitives do not modify (even temporarily) the source memory areas.

An i_cancel primitive exists which supports canceling an outstanding d_send primitive. Upon receipt of a i_cancel primitive for an outstanding d_send primitive the IFE terminates the outstanding d_send primitive as soon as possible. The indicated d_send primitive returns a go indication if the d_send completed successfully before the cancel took effect. Otherwise, the d_send primitive returns a no-go indication.

Multiple receives may be posted for a dialog.

Receives complete in the same order as which they were posted to a dialog, and in the same message order as the sends they matched were posted.

A primitive exists which accepts incoming data for a dialog (i.e., d_rcv). The primitive indicates the dialog, the maximum length of incoming data that it is willing to accept, a pool manager reference, a result location, and a flag that indicates whether or not the receiver will wait until EOM is signaled by the sender before completing the primitive. If the EOM flag is indicated by the primitive then any data which exceeds the maximum length indicated is truncated (i.e., data which overflows past the maximum length does not overwrite any data transferred prior to truncation). If the EOM flag is not indicated then the primitive completes when the memory area has been filled or when EOM is signaled by the sender coincident with the data transfer. Received data is written and mapped into free buffers from the buffer pools associated with the indicated pool manager reference. Data is transferred into buffer pool memory in the native I/O byte order of the receiving IFE system environment.

The result location selects either a specific memory area or a pool manager reference to be used as the container for the primitive result information. The primitive indicates the actual location of the result structure on completion. If the result location indicates a specific memory area then the result structure is written there. Otherwise, the result structure is written to a free buffer managed by the pool manager referred to by the result location indication. The result structure includes a buffer list which describes the receive data to buffer pool mapping. The result structure includes the sender's message length, and a flag which indicates whether EOM was signaled by the sender coincident with the received data. The result structure also includes the 32 bit token value from the sender. The token value in the result structure is only valid if the EOM flag is true. Also note that if EOM is signaled coincident with the last byte in the message area then EOM should also be signaled in the primitive result.

A variant of the d_rcv primitive exists which accepts incoming data for a dialog into a specific memory area. The primitive indicates the dialog, a memory area where the received data is written (i.e., address for length), a result location, and a flag that indicates whether or not the receiver will wait until EOM is signaled by the sender before completing the primitive. The result structure includes the sender's message length, and a flag which indicates whether EOM was signaled by the sender coincident with the received data.

A variant of the d_rcv primitive exists which accepts and scatters incoming data for a dialog into user specified memory areas and buffer pools. The primitive indicates the dialog, a scatter list, a result location, and a flag that indicates whether or not the receiver will wait until EOM is signaled by the sender before completing the primitive. An element in the scatter list identifies a specific memory area (address for length) or a pool manager object reference. The received message is scattered into memory areas or free buffers according to the lengths and types indicated in the scatter list. A scatter list supports one or more elements. If a free buffer is filled before the current scatter list element is satisfied then another free buffer is used to complete that portion of the scatter list. The referenced pool manager object applies the controls used to select free buffers. The result structure includes a buffer list which describes the receive data to buffer pool mapping. The result structure includes the sender's message length, and a flag which indicates whether EOM was signaled by the sender coincident with the received data. The token value in the result structure is only valid if EOM is true.

An automatically recurring variant of d_rcv is provided for receiving exclusively into buffer pools. An automatically recurring variant of d_rcv is provided for scattering into any combination of buffer pools and user specified memory areas.

An i_cancel primitive exists which supports canceling an outstanding d_rcv primitive. Upon receipt of a i_cancel primitive for an outstanding d_rcv primitive the IFE terminates the outstanding d_rcv primitive as soon as possible. The indicated d_rcv primitive returns a go indication if the receive completed successfully before the i_cancel took effect. Otherwise, the d_rcv primitive returns a no-go indication.

The IFE always indicates on d_rcv primitive completion. The IFE always indicates on d_send primitive completion.

Notification strategies are a function of a higher level entity. A notification exists (CIA_DIALOG_FAULT_NOTIFICATION) which is used to indicate that a dialog fault condition has occurred. The notification indicates the host's context and dialog descriptor values along with an IFE implementation specific reason code. Dialog destroy (d_destroy) semantics will be automatically executed for the dialog if CIA_DIALOG_FAILURE_NOTIFICATION is indicated and the terminate_on_d_fault option is enabled. Data transfer faults for a dialog are indicated via the dialog fault notification. Data transfer failure causes the active d_send/d_rcv primitive to indicate the "no go" condition to the notification entity. Data transfer fault occurs after the underlying cloud has attempted all error recovery and retransmission actions without success.

There is a dialog option (terminate_on_d_fault) which determines whether data transfer dialog fault causes dialog failure termination (i.e., d_destroy semantics are run on the dialog automatically).

A primitive exists (i.e., d_create) which is used to create a dialog object on the local IFE. The primitive indicates the dialog descriptor that should be used when a dialog fault is indicated for the newly created dialog object. Other dialog control options can be included in the d_create primitive (e.g., priority, send class of service, whether dialog fault option is enabled/disabled, send cancel semantics, dialog fault notification information). The primitive also provides a count of the number of outstanding d_rcv primitives is it likely to have at any one time for this dialog. For dialogs that use the AUTO variant of the d_rcv primitive this count should normally be 1. If the dialog object is created successfully then a unique handle to this dialog object is returned, and dialog association information (i.e., dialog internals) is also returned. The dialog handles are unique within a specific IFE, but they are not necessarily unique across IFEs.

A primitive exists (i.e., d_associate) which is used to associate a local dialog object with a remote dialog object. The primitive indicates a dialog handle, a node handle, and remote dialog internals. The indicated dialog must not be already associated. A status is returned which indicates whether the association was successfully completed.

A primitive exists (i.e., d_shutdown ) which is used to gracefully terminate outstanding primitives associated with a dialog. The primitive indicates a dialog handle. The primitive invokes a graceful cancel of all outstanding primitives associated with the indicated dialog. The primitive does not signal completion until all other primitives associated with the indicated dialog have signaled completion.

A primitive exists (i.e., d_destroy) which is used to destroy a dialog object. The primitive indicates a dialog handle. This primitive is an not a graceful close of the dialog, because buffer pool resources which have been bound for outstanding d_rcv primitives associated with the indicated dialog may not be properly returned. The d_destroy primitive invokes the completion routine with a canceled status indication for any primitive still posted for the dialog (other than this primitive itself). The indicated dialog object is deleted.

The following limitations can also made with respect to dialogs in one preferred example implementation, but are not intended to limit the present invention: There is no ordering between dialogs. There is no ordering between sends and receives on the same dialog by the same endpoint (the ordering is unidirectional). There is no need to support changing the send class of service while a dialog is open.

The following observations can be made with respect to dialogs in one preferred example implementation: There is a simple form of gather that can be explicitly performed by an endpoint using the variant forms of d_send. There is a simple form of scatter that can be explicitly performed by an endpoint using the variant forms of d_rcv.

5. Buffer Pool

A Buffer Pool is created as a result of a local generated buffer pool create request (bp_create primitive). In the pull data model, creation of a buffer pool (BP) also requires the creation of a buffer pool shadow object (BPS) on the remote node associated with the local buffer pool. A buffer pool shadow can contain more state information than the original buffer pool object it shadows. An IFE can utilize its own internal logical dialogs to support CIA semantics for buffer pool and buffer pool shadow creation (bp_create), deletion (bp_destroy), attribute changes (bp_set_low_water mark), and crediting (bp_supply_credit). Examples of a buffer pool object and buffer pool shadow object are set forth below:

| Buffer Pool Object | |
|---|---|
| Field | Function |
| id | Used for object or handle validation |
| adapter | Identifies adapter associated with buffer pool |
| alloc_next | Links together BPs that have been allocated for a node |
| alloc_prev | Links together BPs that have been allocated for a node |
| n | Identifies node associated with buffer pool |
| node_id | Speed optimization that avoids deference to bp->n->node id |
| proxy_context | proxy context value from bp_create |
| owner | proxy reference value from bp_create |
| reference points | reference points to retain BPs after d_destroy |
| info | User supplied information (e.g., buffer_size, low_water_mark) |

-continued

| Buffer Pool Object | |
|---|---|
| Field | Function |
| shadow | Handle of buffer pool shadow on remote node associated with this buffer pool |
| destroy fields (debit, purged, purge_in_progress, destroy_in_progress, req_bp_destroy) | Function described below |
| payload command fields: (data_cmd, rslt_cmd) | Function described below |
| address checking fields: (slot_count, slot_take, slot_put, slot) | Function described below |

Destroy fields (debit, purged, purge_in_progress, destroy_in_progress, req_bp_destroy) help implement the correct semantic behavior for the bp_destroy primitive. According to the pool rules a bp_destroy operation is not to be signaled as complete until all pool managers have been updated and all transfers for data which has been bound to buffers from this buffer pool have completed.

Credit remembers the total number of buffer addresses credited to a buffer pool.

Debit counts the total number of buffer addresses that have "completed" (which is indicated by pay_buffer_complete payloads).

Purged is normally zero unless a bp_destroy operation is in progress. purged is the result of a special mgr_thread operation which requests that the remote node purge any unbound buffers from a particular buffer_pool_shadow. The remote mgr_thread indicates the number of addresses purged and the purged count remembers this value. Using a separate field (i.e., purged) prevents having to create a lock situation in the rcv_frame_handler when it is handling pay_buffer_complete payloads. Alternatively, the purged field could be omitted and the debit field changed.

Purge_in_progress is used as a signal to the rcv_frame_handler that it is not to perform bp_destroy completion processing. Three different scenarios exist regarding when the bp_destroy operation can be signaled as completed. If there are no outstanding credits for a buffer pool then the mgr_thread need not do a purge at all and completes the bp_destroy after it has received its mg_bp_destroy response from the remote node. If there are outstanding credits then the mgr_thread issues a mgr_bp_purge to purge any unbound buffers, if after the response is received there are still buffers that haven't completed then the mgr_thread relies on the rcv_frame_handler to do the bp_destroy completion processing. If the purge response indicates that all the buffers have been returned then the mgr_thread does the bp_destroy completion processing itself.

Destroy_in_progress is a flag used to prevent new operations for a buffer pool that is currently being destroyed from being carried out.

Req_bp_destroy remembers the original req associated with the bp_destroy operation.

Payload command fields (data_cmd, rslt_cmd) should be used by the remote node when storing into buffer addresses associated with this buffer pool. When the buffer pool is used for data transfers, data_cmd should be used, and when a buffer pool address is used for result transfers rslt_cmd should be used.

Address Checking Fields (slot_count, slot_take, slot_put, slot) are used to do address checking for incoming stores associated with this buffer pool. The slot array remembers the current set of addresses which have been credited to the remote node buffer pool shadow. The slot_count is the number of entries in the slot array. Note that slot_count is larger then the info.params.slots because additional slots are needed to remember credits which are currently being credited (but which haven't necessarily been accepted by the remote node). This causes a situation where the local node needs more slots than the remote node because it doesn't necessarily know which addresses in its slot list have been "bound" by the remote node but haven't yet been discovered by the local node.

Slot_take and slot_put are ring indices for the slot array. As credits are supplied to the buffer pool, slot_put is advanced. As buffer addresses are consumed slot_take is advanced.

6. Pool Manager

A POOL MANAGER is created as a result of a locally generated pm_create request. In the pull data model, creation of a pool manager also requires the creation of a similar pool manager object on the remote node associated with the pool. The associated structure (object) on the remote node is referred to as a POOL MANAGER SHADOW (PMS). An IFE can utilize its own internal logical dialogs to support CIA semantics for pool manager and pool manager shadow creation (pm_create), deletion (pm_destroy), and adding pool controls (pm_add_control).

| POOL_MANAGER | |
|---|---|
| Fields | Functions |
| id | Used for object or handle validation |
| adapter | Adapter associated with this pool manager |
| alloc_next | For linking together pool managers that have been allocated for a node |
| alloc_prev | For linking together pool managers that have been allocated for a node |
| n | Node associated with this PM |
| reference_points | Reference points since pool managers need to be retained after destroy |
| shadow | Handle of the pool manager shadow on the remote node associate with this pool manager |
| controls | Number of valid controls in the control list |
| destroy_in_progress | Prevents new operations on this pool manager when its being destroyed |
| bp_list | Buffer pool associated with each control |

7. Pool Manager Shadow

A POOL_MANAGER_SHADOW is very similar to the POOL_MANAGER which it shadows.

Pool Manager Shadow Object

| Fields | Functions |
|---|---|
| id | Used for object or handle validation |
| adapter | Adapter associated with this PMS if multiple adaptors used |
| alloc_next | Linking together PMS objects that have been allocated for same node |
| alloc_prev | Linking together PMS objects that have been allocated for same node |
| n | Node associated with this PMS |
| original | Handle of the pool manager on the remote node associate with this pool manager shadow |
| rcb_wait_pool_head | Head of RCBs waiting on buffer resources associated with this PMS |
| rcb_wait_pool_tail | Tail of same RCB waiting list |
| controls | Number of valid controls in the control list |
| control_table[] of | |
| bps | User specified buffer pool (shadow) |
| lower_bound | User specified binding control |
| upper_bound | User specified binding control |

8. RCB for Receive with Buffer Pool

In general, RCB includes the d_rcv parameters passed in CCB 1614 (except for the d_rcv opcode).

9. Dialog Object

This structure defines the state needed to implement a dialog object.

Dialog Object

| Dialog Fields | Functions |
|---|---|
| id | Used for object or handle validation |
| adapter | Adapter associated with this dialog |
| alloc_next | Linking together dialogs that have been allocated for an adapter/node |
| alloc_prev | Linking together dialogs that have been allocated for an adapter/node |
| n | Node associated with this dialog |
| node_id | Speed optimization avoids need to reference d->n->node_id |
| n_context | Speed optimization so that there is no need to deference d->n->n_context |
| proxy_context | Proxy_context value from d_create parameters |
| reference_points | Reference points since dialogs need to be retained after destroy |
| Dialog State Values | Used to track current dialog state in order to validate dialog requests |
| d_state_created | |
| d_state_n_bound_wait | |
| d_state_associated | |
| d_state_shutdown | |
| d_state_destroying | |
| d_desc | User assigned descriptor for dialog (used in dialog failure notifications) |
| user | User specified information (e.g., priority) from d_create operation |
| local | Local dialog internals |
| remote | Remote dialog internals (supplied by d_associate) |
| Far-end ack fields: | These fields are used to support acknowledgment "acking" for the far-end class of service. |
| d_ack_queued | At node initialization a single REQ is built for performing dialog acknowledgments. A REQ is an internal structure used to track work in progress. That single REQ is used for every dialog acknowledgment. When an acknowledgment is required this dialog is linked onto the list of dialogs waiting to send an acknowledgment. When a dialog is linked on this list the d_ack_queued field is TRUE. |
| d_ack_next | |
| d_ack_prev | |
| d_ack_value | |
| wait_ack_req | |
| wait_ack_value | |

-continued

Dialog Object

| Dialog Fields | Functions |
|---|---|
| | This enables the dialog destroy operations to properly unlink the dialog from the ack queue if necessary. The d_ack_value is specified by the remote sender in the pay_rcb_complete payload. |
| | wait_ack_req and wait_ack_value fields are used to support the far-end class of service for locally initiated d_send operations. The current REQ waiting on an ack is held in the wait_ack_req field (if no req is waiting for an ack then this field should be NULL). wait_ack_value is the expected d_ack_value from the remote node. The wait_ack_value allows us to create a unique relationship between this particular send and its completion acknowledgment. This is especially useful if the prior send was canceled while it was waiting on its ack (so its ack will not be confused with an expected ack). |
| seq_in | Expected dialog sequence number from remote node |
| seq_out | Local send sequence number for outgoing packets for this dialog |
| bss | bss is used as the state variable for the data transfer state machine. bss_next minimizes the number of states by allowing the bss_xfer_buffer_complete to continue to the next state without thinking about whether it is necessary to transfer result or continue binding data. |
| bss_next | |
| send | These fields are used to remember state about "bound" memory areas. The fields associated with result transfer are setup by d_bind_rslt. The fields associated with data transfer are setup by d_bind_data. The fields associated with the send operation are setup during DIALOG_CCB_ACTIVATE and in the bss_xfer_data state of req_build_send. The pay_area conveys all the information that the receiving node will need in order to do address and bounds checking for incoming stores into memory. Note that the pay_area for the send field isn't passed to the receiving node, but the decision was made to make it consistent with the data and rslt field structures because it shared the same type of information (e.g., addr, bind_idx). xxxx.bind_len indicates the number of unbound data bytes in its physical memory area. |
| data | |
| rslt | |
| data_bind_pool_len | This field remembers the count of the remaining number of bytes to be bound to the resources associated with a particular pool_manager. This field is significant when using mixed_list and the current entry in the list is a pool manager reference. When data_bind_pool_len is non-zero it indicates that the d_bind_data algorithm should continue to bind addresses for the same list entry (otherwise it should advance to the next list entry). |
| rcb_status | The field rcb_status is the status value for the active rcb. A copy of rcb_status is returned in the pay_rcb_complete payload. result is a local copy of the CIA_RCV_RESULT that will be passed back to the remote node for the active RCB. result_len keeps track of the current length of CIA_RCV_RESULT. The result_len is kept to a minimum and is increased when buffer address list entries are added to the result. |
| result | |
| result_len | |
| rcb_cancel | rcb_cancel is a flag that indicates that the active RCB should be canceled. The RCB will not actually be canceled as long as it keeps |
| rcb_cancel_status | |

-continued

Dialog Object

| Dialog Fields | Functions |
|---|---|
| | making data transfer progress. If the RCB gets hung up waiting for buffer pool resources or a "matching send" then it is canceled at that point. rcb_cancel_status is the value transferred into rcb_status if rcb_cancel is recognized before successful completion. |
| send_cancel send_cancel_eom send_cancel_token send_cancel_interlock send_cancel_rcv_notified req_d_interlock | These fields are used to implement send cancel semantics for a dialog. The send cancel semantics are selectable on a per dialog basis. Two semantics are defined (non-interlock and interlock). send_cancel is set if the active rcb should be terminated with CCB_STATUS_CANCELLED_REMOTE. This flag may be set even if there isn't an active send (e.g., if the interlock condition hasn't been reported to the receiving node yet). send_cancel_eom and send_cancel_token are the eom and token values passes back for the active RCB when it is completed with CCB_STATUS_CANCELLED_REMOTE. send_cancel_interlock is set when an interlock has occurred. send_cancel_rcv_notified indicates whether the current interlock has been reported to the receiving node. req_d_interlock remembers the request address of a posted d_interlock primitive. A d_interlock primitive becomes posted when it requests that an active interlock be turned off and the interlock has not been reported to the receiving node. When the receiver is notified and this field is non-zero then the send_cancel_interlock is turned off and the d_interlock primitive is completed. |
| rcb_local | rcb_local is the base address of the memory area for that was allocated locally for RCBs associated with dialog. The information concerning this RCB area is passed to the remote node as part of the dialog association information. The number of rcbs allocated is a function of the d_rcv_count parameter from the d_create primitive. |
| remote_rcb_take remote_rcb_put remote_rcb_slot_count remote_rcb_slot | remote_rcb_slot is an array that has been allocated to hold the addresses of the rcb locations that have been allocated by the remote node for this dialog (i.e., corallary of rcb_local). remote_rcb_slot_count is the number of elements in the remote_rcb_slot array. remote_rcb_take and remote_rcb_put are the ring indices used to take and put rcb addresses from/to the slot list. When a d_rcv primitive arrives a RCB needs to be passed and sent to the remote node. If remote_rcb_take == remote_rcb_take then all the available remote_rcb_addr(s) for the remote dialog have been consumed and we have to wait for some other active d_rcv primitive to complete. While waiting for a remote_rcb_addr the d_rcv primitive req is queued on the req_rcv_wait queue. When remote_rcb_addr is available, then the address specified by remote_rcb_slot [remote_rcb_take] is used as the destination of the RCB in the remote node's address space. The remote_rcb_take pointer is advanced to show that the chosen remote_rcb_addr is no longer available. When a d_rcv primitive completes that was assigned a remote_rcb_addr then the address is returned to the remote_rcb_slot array and placed at remote_rcb_slot [remote_rcb_put] and the remote_rcb_put pointer is advanced. The next d_rcv primitive that is waiting on a |

-continued

Dialog Object

| Dialog Fields | Functions |
|---|---|
| | remote_rcb_addr is then scheduled to build (see ccb_finish_rcv). remote_rcb_slot is allocated and initialized during d_associate. |
| req_rcv_active_head req_rcv_active_tail | These fields are used to queue the REQs associated with d_rcv primitives that have been passed to the remote node for processing (and haven't yet completed). The REQ associated with the d_rcv primitive is not allowed on the active list unless it has been assigned a remote_rcb_addr. |
| req_rcv_wait_head req_rcv_wait_tail | These fields are used to queue the REQs associated with d_rcv primitives that have not been passed to the remote node because there is no available remote_rcb_addr. |
| req_rcb_service_head req_rcb_service_tail | These fields are used to track the receive requests issued by the remote node for this dialog. See the RCB description for additional detail. The addresses in this list are related to the rcb local field. |
| area_data area_rslt | These fields are used to setup the address, bounds and command checking for store requests for this dialog When no stores are expected for the data or rslt area the CMD in the pay_area is set to an invalid value. When a store occurs, the command handling in the rcv_frame_handler checks the actual store command against the expected command value. It also verifies that the store address and length is within the bounds defined by the area. Initially the CMD field of the pay_load is setup to not allow stores. Later when pay_area payloads are received the corresponding area_xxxx field is updated if the payload defines a valid area. |
| req_rcb_expect_head req_rcb_expect_tail | These fields are used to queue the list of REQs associated with RCBs that can be used by the remote node to store information concerning a d_rcv primitive. The addresses in this list are related to the rcb_local field. See the RCB description for additional detail. |
| failure_req failure_req_in_use failure_suppress | When the dialog failure_option is enabled and the local dialog has failed this REQ is used to post a dialog destroy operation to the local mgr_thread (who will in turn send a mgr_d_destroy request to the remote node). failure_req_in_use marks whether the failure_req is currently being used to report a failure notification to the remote dialog. failure_suppress marks whether or not additional dialog failures should be reported. Once a d_shutdown or d_destroy has been initiated its not necessary to indicate any more dialog failures. |

10. Node

A node structure defines the container used to track all the objects associated with a remote node on the interconnect. It also defines the manager specific data structures used by the mgr_thread to communicate with the mgr_thread on the remote node.

Node

| NODE fields | Functions |
|---|---|
| id | Used for object or handle validation |
| a | Adapter associated with this node |
| alloc_next | For linking together nodes that have been |

-continued

| NODE fields | Node Functions |
|---|---|
| alloc_prev | allocated for an adaptor<br>For linking together nodes that have been allocated for an adaptor |
| node_id | Network address for this node on the intraconnect |
| node_interface | Specific node interface on node_id |
| failure | Indicates a node failure has been detected |
| version | Interchange i/f version to use when communication with remote node |
| node state(s) | |
| n_state_created | Initial state after n_create |
| n_state_greeting | State transition as result of n_greet primitive from n_state_created |
| n_state_associate | State transition as result of n_associate primitive from n_state_greet |
| n_state_bound | State transition as result of n_bound primitive from n_state_associate |
| n_state_destroying | State transition as result of n_destroy primitive (from any other state) |
| associated | Remembers whether or not n_associate completed successf[001b]ully |
| uniqueness_local | Local host generated uniqueness value for greet parameters |
| bp_alloc_head<br>bps_alloc_head<br>d_alloc_head<br>pm_alloc_head<br>pms_alloc_head | These fields are used to remember the corresponding BP, BPS, dialog, PM, and PMS objects which have been allocated for this node. |
| user_mgr_d | This field remembers the dialog that the user choose to associate with the remote node as part of the greeting process. This dialog is referred to as the user level management dialog because this dialog has to be used to do future dialog management between the two nodes. Basically, CIA gets the first user dialog up and going. It's the responsible of the user to use this dialog to communicate information about dialog requests (e.g., opening, closing, associating dialogs) between the nodes. |
| req_mgr_wait_head<br>req_mgr_wait_tail | The fields are related to the mgr_thread. The mgr_thread maintains a list of ccb_support commands to be issued to a remote node. The mgr_thread single threads these commands to the remote node (i.e., it issues one command and waits for a response before issuing the next command). |
| req_mgr_wait_head | Head of the queue of requests waiting to be processed for this node |
| req_mgr_wait_tail | Tail of the queue of requests waiting to be processed for this node |
| mgr_thread_d | The dialog used by the mgr_thread to talk to the remote node's mgr_thread |
| max_credit | Maximum buffer pool credits that can be issued to this node per request |
| mgr_op | Expected CIA_MGR_OP value in the next response from the remote node |
| mgr_desc | Expected descriptor value in the next response from the remote node |
| mgr_expected_response_len | Expected response length in the next response from the remote node |
| mgr_in_mcb | Holds d_rcv primitive for mgr_thread dialog inputs |
| mgr_in_data | mgr_thread incoming data |
| mgr_in_rslt | The specific memory area used for the d_rcv result |
| mgr_out_mcb | Holds d_send primitive for mgr_thread command (outgoing) |
| mgr_out_data | mgr_thread command data (outgoing) |
| mgr_rsp_mcb | Holds d_send primitive for mgr_thread response (outgoing) |
| mgr_rsp_data | mgr_thread response data (outgoing) |

-continued

| NODE fields | Node Functions |
|---|---|
| mgr_ops_active | This field is used to count the number of primitives that the mgr_thread currently has outstanding for this node. When a node is destroyed the actual memory associated with the node structure is not freed until all the outstanding mgr_thread operations issued for the node have been returned. |
| mgr_bound | This field is used to solve a race condition associated with the mgr_thread issuing its first d_rcv primitive. The race would occur if the mgr_thread unconditionally issued its first d_rcv primitive (i.e., to receive a command/rsp from a remote mgr_thread) immediately after the local n_associate completes. The mistake is made assuming that the local n_associate completing is the same as the remote n_associate completing, it is not. This boolean indicates whether or not the first time action of initiating the mgr_thread's d_rcv primitive should be performed. |
| req_n_destroy | This field is used to remember the address of the req that initiated the n_destroy request. The mgr_thread must wait for all its outstanding ccbs to be returned before it can free the actual node structure memory and the mgr_thread uses this field (before it actually frees the node structure memory) to recall the request that needs to have completion indicated. |

7. Example Computer System

The communication intraconnection architecture, according to the present invention, can be implemented as a transport facility on any type of host processor, multi-processor, and programming interface, including but not limited to, a host system and Windows NT compatible programming interface.

Figure 18:
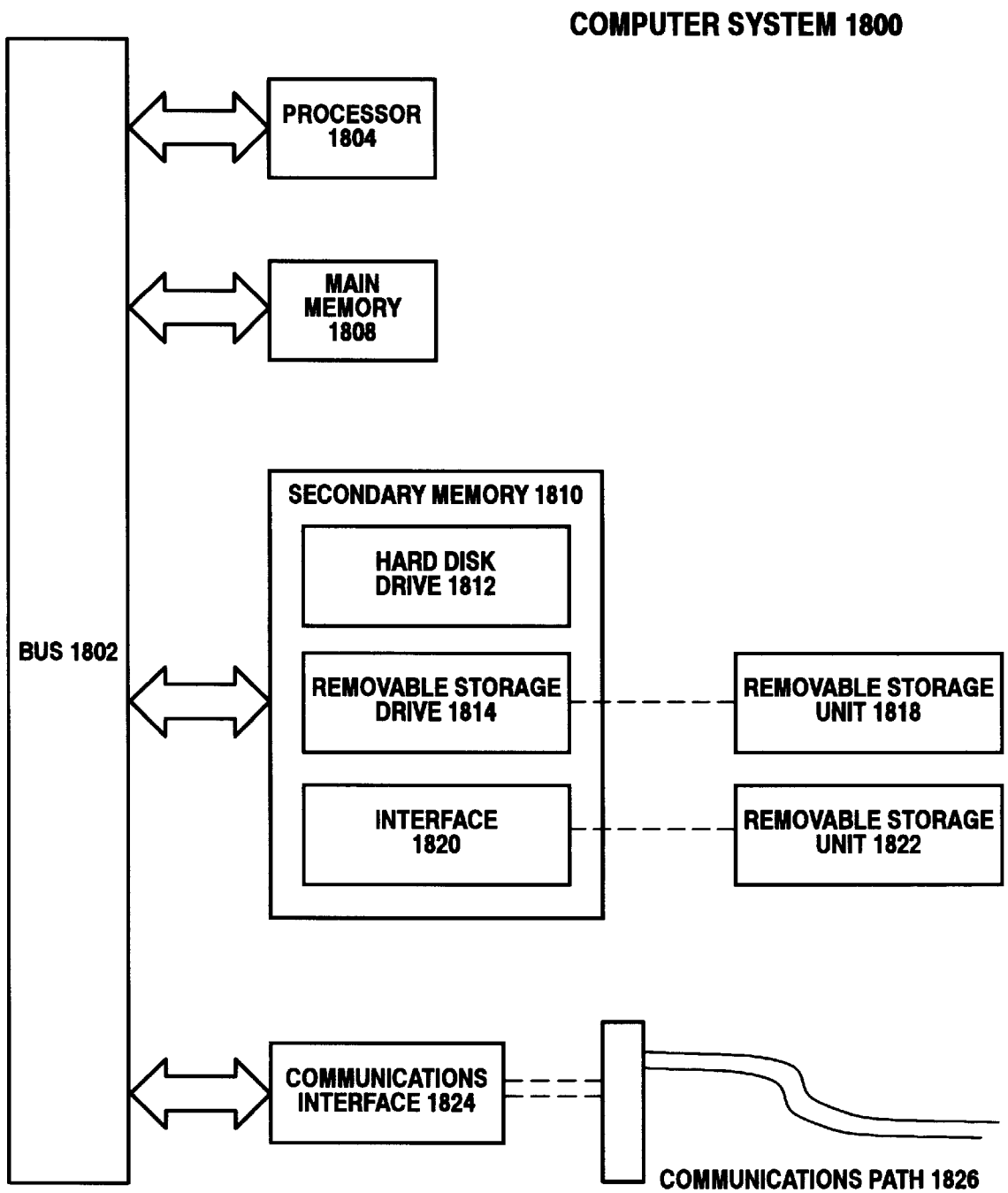
FIG. 18 is a block diagram of an example computer system for implementing the present invention.

FIG. 18 is a block diagram illustrating an example computer system 1800 in which the present invention can operate. Computer system 1800 includes one or more processors, such as processor 1804. The processor 1804 is connected to a communications bus 1802.

Computer system 1800 also includes a main memory 1808, preferably random access memory (RAM), and can also include a secondary memory 1810. The secondary memory 1810 can include, for example, a hard disk drive 1812 and/or a removable storage drive 1814, representing a floppy disk drive, a magnetic tape drive, an optical disk drive, etc. The removable storage drive 1814 reads from and/or writes to a removable storage unit 1818 in a well known manner. Removable storage unit 1818 represents a floppy disk, magnetic tape, optical disk, etc., which is read by and written to by removable storage drive 1814. As will be appreciated, the removable storage unit 1818 includes a computer usable storage medium having stored therein computer software and/or data.

In alternative embodiments, secondary memory 1810 may include other similar means for allowing computer programs or other instructions to be loaded into computer system 1800. Such means can include, for example, a removable storage unit 1822 and an interface 1820. Examples can include a program cartridge and cartridge interface (such as that found in video game devices), a removable memory chip (such as an EPROM, or PROM) and associated socket, and other removable storage units 1822 and interfaces 1820 which allow software and data to be transferred from the removable storage unit 1822 to computer system 1800.

Computer system 1800 can also include a communications interface 1824. Communications interface 1824 allows software and data to be transferred between computer system 1800 and external devices via communications path 1826. Examples of communications interface 1824 can include a modem, a network interface (such as Ethernet card), a communications port, etc. Software and data transferred via communications interface 1824 are in the form of signals which can be electronic, electromagnetic, optical or other signals capable of being received by communications interface 1824, via communications path 1826. Note that communications interface 1824 provides a means by which computer system 1800 can interface to a network, such as, the Internet.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

The present invention can be implemented using software running (that is, executing) in an environment similar to that described above. In this document, the term "computer program product" is used to generally refer to removable storage device 1818 or a hard disk installed in hard disk drive 1812. These computer program products are means for providing software to computer system 1800.

Computer programs (also called computer control logic) are stored in main memory and/or secondary memory 1810. Computer programs can also be received via communications interface 1824. Such computer programs, when executed, enable the computer system 1800 to perform the features of the present invention as discussed herein. In particular, the computer programs, when executed, enable the processor 1804 to perform the features of the present invention. Accordingly, such computer programs represent controllers of the computer system 1800.

In an embodiment where the invention is implemented using software, the software may be stored in a computer program product and loaded into computer system 1800 using removable storage drive 1814, hard drive 1812 or communications interface 1824. Alternatively, the computer program product may be downloaded to computer system 1800 over communications path 1826. The control logic (software), when executed by the processor 1804, causes the processor 1804 to perform the functions of the invention as described herein.

Various software embodiments are described in terms of this example computer system. After reading this description, it will be apparent to a person skilled in the relevant art how to implement the invention using other computer systems and/or computer architectures.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

8. Example CIA-IFE Interface a. CIA-IFE Initialization

Five interface procedures can be used by CIA clients (user clients and/or kernel clients): CiaInitiate, CiaTerminate, CiaIfeEnum, CiaIfeOpen and CiaIfeClose. CiaInitiate routine allocates and initializes state information for a client. A CiaInitiate routine should be called once by each CIA client prior to invoking any of the other CIA interface procedures. This routine gives the CIA implementation a chance to allocate and initialize state information needed to properly implement the CIA semantics for that client.

A CiaTerminate routine is normally called by a CIA client when it no longer requires CIA services. This routine gives the CIA implementation a chance to deallocate state that was allocated for that client. State information associated with a user level client is automatically deallocated if the user process terminates unexpectedly without calling CiaTerminate.

A CiaIfeEnum routine can be used to determine the set of IFEs that have registered with the CIA Primitive Interface. Attributes about each IFE is also returned. This includes name, address, version, type and control block size information.

A CiaIfeOpen routine can be used to open (by name) and obtain a reference to a registered IFE. If necessary, the IFE is initialized. An output parameter of this routine indicates the IFE handle that should be used in the IFE field of CCBs destined for the opened IFE. A client may open the same IFE more than once, without causing reinitialization of the IFE. The returned IFE handle may or may not be the same value for multiple opens of the same IFE name.

A CiaIfeClose routine is used to close a client reference to a previously opened IFE. On the last close of an IFE handle, state associated with the IFE is deallocated. An IFE is automatically closed if a user level client terminates unexpectedly without calling CiaIfeClose for each IFE it opened.

A CiaIfeOp routine can be used to issue a CIA primitive to an IFE. This routine is non-blocking and uses a procedure callback mechanism to inform the client of primitive completion. A CCB is passed into CiaIfeOp which describes the primitive and the IFE it is to be executed on. In one example, the actual size of a CCB allocated by a client is at least as large as the control block size returned in the CiaIfeEnum results for the IFE. The additional space at the end of the control block is the IFE workspace and is reserved for IFE specific usage.

b. CIA Providers

Figure 19:
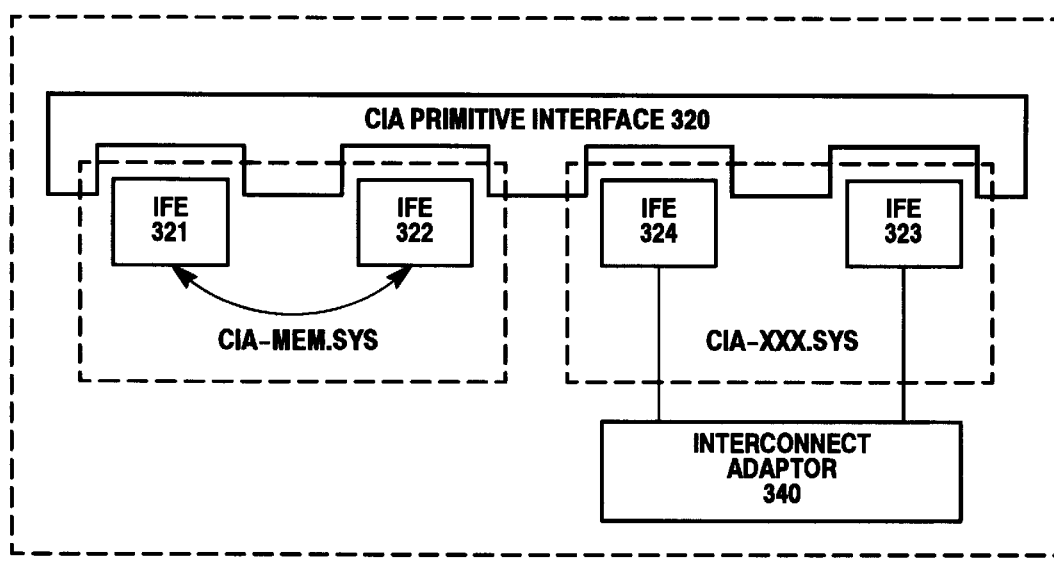
FIG. 19 shows block diagrams of CIA providers for use in the present invention.

FIG. 19 depicts two CIA providers: CIA MEM.SYS and CIA XXX.SYS. In this example, a CIA provider is an NT driver that implements CIA semantics across one or more intraconnects. The set of IFEs that a CIA provider registers is a function of:

1. the hardware installed in the system
2. implementation specific entries in the configuration registry
3. the attachment styles supported by the provider A CIA provider uses an interface to create IFE objects and to register and unregister them with the CIA Primitive Interface. A CIA provider would preferably register each IFE object with a unique name (unique to the local NT host). Where there is an associated intraconnect adapter, a CIA provider may generate a unique IFE name by using the PCI bus and device information as part of the IFE name. A CIA provider does not unregister an IFE unless the driver is unloaded (e.g., sc stop <driver>). The driver is not unloaded unless all of its IFEs are closed.

C. IFE Attachment Styles

Figure 20:
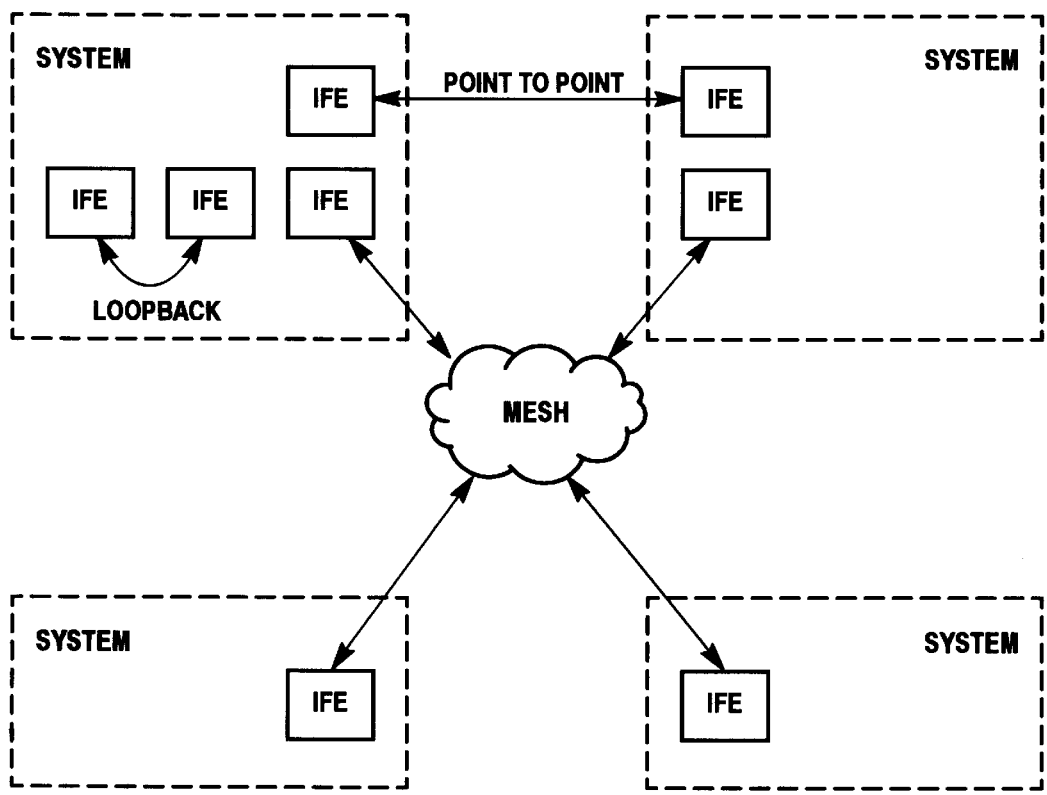
FIG. 20 shows a block diagram of different IFE attachment styles for use in the present invention.

As shown in FIG. 20, CIA defines three attachment styles: Point to Point, Loopback and Mesh. A CIA provider may support multiple attachment styles simultaneously. A Point to Point attachment connects exactly two IFE objects, each from a different system. A Loopback attachment connects exactly two IFEs, each from the same system. Loopback connections are used to support CIA applications between two applications running on the same system. A Mesh attachment connects 1 or more IFEs from 1 or more systems.

d. CIA Proxy Drivers

Figure 21:
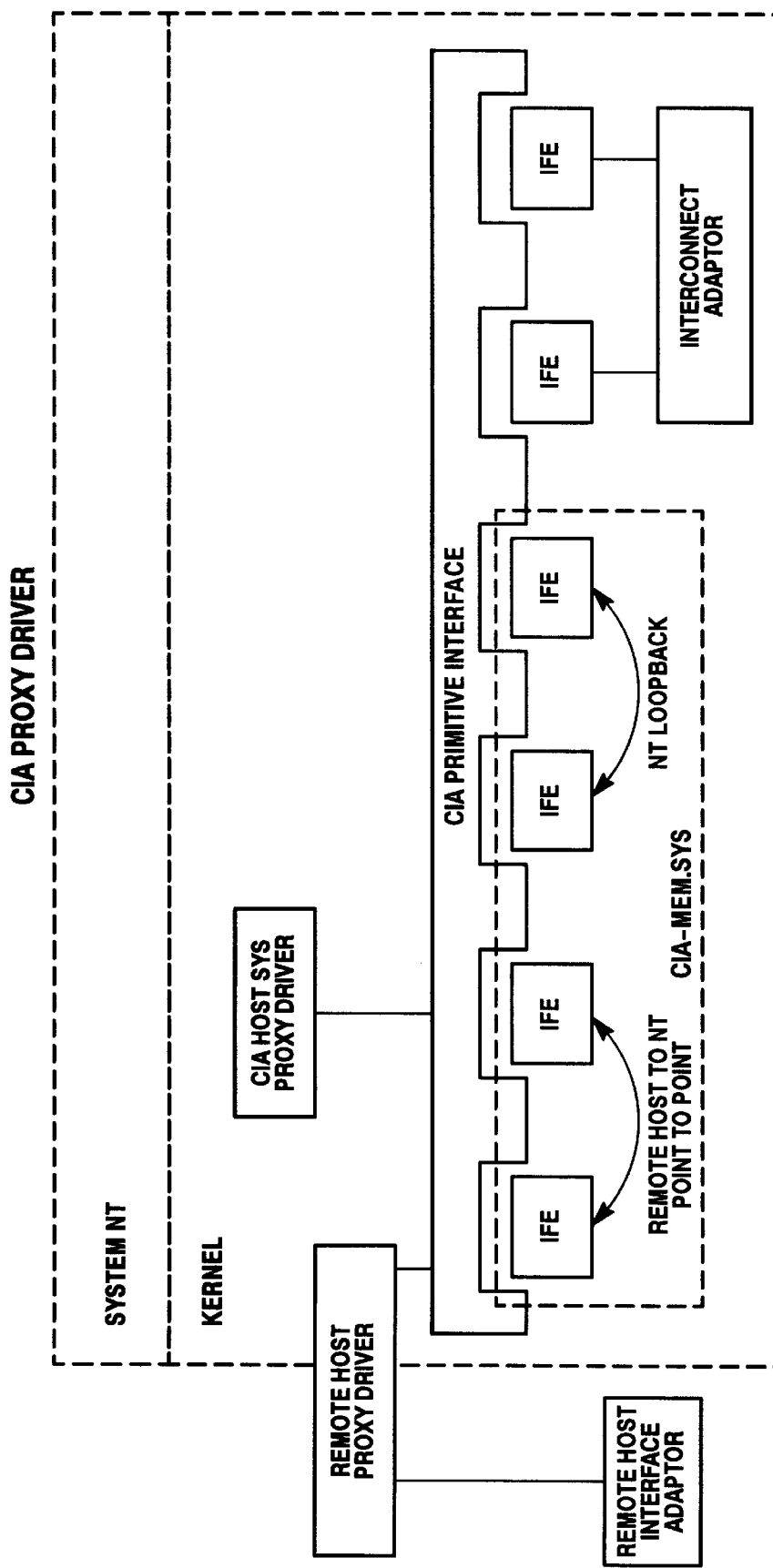
FIG. 21 shows a block diagram of CIA proxy drivers for use in the present invention.

A Windows NT CIA implementation supports hosting non-kernel CIA clients and IFE objects for other systems (e.g., MCP). These services are provided by CIA proxy drivers as depicted in FIG. 21. CIA USER.SYS serves as the proxy driver for local Win32 clients. It provides the following services:

1. Interfaces to NT IO interface and CIA.DLL to implement CIA semantics across the user/kernel boundary.

2. Performs memory management (probing, locking, unlocking) of user memory areas which are referenced by CIA primitives.

3. Implements a CIA Primitive Interface. Note that CIA USER.SYS does not implement the actual CIA primitives (e.g., d_send). It implements the CiaIfeOp routine which directs primitives to an IFE.

The remote host proxy driver provides the following services:

1. Remote host memory read and write services.

2. Creation of native NT CCBs from remote host specific CCBs (e.g., transforms that convert fields from big to little endian formats).

3. Transforms that convert CIA native NT CCB results into host specific formats.

4. Transforms that convert CIA native notification mechanism (i.e., callbacks) into a mechanism suitable for the remote host.

CIA supports multiple remote host proxy drivers. A remote host proxy driver may also support multiple remote host interface adapters. Each remote host interface adapter is assigned a unique node_interface value. The node_interface value provides the addressing information needed by a mesh based CIA provider to direct an incoming frame to the correct IFE (since multiple IFEs may be sharing the same Intraconnect Adapter). Assignment of node_interface values is coordinated between multiple proxy drivers via the CIA Primitive Interface.

A proxy driver indicates its assigned node_interface value to the caller of CiaInitiate. A programming interface that is serviced by a proxy driver (e.g., Win32, remote host) can only open those IFEs whose node_interface value matches that returned by CiaInitiate. This enforcement is a responsibility of the proxy driver. Kernel based CIA clients can open any IFE object. Kernel based CIA clients that are not proxy drivers should only open those IFEs whose node_interface value matches that returned by CiaInitiate.

e. IFE Addressing

Figure 22:
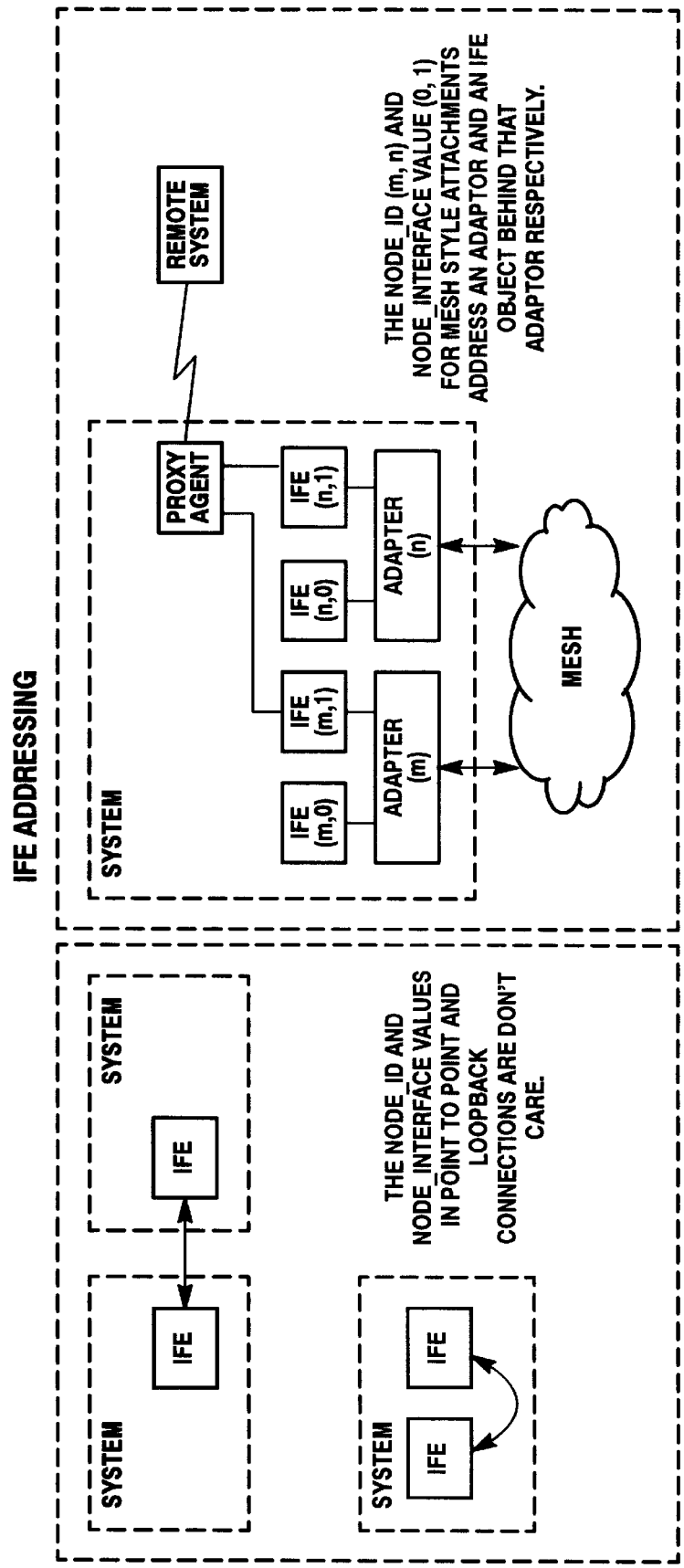
FIG. 22 is a block diagram of an example IFE addressing, according to the present invention.
Figure 23:
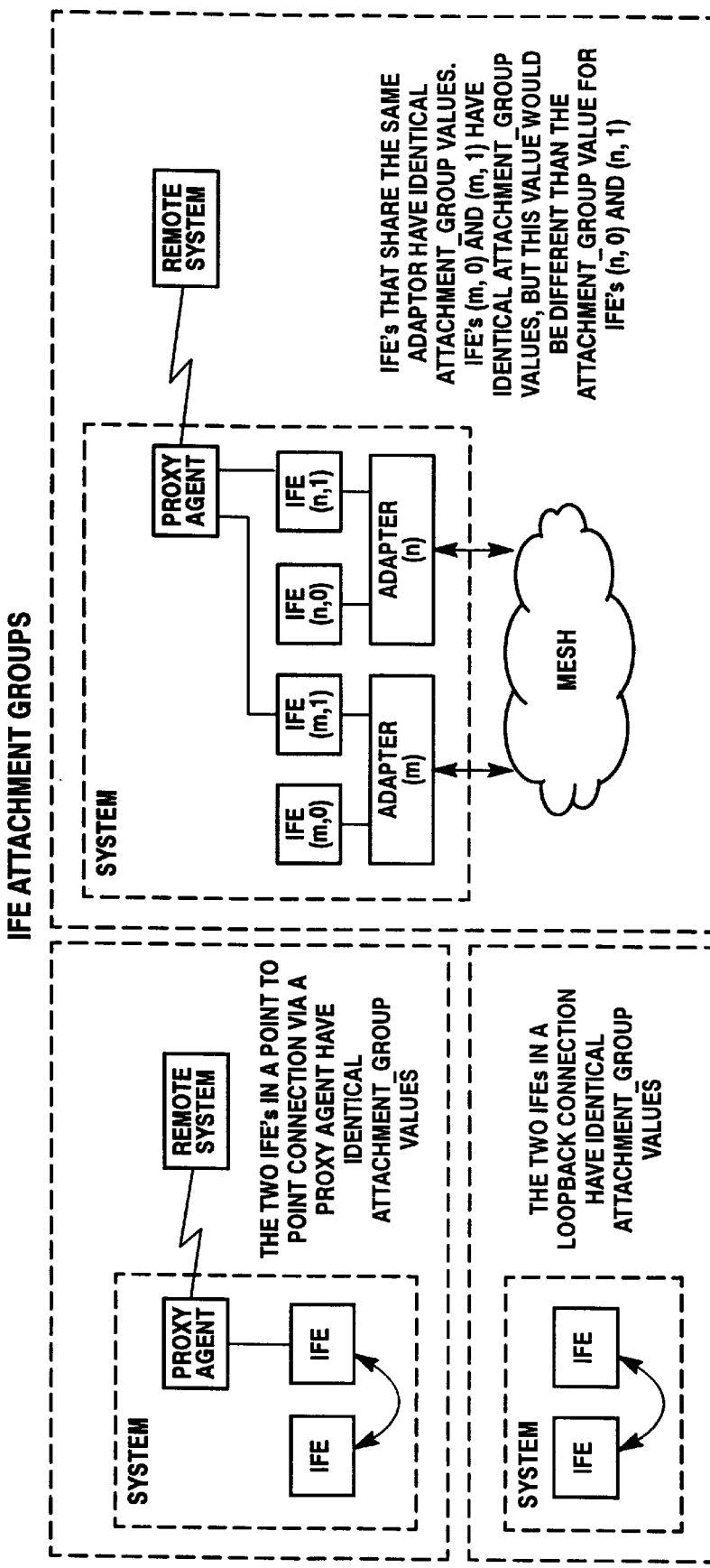
FIG. 23 is a block diagram of an example IFE attachment groups, according to the present invention.

FIGS. 22 and 23 illustrate an example IFE addressing scheme. FIG. 22 shows an IFE on a mesh based attachment addressed using a two part address (duple). The first part is called node_id and refers to the MAC address of the hardware adapter that the IFE is logically attached to. The second part is called node_interface and refers to the proxy agent which serves that IFE.

As shown in FIG. 23, groups of IFEs form attachment groups. Each IFE also has an attribute which refers to its attachment group. CIA clients interrogate attachment group values in order to determine related sets of IFEs as shown in the FIG. 23.

9. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for providing pull model data communication between a send client and a receive client, the method comprising the steps of:

at a receive side, creating a buffer pool at the receive client;

creating a buffer pool shadow at the send client, said buffer pool shadow corresponding to said buffer pool at the receive client;

creating a pool manager at the receive client;

creating a pool manager shadow at the send client, said pool manager shadow corresponding to said pool manager at the receive client;

associating said pool manager with said buffer pool;

associating said pool manager shadow with said buffer pool shadow;

supplying credits designating buffer areas to said buffer pool;

updating said buffer pool to identify said buffer areas supplied in said credit supplying step;

updating said buffer pool shadow to identify said buffer areas supplied to said buffer pool in said credit supplying step;

updating said pool manager and said pool manager shadow to represent said updated buffer pool;

constructing a dialog receive control block said dialog receive control block including a dialog receive primitive having a data destination descriptor parameter identifying said updated pool manager;

passing said dialog receive control block from the receive client to a receive intraconnect front end (IFE);

building a receive control block (RCB) based on parameters in said dialog receive control block; and sending said RCB in a first network packet to a send IFE; and at a send side, queuing said RCB in said send IFE;

constructing a dialog send control block, said dialog send control block including a dialog send primitive having dialog send parameters that identify a dialog send primitive and data that is to be sent to the receive client;

passing said dialog send control block to said send IFE;

determining a match between said dialog send control block and said queued RCB;

binding a receive memory address for at least one receive buffer and data from at least one send buffer identified by said dialog send control block, said at least one receive buffer being listed in said updated buffer pool shadow associated with said updated pool manager shadow, corresponding to said updated pool manager identified by said data destination descriptor parameter;

building a second network packet, said second network packet including said data and said receive memory address bound in said binding step; and sending said second network packet to said receive IFE.

2. The method of claim 1, wherein said binding step includes the step of:

at the send-side, determining an available buffer pool associated with said updated pool manager identified by said data destination descriptor parameter that has a buffer capacity for binding said data.

3. The method of claim 2, wherein said determining step includes the steps of:

identifying said updated pool manager shadow corresponding to said updated pool manager identified by said data destination descriptor parameter;

evaluating a control table in said identified updated pool manager shadow to determine said available buffer pool, said control table having buffer pool references and selection bound parameters;

reading said buffer pool shadow associated with said pool manager shadow to obtain receive memory address information for at least one receive buffer, said at least one receive buffer having a capacity that best matches a length of said data to be transferred.

4. The method of claim 1, further comprising the step of:

issuing a low water mark notification when a buffer pool has a number of available buffers less than a low water mark value.

5. The method of claim 1, wherein said buffer pool creating step comprises the step of issuing a buffer pool create primitive to create said buffer pool and to associate said buffer pool with a node, said buffer pool create primitive including parameters that define a size of memory area associated with a buffer pool credit, a number of buffer pool credit slots for storing buffer addresses included in said buffer pool, and a low water mark value.

6. The method of claim 5, further comprising the step of maintaining an unbound counter representing a count of credits available at a buffer pool at the receive-side, said unbound counter being increased after said crediting step adds credit slots and decreased after said binding step uses credit slots.

7. The method of claim 5, further comprising the step of comparing said receive memory address in said second network packet received at the receive-side to verify said receive memory address is in a permissible range.

8. A system for providing pull model data communication between a send client and a receive client, comprising:

means for creating a buffer pool at the receive client;

means for creating a buffer pool shadow at the send client, said buffer pool shadow corresponding to said buffer pool at the receive client;

means for creating a pool manager at the receive client;

means for creating a pool manager shadow at the send client, said pool manager shadow corresponding to said pool manager at the receive client;

means for associating said pool manager with said buffer pool;

means for associating said pool manager shadow with said buffer pool shadow;

means for supplying credits designating buffer areas to said buffer pool;

means for updating said buffer pool to identify said buffer areas supplied in said credit supplying step;

means for updating said buffer pool shadow to identify said buffer areas supplied to said buffer pool in said credit supplying step;

means for updating said pool manager and said pool manager shadow to represent said updated buffer pool;

means for constructing a dialog receive control block, said dialog receive control block including a dialog receive primitive having a data destination descriptor parameter identifying said updated pool manager;

means for passing said dialog receive control block from the receive client to a receive intraconnect front end (IFE);

means for building a receive control block (RCB) based on parameters in said dialog receive control block;

means for sending said RCB in a first network packet to a send IFE; and means for queuing said RCB in said send IFE;

means for constructing a dialog send control block, said dialog send control block including a dialog send primitive having dialog send parameters that identify a dialog send primitive and data that is to be sent to the receive client;

means for passing said dialog send control block to said send IFE;

means for determining a match between said dialog send control block and said queued RCB;

means for binding a receive memory address for at least one receive buffer and data from at least one send buffer identified by said dialog send control block, said at least one receive buffer being listed in said updated buffer pool shadow associated with said updated pool manager shadow, corresponding to said updated pool manager identified by said data destination descriptor parameter;

means for building a second network packet, said second network packet including said data and said receive memory address bound in said binding step; and means for sending said second network packet to said receive IFE.

9. The system of claim 8, wherein said binding means includes:

at the send-side, means for determining an available buffer pool associated with said updated pool manager identified by said data destination descriptor parameter that has a buffer capacity for binding said data.

10. The system of claim 9, wherein said determining means includes:

means for identifying said updated pool manager shadow corresponding to said updated pool manager identified by said data destination descriptor parameter;

means for evaluating a control table in said identified updated pool manager shadow to determine said available buffer pool, said control table having buffer pool references and selection bound parameters;

means for reading said buffer pool shadow associated with said pool manager shadow to obtain receive memory address information for at least one receive buffer, said at least one receive buffer having a capacity that best matches a length of said data to be transferred.

11. The system of claim 8, further comprising:

means for issuing a low water mark notification when a buffer pool has a number of available buffers less than a low water mark value.

12. The system of claim 8, wherein said buffer pool creating means comprises means for issuing a buffer pool create primitive to create said buffer pool and to associate said buffer pool with a node, said buffer pool create primitive including parameters that define a size of memory area associated with a buffer pool credit, a number of buffer pool credit slots for storing buffer addresses included in said buffer pool, and a low water mark value.

13. The system of claim 12, further comprising means for maintaining an unbound counter representing a count of credits available at a buffer pool at the receive-side, said unbound counter being increased after said crediting means adds credit slots and decreased after said binding means uses credit slots.

14. The system of claim 8, further comprising means for comparing said receive memory address in said second network packet received at the receive-side to verify said receive memory address is in a permissible range.

15. A computer program product comprising a computer useable medium having computer program logic recorded thereon for enabling a processor in a computer system to provide pull model data communication to transfer data between a send client and a receive client, said computer program logic comprising:

means enabling the processor to create a buffer pool at the receive client;

means enabling the processor to create a pool manager at the receive client;

means enabling the processor to associate said pool manager with said buffer pool means enabling the processor to supply credits designating buffer areas to said buffer pool;

means enabling the processor to update said buffer pool to identify said designated buffer areas;

means enabling the processor to update said pool manager to represent said updated buffer pool;

means enabling the processor to construct a dialog receive control block, said dialog receive control block including a dialog receive primitive having a data destination descriptor parameter identifying said updated pool manager;

means enabling the processor to pass said dialog receive control block from the receive client to a receive intraconnect front end (IFE);

means enabling the processor to build a receive control block (RCB) based on parameters in said dialog receive control block;

means enabling the processor to send said RCB in a first network packet to a send IFE.

16. A method for providing pull model data communication between a send client and a receive client, the method comprising the steps of:

creating a buffer pool at the receive client; and creating a buffer pool shadow at the send client, said buffer pool shadow corresponding to said buffer pool at the receive client.

17. The method of claim 16, further comprising the steps of:

creating a pool manager at the receive client;

creating a pool manager shadow at the send client, said pool manager shadow corresponding to said pool manager at the receive client;

associating said pool manager with said buffer pool; and associating said pool manager shadow with said buffer pool shadow.

18. The method of claim 17, further comprising the steps of:

supplying credits designating buffer areas to said buffer pool;

updating said buffer pool to identify said buffer areas supplied in said credit supplying step;

updating said buffer pool shadow to identify said buffer areas supplied to said buffer pool in said credit supplying step; and updating said pool manager and said pool manager shadow to respresent said updated buffer pool.

19. The method of claim 18, further comprising the steps of:

constructing a dialog receive control block, said dialog receive control block including a dialog receive primitive having a data destination descriptor parameter identifying said updated pool manager;

passing said dialog receive control block from the receive client to a receive intraconnect front end (IFE);

building a receive control block (RCB) based on parameters in said dialog receive control block; and sending said RCB in a first network packet to a send IFE.

20. The method of claim 19, further comprising the steps of:

at a send side, queuing said RCB in said send IFE;

constructing a dialog send control block, said dialog send control block including a dialog send primitive having dialog send parameters that identify a dialog send primitive and data that is to be sent to the receive client;

passing said dialog send control block to said send IFE;

determining a match between said dialog send control block and said queued RCB;

binding a receive memory address for at least one receive buffer and data from at least one send buffer identified by said dialog send control block, said at least one receive buffer being listed in said updated buffer pool shadow associated with said updated pool manager shadow, corresponding to said updated pool manager identified by said data destination descriptor parameter;

building a second network packet, said second network packet including said data and said receive memory address bound in said binding step; and sending said second network packet to said receive IFE.

21. The method of claim 16, further comprising the step of:

issuing a low water mark notification when a buffer pool has a number of available buffers less than a low water mark value.

22. The method of claim 16, wherein said buffer pool creating step comprises the step of issuing a buffer pool create primitive to create said buffer pool and to associate said buffer pool with a node, said buffer pool create primitive including parameters that define a size of memory area associated with a buffer pool credit, a number of buffer pool credit slots for storing buffer addresses included in said buffer pool, and a low water mark value.

23. The method of claim 16, further comprising the step of maintaining an unbound counter representing a count of credits available at a buffer pool at the receive-side, said unbound counter being increased after a crediting step adds credit slots and decreased after a binding step uses credit slots.

24. The method of claim 20, further comprising the step of comparing said receive memory address in said second network packet received at the receive-side to verify said receive memory address is in a permissible range.

25. A system for providing pull model data communication between a send client and a receive client, comprising:

means for creating a buffer pool at the receive client; and means for creating a buffer pool shadow at the send client, said buffer pool shadow corresponding to said buffer pool at the receive client.

26. The system of claim 25, further comprising:

means for creating a pool manager at the receive client;

means for creating a pool manager shadow at the send client, said pool manager shadow corresponding to said pool manager at the receive client;

means for associating said pool manager with said buffer pool; and means for associating said pool manager shadow with said buffer pool shadow.

27. The system of claim 26, further comprising:

means for supplying credits designating buffer areas to said buffer pool;

means for updating said buffer pool to identify said buffer areas supplied by said credit supplying means;

means for updating said buffer pool shadow to identify said buffer areas supplied to said buffer pool by said credit supplying means; and means for updating said pool manager and said pool manager shadow to represent said updated buffer pool.

28. The system of claim 27, further comprising:

means for constructing a dialog receive control block, said dialog receive control block including a dialog receive primitive having a data destination descriptor parameter identifying said updated pool manager;

means for passing said dialog receive control block from the receive client to a receive intraconnect front end (IFE);

means for building a receive control block (RCB) based on parameters in said dialog receive control block; and means for sending said RCB in a first network packet to a send IFE.

29. The system of claim 28, further comprising:

means for queuing said RCB in said send IFE;

means for constructing a dialog send control block, said dialog send control block including a dialog send primitive having dialog send parameters that identify a dialog send primitive and data that is to be sent to the receive client;

means for passing said dialog send control block to said send IFE;

means for determining a match between said dialog send control block and said queued RCB;

means for binding a receive memory address for at least one receive buffer and data from at least one send buffer identified by said dialog send control block, said at least one receive buffer being listed in said updated buffer pool shadow associated with said updated pool manager shadow, corresponding to said updated pool manager identified by said data destination descriptor parameter;

means for building a second network packet, said second network packet including said data and said receive memory address bound by said binding means; and means for sending said second network packet to said receive IFE.

30. The system of claim 25, further comprising:

means for issuing a low water mark notification when a buffer pool has a number of available buffers less than a low water mark value.

31. The system of claim 25, wherein said buffer pool creating means comprises means for issuing a buffer pool create primitive to create said buffer pool and to associate said buffer pool with a node, said buffer pool create primitive including parameters that define a size of memory area associtated with a buffer pool credit, a number of buffer pool credit slots for storing buffer addresses included in said buffer pool, and a low water mark value.

32. The system of claim 25, further comprising means for maintaining an unbound counter representing a count of credits available at a buffer pool at the receive-side, said unbound counter being increased after a crediting means adds credit slots and decreased after a binding means uses credit slots.

33. The system of claim 29, further comprising means for comparing said receive memory address in said second network packet received at the receive-side to verify said receive memory address is in a permissible range.

34. A computer program product comprising a computer useable medium having computer program logic recorded thereon for enabling first and second processors to provide pull model data communication to transfer data between a send client and a receive client, said computer program logic comprising:

means enabling the first processor to create a buffer pool at the receive client;

means enabling the second processor to create a buffer pool shadow at the send client, said buffer pool shadow corresponding to said buffer pool at the receive client;

means enabling the first processor to create a pool manager at the receive client; and means enabling the first processor to associate said pool manager with said buffer pool.

* * * * *